(12) United States Patent
Liu et al.

(10) Patent No.: US 10,404,999 B2
(45) Date of Patent: Sep. 3, 2019

(54) RESIDUAL CODING FOR DEPTH INTRA PREDICTION MODES

(71) Applicant: QUALCOMM Incorporated, San Diego, CA (US)

(72) Inventors: Hongbin Liu, San Diego, CA (US); Ying Chen, San Diego, CA (US); Li Zhang, San Diego, CA (US); Xin Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 14/912,152

(22) PCT Filed: Sep. 26, 2014

(86) PCT No.: PCT/CN2014/087511
§ 371 (c)(1),
(2) Date: Feb. 15, 2016

(87) PCT Pub. No.: WO2015/043501
PCT Pub. Date: Apr. 2, 2015

(65) Prior Publication Data
US 2016/0212446 A1 Jul. 21, 2016

Related U.S. Application Data

(60) Provisional application No. 61/916,041, filed on Dec. 13, 2013.

(30) Foreign Application Priority Data

Sep. 27, 2013 (WO) ................ PCT/CN2013/001176

(51) Int. Cl.
*H04N 19/597* (2014.01)
*H04N 19/70* (2014.01)
(Continued)

(52) U.S. Cl.
CPC ........... *H04N 19/597* (2014.11); *H04N 19/11* (2014.11); *H04N 19/13* (2014.11); *H04N 19/159* (2014.11);
(Continued)

(58) Field of Classification Search
None
See application file for complete search history.

(56) References Cited

U.S. PATENT DOCUMENTS

| | | | |
|---|---|---|---|
| 7,535,387 B1 * | 5/2009 | Delva | H03M 7/4006 341/107 |
| 2009/0304075 A1 * | 12/2009 | Ogura | H04N 19/70 375/240.12 |

(Continued)

FOREIGN PATENT DOCUMENTS

| CN | 102209243 A | 10/2011 |
|---|---|---|
| CN | 102685532 A | 9/2012 |

(Continued)

OTHER PUBLICATIONS

Jager F: "3D-CE6.h: Simplified Depth Coding with an optional Depth Lookup Table," 2. JCT-3V Meeting; 102. MPEG Meeting; Oct. 13-19, 2012; Shanghai, CN {The Joint Collaborative Team on 3D Video Coding Extension Development of ISO/IEC JTC1/SC29/WG11 and ITU-T SG.16 ); URL: http://phenix.int-evry.frijct2/,No. JCT3V-B0036, Oct. 16, 2012 {Oct. 16, 2012), 16 pp. XP030130217.

(Continued)

*Primary Examiner* — Kate H Luo
(74) *Attorney, Agent, or Firm* — Shumaker & Sieffert, P.A.

(57) ABSTRACT

A video coder may perform a simplified depth coding (SDC) mode, including simplified residual coding, to code a depth block according to any of a variety of, e.g., at least three, depth intra prediction modes. For example, the video coder (Continued)

may perform the SDC mode for coding a depth block according to depth modeling mode (DMM) 3, DMM 4, or a region boundary chain coding mode. In such examples, the video coder may partition the depth block, and code respective DC residual values for each partition. In some examples, the video coder may perform the SDC mode for coding a depth block according to an intra prediction mode, e.g., an HEVC base specification intra prediction mode, such as a DC intra prediction mode or one of the directional intra prediction modes. In such examples, the video coder may code a single DC residual value for the depth block.

28 Claims, 12 Drawing Sheets

(51) Int. Cl.
*H04N 19/13* (2014.01)
*H04N 19/18* (2014.01)
*H04N 19/159* (2014.01)
*H04N 19/174* (2014.01)
*H04N 19/176* (2014.01)
*H04N 19/593* (2014.01)
*H04N 19/11* (2014.01)
*H04N 19/91* (2014.01)

(52) U.S. Cl.
CPC ......... *H04N 19/174* (2014.11); *H04N 19/176* (2014.11); *H04N 19/18* (2014.11); *H04N 19/593* (2014.11); *H04N 19/70* (2014.11); *H04N 19/91* (2014.11)

(56) References Cited

U.S. PATENT DOCUMENTS

| | | | |
|---|---|---|---|
| 2010/0086034 A1 | 4/2010 | Park et al. | |
| 2012/0014433 A1* | 1/2012 | Karczewicz | H03M 7/40 375/240.02 |
| 2012/0128068 A1 | 5/2012 | Thoreau et al. | |
| 2013/0114691 A1 | 5/2013 | Guo et al. | |
| 2013/0170761 A1 | 7/2013 | Wey et al. | |
| 2015/0319459 A1 | 11/2015 | Zheng | |
| 2016/0037185 A1 | 2/2016 | Zheng et al. | |

FOREIGN PATENT DOCUMENTS

| | | |
|---|---|---|
| CN | 103067715 A | 4/2013 |
| CN | 103237216 A | 8/2013 |
| EP | 2173100 A2 | 4/2010 |
| WO | 2013069306 A1 | 5/2013 |
| WO | 2015042751 A1 | 4/2015 |

OTHER PUBLICATIONS

Lee J Y., et al., "3D-CE5 related: Simplified depth inter mode coding," 6. JCT-3V Meeting; Oct. 25, 2013-Nov. 1, 2013; Geneva, CH (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-F0149, Oct. 18, 2013 (Oct. 18, 2013), XP030131583 EPO Form, 2 pp.

Liu et al., "CE5: Generic SDC for all Intra modes in 3D-HEVC," JCT-3V Meeting; Jan. 11-17, 2014; San Jose, CA (Joint Collaborative Team on Video Coding of ISO/IEC JTC1/SC29/WG11 and ITU-T SG.16); Jan. 6, 2014; No. JCT3V-G0122, 9 pp.

Supplementary European Search Report—EP14847347—Search Authority—Munich—Jun. 30, 2017, 16 pp.

Tech et al., "3D-HEVC Draft Text 1," JCT Meeting; Jul. 27-Aug. 2, 2013; Vienna, AT (Joint Collaborative Team on Video Coding of ISO/IEC JTC1/SC29/WG11 and ITU-T SG.16 ); No. JCT3V-E1001-v3, Sep. 11, 2013, 89 pp.

International Preliminary Report on Patentability from International Application No. PCT/CN2014/087511, dated Jan. 26, 2016, 8 pp.

Muller K., et al., "3D Video Coding with Depth Modeling Modes and View Synthesis Optimization," Signal & information Processing Association Annual Summit and Conference, May 23, 2013, 4 pages.

Zhang, Qiu-Wen et al., "Depth Map Intra Coding Based on Virtual View Rendering Distortion Estimation," Journal of Electronics & Information Technology, Nov. 2011, vol. 33(11), 6 pages.

Supplementary European Search Report—EP14847347—Search Authority—Munich—dated Apr. 6, 2017, 7 pp.

Tech et al., "3D-HEVC Draft Text 1," JCT-3V Meeting; Jul. 27, 2013-Aug. 2, 2013; Vienna, AT (The Joint Collaborative Team on 3D Video Coding Extension Development of ISO/IEC JTC1/SC29/WG11 and ITU-T SG.16); URL: http://phenix.int-evry.fr/jct2/, No. JCT3V-E1 001-v3, Sep. 11, 2013 (Sep. 11, 2013), pp. 1-89, XP030131378.

Zhao et al., "CE6.h related: Wedgelet modes unification," 4. JCT-3V Meeting, Apr. 20, 2013-Apr. 26, 2013, Incheon, KR (The Joint Collaborative Team on 3D Video Coding Extension Development of ISO/IEC JTC1/SC29/WG11 and ITU-T SG.16 ), No. JCT3V-D0184, Apr. 13, 2013 (Apr. 13, 2013), 8 pp. XP030130848, URL: http://phenix.int-evry.fr/jct2/.

International Preliminary Report on Patentability from International Application No. PCT/CN2013/001176, dated Jan. 29, 2016, 9 pp.

ITU-T H.264, Series H: Advanced video coding for generic audiovisual services, The International Telecommunication Union, Mar. 2010, 676 pp.

International Preliminary Report on Patentability for Application No. PCT/CN2014/087511, dated Jan. 21, 2016, 5 pp.

International Search Report and Written Opinion for Application No. PCT/CN2013/001176 dated Jul. 10, 2014, 17 pp.

International Search Report and Written Opinion for Application No. PCT/CN2014/087511 dated Dec. 29, 2014, 12 pp.

Response to Written Opinion dated Jul. 10, 2014, from International Application No. PCT/CN2013/001176, filed on Jun. 5, 2015, 1 pp.

Response to Written Opinion dated Dec. 29, 2014, from International Application No. PCT/CN2014/087511, filed on Jul. 23, 2015, 2 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-11003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

(56) References Cited

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Tech et al., "3D-HEVC Test Model 5," JCT3V-E1005, Joint Collaborative Team on 3D Video Coding Extension Development of ITU-T SG 16 WP 3 and ISO/IEC JTC 1/SC 29/WG 11, 5th Meeting: Vienna, AT, Jul. 27-Aug. 2, 2013, 57 pp.

Tech et al., "3D-HEVC Draft Text 1," Document JCT3VE1001-v3, Joint Collaborative Team on 3D Video Coding Extension Development of ITU-T SG 16 WP 3 and ISO/IEC JTC 1/SC 29/WG 11, 5th Meeting: Vienna, AT, Jul. 27-Aug. 2, 2013, 89 pp.

Tech et al., "3D-HEVC Draft Text 2," Document JCT3V-F1001-v1, Joint Collaborative Team on 3D Video Coding Extension Development of ITU-T SG 16 WP 3 and ISO/IEC JTC 1/SC 29/WG 11, 6th Meeting: Geneva, CH, Oct. 25-Nov. 1, 2013, 98 pp.

Hongbin Liu et al., "CE5 related: Generic SDC for all Intra modes in 3d-HEVC" Document JCT3V-F0126, Joint Collaborative Team on 3D Video Coding Extension Development of ITU-T SG 16 WP 3 and ISO/IEC JTC 1/SC 29/WG 11, 6th Meeting: Geneva, CH, Oct. 25-Nov. 1, 2013, 8 pp.

ITU-T H.223, Series H: Audiovisual and Multimedia Systems, Infrastructure of audiovisual services—Transmission multiplexing and sychronization, Multiplexing protocol for low bit rate multimedia communication, The International Telecommunication Union. Jul. 2001, 74 pp.

Bossen et al, "HM Software Manual" for 3D-HEVC, Version 8.0, Joint Collaborative Team on 3D Video Coding Extension Development of ITU-T SG 16 WP 3 and ISO/IEC JTC 1/SC 29/WG 11, May 28, 2013, 18 pp.

Bossen et al, "HM Software Manual" for 3D-HEVC, Version 9.0, Joint Collaborative Team on 3D Video Coding Extension Development of ITU-T SG 16 WP 3 and ISO/IEC JTC 1/SC 29/WG 11, May 28, 2013, 18 pp.

Schwarz et al., Description of 3D Video Coding Technology Proposal by Fraunhofer HHI (HEVC compatible configuration A), MPEG Meeting ISO/IEC JTC1/SC29/WG11, Doc. MPEG11/M22570, Geneva, Switzerland, Nov./Dec. 2011, 48 pp.

Schwarz et al., Description of 3D Video Technology Proposal by Fraunhofer HHI (HEVC compatible; configuration B), MPEG Meeting—ISO/IEC JTC1/SC29/WG11, Doc. MPEG11/M22571, Geneva, Switzerland, Nov./Dec. 2011, 46 pp.

* cited by examiner

RESIDUAL CODING FOR DEPTH INTRA PREDICTION MODES

This application is a national stage entry under 35 U.S.C. § 371 of International Application No. PCT/CN2014/087511 filed on Sep. 26, 2014, which claims the benefit of International Application No. PCT/CN2013/001176 filed on Sep. 27, 2013 and U.S. provisional application No. 61/916,041 filed on Dec. 13, 2013.

TECHNICAL FIELD

This disclosure relates to video coding and compression, and more particularly, techniques for coding residual values for depth intra prediction modes.

BACKGROUND

Digital video capabilities can be incorporated into a wide range of devices, including digital televisions, digital direct broadcast systems, wireless broadcast systems, tablet computers, smartphones, personal digital assistants (PDAs), laptop or desktop computers, digital cameras, digital recording devices, digital media players, video gaming devices, video game consoles, cellular or satellite radio telephones, video teleconferencing devices, set-top devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive and store digital video information more efficiently.

An encoder-decoder (codec) applies video compression techniques to perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures alternatively may be referred to as frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multi-view coding bitstream may be generated by encoding views, e.g., from multiple perspectives. Multi-view coding may allow a decoder to choose between different views, or possibly render multiple views. Moreover, some three-dimensional (3D) video techniques and standards that have been developed, or are under development, such as 3D-HEVC, which is a multi-view extension of HEVC, make use of multiview coding aspects. For example, different views may transmit left and right eye views to support 3D video. Some 3D video coding processes may apply so-called multiview-plus-depth coding. In multiview-plus-depth coding, a 3D video bitstream may contain multiple views that include not only texture view components, but also depth view components. For example, each view may comprise a texture view component and a depth view component.

SUMMARY

In general, this disclosure describes techniques for intra prediction coding depth data of a 3D video bitstream. More particularly, a video coder configured according to some techniques of this disclosure may perform a simplified depth coding (SDC) mode to code one or more DC residual values for a depth block when the depth block is intra prediction coded according to any of a variety of, e.g., at least three, depth intra prediction modes. The SDC mode includes simplified residual coding, in which a video coder codes, e.g., encodes or decodes, one or more DC residual values in the bitstream. Each of the one or more DC residual values represents, i.e., can be used by a video decoder to reconstruct, a plurality of depth sample values, e.g., depth pixel values of the depth block. For simplified residual coding according to the SDC mode, a video encoder may, in some examples, not transform and/or quantize (and a video decoder may not inverse quantize and/or inverse transform) the DC residual value coded in the bitstream. In some examples, in order to determine the DC residual value encoded into the bitstream for a current intra-coded depth block, a video encoder applies a view synthesis optimization process to select a DC residual value from a candidate set of DC residual values within a range that includes a DC residual value determined for the intra-coded depth block according to the SDC mode.

A video coder configured according to some example techniques of this disclosure may code a syntax element, e.g., hevc_intra_flag, in an encoded video bitstream that indicates whether an HEVC intra prediction mode or an additional depth intra prediction mode is used to code a current intra-coded depth block. HEVC intra prediction modes may include a Planar intra prediction mode, a DC intra prediction mode, or directional intra prediction modes. Additional depth intra prediction modes may include a plurality of depth modeling modes (DMM) or a region boundary chain coding mode. In some examples, a video coder configured according to techniques of this disclosure may code another syntax element, e.g., sdc_flag, in an encoded video bitstream that indicates whether the SDC mode is performed to code the current intra-coded depth block.

In some examples, a video coder configured according to techniques of this disclosure may code these syntax elements, e.g., the hevc_intra_flag and sdc_flag, using a context adaptive binary arithmetic coding (CABAC) process. In some examples, a video coder uses a non-equal probability state as the initialized probability state for one or both of these syntax elements, e.g., the hevc_intra_flag and sdc_flag, for the CABAC process. In some examples, a video coder selects the initialized probability state for one or both of these syntax elements, e.g., the hevc_intra_flag and sdc_flag, based on a slice type of a slice that includes the current depth block. In some examples, for one or both of these syntax elements, a video coder selects the initialized probability state for a current intra-coded depth block based on the values of these syntax elements for one or more neighboring intra-coded depth blocks, while in other examples, a video coder a video coder selects the initialized probability state for a current depth block without reference to values of these syntax elements for one or more neighboring blocks.

In one example, a method of decoding video data comprises decoding information from a bitstream, the information indicating which of at least three depth intra prediction modes is used to decode a depth block. The method further comprises, for any of the at least three depth intra prediction modes, performing a simplified depth coding (SDC) mode for decoding the depth block, the SDC mode comprising decoding at least one DC residual value from the bitstream, wherein the DC residual value represents residual values of a plurality of pixels of the depth block. The method further comprises reconstructing the depth block based on the indicated depth intra prediction mode and the at least one DC residual value.

In another example, a method of encoding video data comprises encoding information into a bitstream, the information indicating which of at least three depth intra prediction modes is used to encode a depth block. The method further comprises, for any of the at least three depth intra prediction modes, performing a simplified depth coding (SDC) mode for encoding the depth block. The SDC mode comprises determining at least one DC residual value for the depth block based on the indicated one of the depth intra prediction modes, wherein the DC residual value represents residual values of a plurality of pixels of the depth block, and encoding the DC residual value into the bitstream.

In another example, a device comprises a video decoder configured to decode information from a bitstream, the information indicating which of at least three depth intra prediction modes is used to decode a depth block and, for any of the at least three depth intra prediction modes, perform a simplified depth coding (SDC) mode for decoding the depth block, the SDC mode comprising decoding at least one DC residual value from the bitstream, wherein the DC residual value represents residual values of a plurality of pixels of the depth block. The video decoder is further configured to reconstruct the depth block based on the indicated depth intra prediction mode and the at least one DC residual value.

In another example, a device comprises a video encoder configured to encode information into a bitstream, the information indicating which of at least three depth intra prediction modes is used to encode a depth block and, for any of the at least three depth intra prediction modes, perform a simplified depth coding (SDC) mode for encoding the depth block. According to the SDC mode, the video encoder is configured to determine at least one DC residual value for the depth block based on the indicated one of the depth intra prediction modes, wherein the DC residual value represents residual values of a plurality of pixels of the depth block, and encode the DC residual value into the bitstream.

In another example, a device for coding video data comprises means for coding information in a bitstream, the information indicating which of at least three depth intra prediction modes is used to code a depth block, and, for any of the at least three depth intra prediction modes, means for performing a simplified depth coding (SDC) mode for coding the depth block. The means for performing the SDC mode comprises means for coding at least one DC residual value in the bitstream, wherein the DC residual value represents residual values of a plurality of pixels of the depth block.

In another example, a computer-readable storage medium has instructions stored thereon that, when executed by one or more processors of a video coder, cause the video coder to code information in a bitstream, the information indicating which of at least three depth intra prediction modes is used to code a depth block and, for any of the at least three depth intra prediction modes, perform a simplified depth coding (SDC) mode for coding the depth block. The SDC mode comprises coding at least one DC residual value in the bitstream, wherein the DC residual value represents residual values of a plurality of pixels of the depth block.

In another example, a method of coding video data comprises coding information in a bitstream, the information indicating that one of depth modeling mode 3 or depth modeling mode 4 is used to code a depth block, and determining a partitioning pattern for the depth block based on a co-located texture block and the indicated depth modeling mode. The method further comprises partitioning the depth block into two partitions based on the partitioning pattern, and performing a simplified depth coding (SDC) mode for coding the depth block, the SDC mode comprising, for each of the partitions of the depth block, coding a respective DC residual value in the bitstream, wherein the DC residual value represents residual values of the pixels of the partition.

In another example, a method of coding video data comprises coding information in a bitstream, the information indicating that a region boundary chain coding mode is used code a depth block, coding information in the bitstream defining a plurality of chains that define a boundary between two partitions of the depth block based on the region boundary chain coding mode, and partitioning the depth block into two partitions based on the boundary. The method further comprises performing a simplified depth coding (SDC) mode for coding the depth block, the SDC mode comprising, for each of the partitions of the depth block, coding a respective DC residual value in the bitstream, wherein the DC residual value represents residual values of the pixels of the partition.

In another example, a method of coding video data comprises coding information in a bitstream, the information indicating that a DC intra prediction mode is used code a depth block, and determining respective predictor values for each of the pixels in the depth block based on the DC intra prediction mode. The method further comprises performing a simplified depth coding (SDC) mode for coding the depth block, the SDC mode comprising coding a single DC residual value in the bitstream, wherein the DC residual value is determined based on the predictor values and represents residual values of the pixels of the depth block.

In another example, a method of coding video data comprises coding information in a bitstream, the information indicating that a directional intra prediction mode is used code a depth block, and determining respective predictor values for each of the pixels in the depth block based on the directional intra prediction mode. The method further comprises performing a simplified depth coding (SDC) mode for coding the depth block, the SDC mode comprising coding a single DC residual value in the bitstream, wherein the DC residual value is determined based on the predictor values and represents residual values of the pixels of the depth block.

In another example, a method of coding video data comprises coding a first syntax element in an encoded video bitstream, wherein a first value of the first syntax element indicates that a depth intra prediction mode selected for a depth block from a plurality of depth intra prediction modes is one of a Planar intra prediction mode, DC intra prediction mode, or directional intra prediction mode, and a second value of the first syntax element indicates that the depth intra prediction mode selected for the depth block is one of a plurality of depth modeling modes or a region boundary chain coding mode. The method further comprises coding a second syntax element from the encoded video bitstream, wherein the second syntax element indicates whether to perform a simplified depth coding (SDC) mode to reconstruct the depth block, the SDC mode comprising decoding at least one DC residual value from the bitstream, wherein the DC residual value represents residual values of a plurality of samples of the depth block. The method further comprises coding the depth block according to the first and second syntax elements.

In another example, a device comprises a video coder. The video coder comprises a memory configured to store an encoded video bitstream that encodes the video data, and one or more processors. The one or more processors are configured to code a first syntax element from the encoded video bitstream, wherein a first value of the first syntax element indicates that a depth intra prediction mode selected for a depth block from a plurality of depth intra prediction modes is one of a Planar intra prediction mode, DC intra prediction mode, or directional intra prediction mode, and a second value of the first syntax element indicates that the depth intra prediction mode selected for the depth block is one of a plurality of depth modeling modes or a region boundary chain coding mode. The or more processors are configured to code a second syntax element from the encoded video bitstream, wherein the second syntax element indicates whether to perform a simplified depth coding (SDC) mode to reconstruct the depth block, the SDC mode comprising decoding at least one DC residual value from the bitstream, wherein the DC residual value represents residual values of a plurality of samples of the depth block. The one or more processors are configured to code the depth block according to the first and second syntax elements.

In another example, a method of encoding video data comprises encoding a depth block according to a depth intra prediction mode selected from a plurality of depth intra prediction modes, wherein encoding the depth block comprises performing a simplified depth coding (SDC) mode to determine at least one DC residual value for the depth block based on the indicated one of the depth intra prediction modes, wherein the DC residual value represents residual values of a plurality of samples of the depth block. The method further comprises identifying a set of candidate DC residual values within a range of DC residual values that includes the determined DC residual value, applying a view synthesis optimization process to each of the set of candidate DC residual values, and selecting one DC residual value from the set of candidate DC residual values based on the view synthesis optimization process. The method further comprises encoding the selected DC residual value into an encoded video bitstream.

In another example, a device comprises a video encoder that comprises memory configured to store an encoded video bitstream that encodes the video data, and one or more processors. The one or more processors are configured to encode a depth block according to a depth intra prediction mode selected from a plurality of depth intra prediction modes, wherein encoding the depth block comprises performing a simplified depth coding (SDC) mode to determine at least one DC residual value for the depth block based on the indicated one of the depth intra prediction modes, wherein the DC residual value represents residual values of a plurality of samples of the depth block. The one or more processors are further configured to identify a set of candidate DC residual values within a range of DC residual values that includes the determined DC residual value, apply a view synthesis optimization process to each of the set of candidate DC residual values, and select one DC residual value from the set of candidate DC residual values based on the view synthesis optimization process. The one or more processors are further configured to encode the selected DC residual value into an encoded video bitstream.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
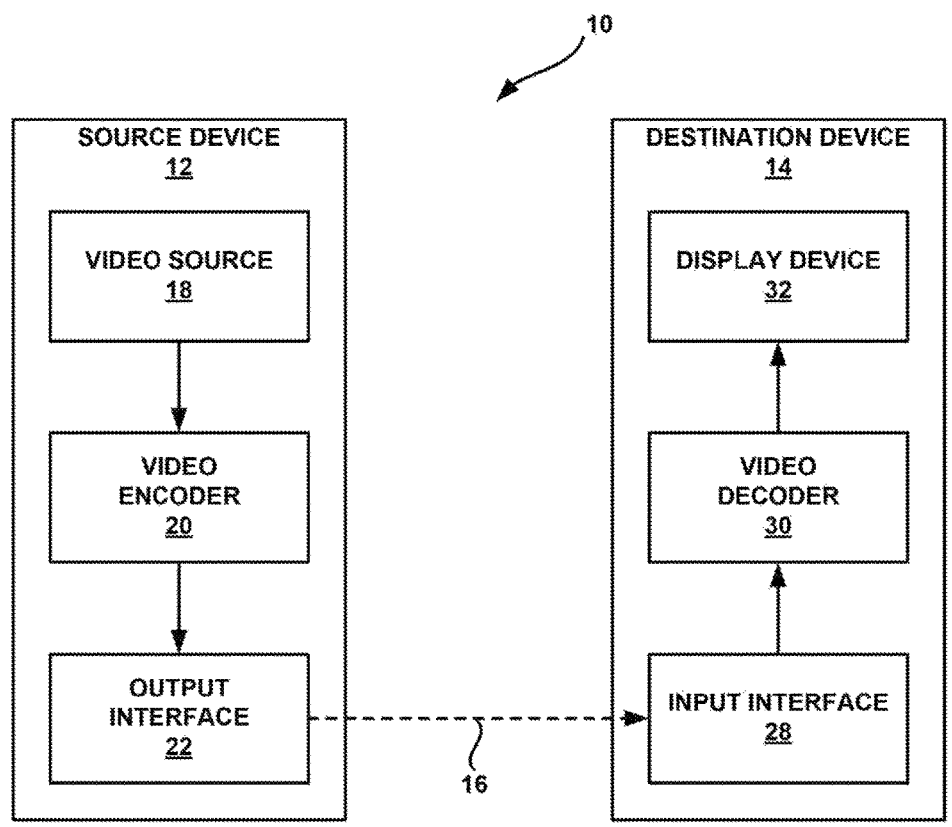
FIG. 1 is a block diagram illustrating an example video coding system that may utilize the techniques of this disclosure.

The disclosure describes techniques for intra-picture, or spatial, prediction (also referred to as "intra prediction") of video data. More particularly, the disclosure describes techniques for coding residual values derived during intra prediction coding of the depth component of 3D video data, e.g., according to a simplified depth coding (SDC) mode. The residual coding techniques described herein may be adaptively applied when coding depth components of the video data according to any of a variety of intra prediction modes for depth data, referred to herein as depth intra prediction modes. In some examples, a non-equal probability state is provided as the initialization state for context adaptive binary arithmetic coding (CABAC) of syntax elements, e.g., flags, used in signaling associated with intra depth coding modes and the SDC mode.

This disclosure describes techniques for 3D video coding based on advanced codecs, such as High Efficiency Video Coding (HEVC) codecs. The 3D coding techniques described in this disclosure include depth coding techniques related to advanced inter-coding of depth views in a multi-view-plus-depth video coding process, such as the 3D-HEVC extension to HEVC, which is presently under development.

In HEVC, assuming that the size of a coding unit (CU) is 2N×2N, a video encoder and video decoder may support various prediction unit (PU) sizes of 2N×2N or N×N for intra-prediction, and symmetric PU sizes of 2N×2N, 2N×N, N×2N, N×N, or similar for inter-prediction. A video encoder and video decoder may also support asymmetric partitioning for PU sizes of 2N×nU, 2N×nD, nL×2N, and nR×2N for inter-prediction.

For depth coding as provided in 3D-HEVC, a video encoder and video decoder may be configured to support a variety of different depth coding partition modes for intra prediction, including modes that use non-rectangular partitions. Examples of depth coding with non-rectangular partitions include Wedgelet partition-based depth coding, Contour partition-based depth coding, and region boundary chain partition-based coding. Techniques for partition-based intra-coding of non-rectangular partitions, such as wedgelet partitions or contour partitions, as examples, may be performed in conjunction with an SDC mode for coding of residual information resulting from intra prediction coding of depth data.

Video data coded using 3D video coding techniques may be rendered and displayed to produce a three-dimensional effect. As one example, two images of different views (i.e., corresponding to two camera perspectives having slightly different horizontal positions) may be displayed substantially simultaneously such that one image is seen by a viewer's left eye, and the other image is seen by the viewer's right eye.

A 3D effect may be achieved using, for example, stereoscopic displays or autostereoscopic displays. Stereoscopic displays may be used in conjunction with eyewear that filters the two images accordingly. For example, passive glasses may filter the images using polarized lenses or different colored lenses to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

The techniques of this disclosure relate to techniques for coding 3D video data by coding depth data to support 3D video. In general, the term "texture" is used to describe luminance (that is, brightness or "luma") values of an image and chrominance (that is, color or "chroma") values of the image. In some examples, a texture image may include one set of luminance data (Y) and two sets of chrominance data for blue hues (Cb) and red hues (Cr). In certain chroma formats, such as 4:2:2 or 4:2:0, the chroma data is down-sampled relative to the luma data. That is, the spatial resolution of chrominance pixels may be lower than the spatial resolution of corresponding luminance pixels, e.g., one-half or one-quarter of the luminance resolution.

Depth data generally describes depth values for corresponding texture data. For example, a depth image may include a set of depth pixels (also referred to as depth samples or depth values) that each describes depth, e.g., in a depth component of a view, for corresponding texture data, e.g., in a texture component of the view. Each sample, e.g., pixel, may have one or more texture values (e.g., luminance and chrominance), and may also have one or more depth values. A texture picture and a depth map may, but need not, have the same spatial resolution. For instance, the depth map may include more or fewer pixels than the corresponding texture picture. The depth data may be used to determine horizontal disparity for the corresponding texture data, and in some cases, vertical disparity may also be used.

A device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change.

Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth map. That is, a depth map corresponding to a texture picture describes depth data for the corresponding texture picture. Multiview video data may include data for various different views, where each view may include a respective sequence of texture components and corresponding depth components.

A picture generally corresponds to a particular temporal instance. Video data may be represented using a sequence of access units, where each access unit includes all data corresponding to a particular temporal instance. Thus, for example, for multiview video data plus depth coding, texture images from each view for a common temporal instance, plus the depth maps for each of the texture images, may all be included within a particular access unit. Hence, an access unit may include multiple views, where each view may include data for a texture component, corresponding to a texture image, and data for a depth component, corresponding to a depth map.

Each access unit may contain multiple view components or pictures. The view components for a particular view are associated with a unique view id or view order index, such that view components of different views are associated with different view ids or view order indices. A view component may include a texture view component as well as a depth view component. The texture and depth view components in the same view may have different layer ids. A texture view component may be coded as one or more texture slices, while the depth view component may be coded as one or more depth slices. Multiview-plus-depth creates a variety of coding possibilities, such as intra-picture, inter-picture, intra-view, inter-view, motion prediction, and the like.

In this manner, 3D video data may be represented using a multiview video plus depth format, in which captured or generated views include texture components associated with corresponding depth maps. Moreover, in 3D video coding, textures and depth maps may be coded and multiplexed into a 3D video bitstream. Depth maps may be coded as gray-scale images, where "luma" samples (that is, pixels) of the depth maps represent depth values.

In general, a block of depth data (a block of samples of a depth map, e.g., corresponding to pixels) may be referred to as a depth block. A depth value may be referred to as a luma value associated with a depth sample. That is, depth map may generally be treated as a monochrome texture picture, in other words, a texture picture including luminance values and no chrominance values. In any case, conventional intra- and inter-coding methods may be applied for depth map coding.

Depth maps commonly are characterized by sharp edges and constant areas, and edges in depth maps typically present strong correlations with corresponding texture data. Due to the different statistics and correlations between texture and corresponding depth, different coding schemes have been designed for depth maps based on a 2D video codec.

HEVC techniques related to this disclosure are reviewed below. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, High Efficiency Video Coding (HEVC), mentioned above, is a new and upcoming video coding standard, developed by the Joint Collaboration Team on Video Coding (JCT-VC) of ITU-T Video Coding Experts Group (VCEG) and ISO/IEC Motion Picture Experts Group (MPEG). A recent draft of the HEVC standard, JCTVC-L1003, Benjamin Bross, Woo-Jin Han, Jens-Ranier Ohm, Gary Sullivan, Ye-Kui Wang, Thomas Wiegand, "High Efficiency Video Coding (HEVC) text specification draft 10 (for FDIS & Last Call)," Document: JCTVC-L1003_v34, Joint Collaborative Team on Video Coding (JCT-VC) of ITU-T SG 16 WP 3 and ISO/IEC JTC 1/SC 29/WG 11, 12th Meeting: Geneva, CH, 14-23 Jan. 2013 ("HEVC Text Specification"), is available from the following link:
http://phenix.it-sudparis.eu/jct/doc_end_user/documents/
    12_Geneva/wg11/JCTVC-L1003-v34.zip.

In JCT-3V, two HEVC extensions, the multiview extension (MV-HEVC) and 3D video extension (3D-HEVC) are being developed. A recent version of the reference software, "3D-HTM version 9.0," for 3D-HEVC can be downloaded from the following link:
https://hevc.hhi.fraunhofer.de/svn/syn_3DVC Software/ tags/HTM-9.0/

A recent draft of the software description for 3D-HEVC, Gerhard Tech, Krzystof Wegner, Ying Chen, Sehoon Yea, "3D-HEVC Test Model 5," JCT3V-E1005, Joint Collaborative Team on 3D Video Coding Extension Development of ITU-T SG 16 WP 3 and ISO/IEC JTC 1/SC 29/WG 11, 5th Meeting: Vienna, AT, 27 Jul.-2 Aug. 2013, is available from the following link:
http://Dhenix.it-sudDaris.eu/jct2/doc_end_user/documents/
    5_Vienna/wg11/JCT3V-E1005-v1.zip A recent working draft of the 3D-HEVC specification, Gerhard Tech, Krzystof Wegner, Ying Chen, Sehoon Yea, "3D-HEVC Draft Text 1," Document: JCT3V-E1001-v3, Joint Collaborative Team on 3D Video Coding Extension Development of ITU-T SG 16 WP 3 and ISO/IEC JTC 1/SC 29/WG 11, $5^{th}$ Meeting: Vienna, AT, 27 Jul.-2 Aug. 2013 ("3D-HEVC Draft Text 1"), is available from the following link:
http://phenix.it-sudparis.eu/jct2/doc_end_user/documents/
    5_Vienna/wg11/JCT3V-E1001-v3.zip Another recent working draft of the 3D-HEVC specification, Gerhard Tech, Krzystof Wegner, Ying Chen, Sehoon Yea, "3D-HEVC Draft Text 2," Document: JCT3V-F1001-v1, Joint Collaborative Team on 3D Video Coding Extension Development of ITU-T SG 16 WP 3 and ISO/IEC JTC 1/SC 29/WG 11, $6^{th}$ Meeting: Geneva, CH, 25 Oct.-1 Nov. 2013 ("3D-HEVC Draft Text 2"), is available from the following link:
http://phenix.it-sudDaris.eu/jct2/doc_end_user/documents/
    6_Geneva/wg11/JCT3V-F1001-v1.zip In general, intra prediction coding of a depth block, e.g., according to the HEVC intra prediction modes, such as the Planar, DC, and directional intra prediction modes, represents each pixel of a depth block with a respective residual value. Simplified residual coding according to an SDC mode, on the other hand, represents the pixel-specific residual values with one or more DC residual values. Each of the one or more DC residual values represents a plurality of pixel-specific residual values, and can be used by a video decoder to reconstruct a plurality of depth pixel values of the depth block. For simplified residual coding according to the SDC mode, a video encoder may, in some examples, not transform and/or quantize (and a video decoder may not inverse quantize and/or inverse transform) the DC residual value coded in the bitstream, or any other residual data associated with the depth block.

For example, a video encoder may generate a predicted block for the depth block using an intra prediction mode. The video encoder may then calculate a residual block for the depth block, such that the residual block includes pixel-by-pixel differences between the predicted block and the actual values for the depth block or partition. Then, the video encoder may calculate a DC residual value from an average of the residual values of the residual block. To reconstruct the depth block, a video decoder may form a residual block including pixel values that are each equal to the DC residual value, generate a predicted block using the intra-prediction mode, and combine the predicted block with the residual block, pixel-by-pixel, to form the reconstructed depth block.

In other examples, a video encoder may generate a predicted block for the depth block using an intra prediction mode. The video encoder may then calculate a DC predictor value for the depth block based on a subset of the value of the predicted block. The video encoder may also determine a DC depth value of the depth block, e.g., an average value. The video encoder may determine a single DC residual value of the depth block as a difference between the DC depth value and the DC predictor value for the depth block. To reconstruct the depth block, a video decoder may form a residual block including pixel values that are each equal to the DC residual value, generate a predicted block using the intra-prediction mode, and combine the predicted block with the residual block, pixel-by-pixel, to form the reconstructed depth block A video coder, e.g., a video encoder or a video decoder, configured according to the techniques of this disclosure may perform an SDC mode to code a depth block according to any of a variety of, e.g., at least three, depth intra prediction modes. The at least three depth intra prediction modes may include non-partition-based (e.g., HEVC) intra prediction modes, such as a DC mode, Planar mode, or any of the plurality of directional intra prediction modes. In such examples, the video coder may code a single DC residual value for the depth block.

The at least three depth intra prediction modes may additionally or alternatively include partition-based (e.g., 3D-HEVC) intra prediction modes. For example, the at least three depth intra prediction modes may include depth modeling mode (DMM) 1, DMM 3, DMM 4, or a region boundary chain coding mode. In such examples, the video coder may partition the depth block according to the partition-based depth intra prediction mode, and code respective DC residual values for each partition.

A video coder configured according to the techniques of this disclosure may also perform a variety of techniques for facilitating broad application of an SDC mode to a variety of depth intra prediction modes. For example, a video coder configured according to the techniques of this disclosure may perform techniques for coding, e.g., encoding or decoding, information in a bitstream indicating whether a non-partition-based intra prediction mode, e.g., an HEVC intra prediction mode, or a partition-based intra prediction mode is used to code a depth block, and information indicating which depth intra prediction mode, e.g., which DC, Planar, directional, DMM, or region boundary chain coding mode is used to code the depth block. As another example, a video coder configured according to the techniques of this disclosure may perform techniques for coding, e.g., encoding or decoding, information in a bitstream indicating whether the SDC mode and simplified residual coding according to the techniques of this disclosure are used with the indicated depth intra prediction coding mode, or whether residual values will be coded in a different manner.

A video coder configured according to some example techniques of this disclosure may code a syntax element, e.g., hevc_intra_flag, in an encoded video bitstream that indicates whether a non-partition based, e.g., HEVC, intra prediction mode or a partition-based depth intra prediction mode is to be used to decode a current intra-coded depth block. In some examples, a video coder configured according to techniques of this disclosure may code another syntax element, e.g., sdc_flag, in an encoded video bitstream that indicates whether the SDC mode is to be performed to decode the current intra-coded depth block. In some examples, a video coder configured according to techniques of this disclosure may code these syntax elements using a context adaptive binary arithmetic coding (CABAC) process. In some examples, a video coder uses a non-equal probability state as the initialized probability state for one or both of these syntax elements for the CABAC process. In some examples, a video coder selects the initialized probability state for one or both of these syntax elements based on a slice type of a slice that includes the current depth block. In some examples, for one or both of these syntax elements, a video coder selects the initialized probability state for a current depth block based on the values of these syntax elements for one or more neighboring blocks, while in other examples, a video coder a video coder selects the initialized probability state for a current depth block without reference to values of these syntax elements for one or more neighboring blocks.

As indicated above, according to some example techniques of this disclosure, a video coder codes one or more DC residual values that represent a current intra-coded depth block according to an SDC mode. In some examples, in order to determine the DC residual value encoded into the bitstream for a current intra-coded depth block, a video encoder applies a view synthesis optimization process to select a DC residual value from a candidate set of DC residual values within a range that includes a DC residual value determined for the current intra-coded depth block according to the SDC mode. In some examples, a video encoder determines the range of DC residual values by applying one or more integer offsets to a DC residual value determined for a current intra-coded depth block according to the SDC mode.

FIG. 1 is a block diagram illustrating an example video encoding and decoding system 10 that may utilize various techniques of this disclosure for simplified residual coding for depth intra prediction modes. In some examples, video encoder 20 and video decoder 30 may be configured to perform various functions for partition-based (e.g., 3D-HEVC) or non-partition-based (e.g., HEVC) intra-coding of depth data with simplified depth coding of residual information for 3D video coding.

As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a computer-readable storage medium, i.e., a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply techniques for partition-based depth coding with non-rectangular partitions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for simplified residual coding for depth intra prediction modes may be performed by any digital video encoding and/or decoding device. Although generally the techniques of this disclosure are performed by a video encoder 20 and/or video decoder 30, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer generated video. In some cases, if video source 18 is a video camera, source device 12 and destination device 14 may form so-called smart phones, tablet computers or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or data storage media (that is, non-transitory storage media). In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers or in payloads of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, a projection device, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, as one example, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the HEVC standard and, more particularly, the 3D-HEVC extension of the HEVC standard, as referenced in this disclosure. HEVC presumes several additional capabilities of video coding devices relative to devices configured to perform coding according to other processes, such as, e.g., ITU-T H.264/AVC. For example, whereas H.264 provides nine intra-prediction encoding modes, the HM may provide as many as thirty-five intra-prediction encoding modes.

In general, HEVC specifies that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. Four sub-CUs of a leaf-CU may also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in HEVC has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape, or include partitions that are non-rectangular in shape, in the case of depth coding as described in this disclosure. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving reference samples for the PU. The reference samples may be pixels from a reference block. In some examples, the reference samples may be obtained from a reference block, or generated, e.g., by interpolation or other techniques. A PU also includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to a leaf-CU and leaf-TU, respectively, unless noted otherwise.

A video sequence typically includes a series of pictures. As described herein, "picture" and "frame" may be used interchangeably. That is, a picture containing video data may be referred to as a video frame, or simply a "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, HEVC supports prediction in various PU sizes. Assuming that the size of a particular CU is 2N×2N, HEVC supports intra prediction in PU sizes of 2N×2N or N×N, and inter prediction in symmetric PU sizes of 2N×2N, 2N×N, N×2N, or N×N. A PU having a size of 2N×2N represents an undivided CU, as it is the same size as the CU in which it resides. In other words, a 2N×2N PU is the same size as its CU. The HM also supports asymmetric partitioning for inter prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra predictive or inter predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video encoder 20 and/or video decoder 30 may intra-picture prediction code depth data. In addition, in accordance with examples of this disclosure, video encoder 20 and/or video decoder 30 may perform a simplified coding of residual data resulting from depth intra prediction coding of video data according to any of a variety of modes, as will be described. More specifically, a video encoder 20 and/or video decoder 30 configured according to the techniques of this disclosure may utilize simplified residual coding, e.g., as used for certain depth intra prediction modes according to existing proposals for 3D-HEVC, for additional partition-based depth intra prediction modes. Additionally, a video encoder 20 and/or video decoder 30 configured according to the techniques of this disclosure may utilize simplified residual coding for coding residual data resulting from intra predication of depth data according to a variety of non-partition-based intra prediction modes, e.g., according to the intra prediction modes provided in the base HEVC specification.

Figure 2:
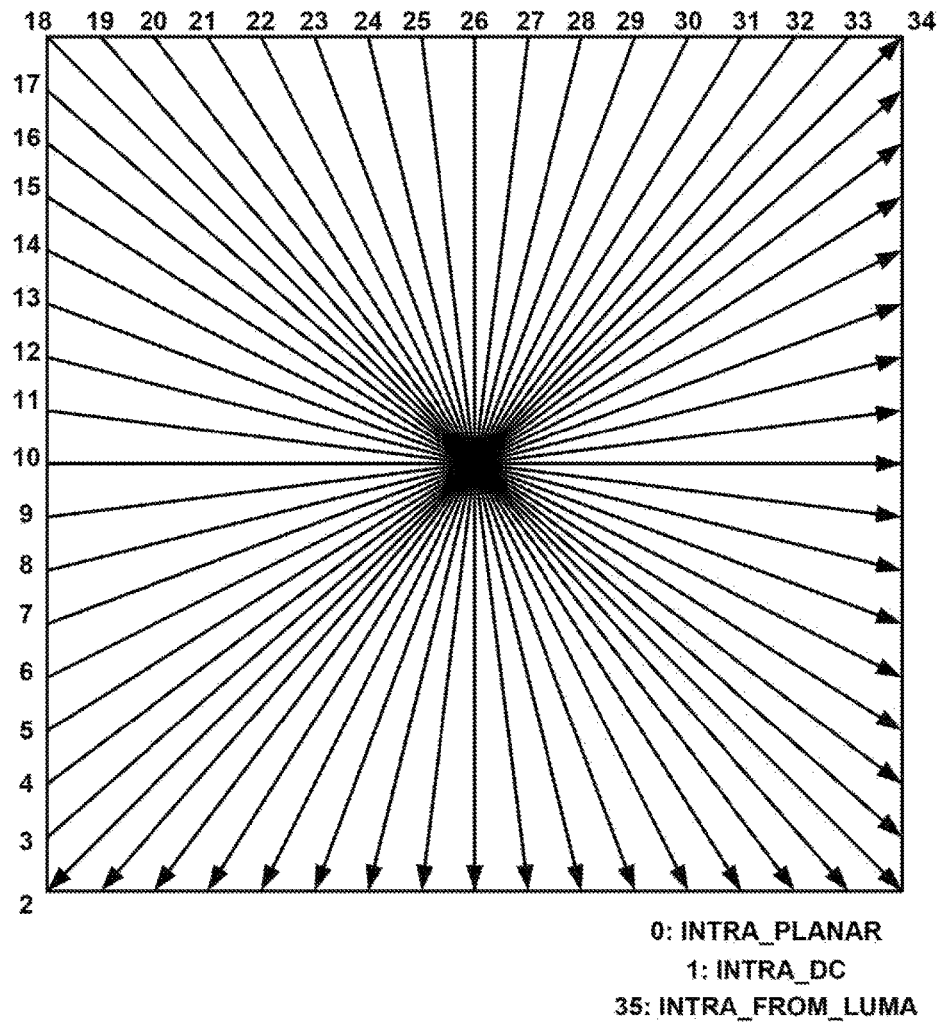
FIG. 2 is a diagram illustrating intra prediction modes used in high efficiency video coding (HEVC).

FIG. 2 is a diagram illustrating intra prediction modes used in HEVC. FIG. 2 generally illustrates the prediction directions associated with various directional intra-prediction modes available for intra-coding in HEVC. In the current HEVC standard, for intra prediction of the luma component of each Prediction Unit (PU), an intra prediction method is utilized with a selected one of 33 angular prediction modes (indexed from 2 to 34), DC mode (indexed with 1) and Planar mode (indexed with 0), as shown in FIG. 2.

According to the Planar mode (indexed with 0), prediction is performed using a so-called "plane" function to determine predictor values for each of the pixels within a block of video data, e.g., PU. According to the DC mode (indexed with 1), prediction is performed using an averaging of pixel values within the block to determine predictor values for each of the pixels within the block. According to a directional prediction mode, prediction is performed based on a neighboring block's reconstructed pixels along a particular direction (as indicated by the mode). In general, the tail end of the arrows shown in FIG. 2 represents a relative one of neighboring pixels from which a value is retrieved, while the head of the arrows represents the direction in which the retrieved value is propagated to form a predictive block.

For HEVC intra prediction modes, video encoder 20 and/or video decoder 30 generate a pixel specific predictor value for each pixel in the PU using the various modes discussed above, e.g., by using neighboring samples of the PU for modes 2 to 34. Video encoder 20 determines residual values for the video block based on the differences between the actual depth values and the predictor values for the pixels of the block, and provides the residual values to video decoder 30. According to HEVC WD10, video encoder 20 transforms the residual values and quantizes the transform coefficients, and may also entropy encode the quantized transform coefficients. Video decoder 30 (e.g., after entropy decoding, inverse quantizing, and inverse transforming) determines reconstructed values for the pixels of the block by adding the residual values to the predictor values. Further details regarding HEVC intra prediction modes are specified in sub-clause 8.4.2 of HEVC WD10.

3D-HEVC will now be described in further detail. A Joint Collaboration Team on 3D Video Coding (JCT-3V) of VCEG and MPEG is developing a 3D video (3DV) standard based on HEVC, for which part of the standardization efforts includes the standardization of the multiview video codec based on HEVC (MV-HEVC) and another part for 3D Video coding based on HEVC (3D-HEVC), mentioned above. For 3D-HEVC, new coding tools, including those in coding unit (CU)/prediction unit (PU) level, for both texture and depth views may be included and supported. Currently, the HEVC-based 3D Video Coding (3D-HEVC) codec in MPEG is based on the solutions proposed in documents m22570 and m22571. The full citation for m22570 is: Schwarz et al., Description of 3D Video Coding Technology Proposal by Fraunhofer HHI (HEVC compatible configuration A), MPEG Meeting ISO/IEC JTC1/SC29/WG11, Doc. MPEG11/M22570, Geneva, Switzerland, November/December 2011. The full citation for m22571 is: Schwarz et al., Description of 3D Video Technology Proposal by Fraunhofer HHI (HEVC compatible; configuration B), MPEG Meeting—ISO/IEC JTC1/SC29/WG11, Doc. MPEG11/M22571, Geneva, Switzerland, November/December 2011.

In 3D-HEVC, each access unit contains multiple view components, each of which contains a unique view id, or view order index, or layer id. A view component contains a texture view component as well as a depth view component, as described above. A texture view component is coded as one or more texture slices, while the depth view component is coded as one or more depth slices.

When 3D video data is represented using the multiview video plus depth format, texture view components are associated with corresponding depth view components, which are coded and multiplexed in a 3D video bitstream by video encoder 20. Video encoder 20 and/or video decoder 30 code the depth maps in the depth view components as grayscale luma samples to represent the depth values, and may use conventional intra- and inter-coding methods for depth map coding. Depth maps are characterized by sharp edges and constant areas. Accordingly, due to the different statistics of depth map samples, different coding schemes have been designed for coding of depth maps by video encoder 20 and/or video decoder 30, based on a 2D video codec.

In 3D-HEVC, the same definition of intra prediction modes as in HEVC may be utilized for intra prediction coding of depth components, e.g., for depth intra prediction. Additionally, in 3D-HEVC, Depth Modeling Modes (DMMs) are introduced together with the HEVC intra prediction modes, e.g., as described above with reference to FIG. 2, to intra prediction code depth components. The DMM method is integrated as an alternative to the intra prediction modes specified in HEVC. A one-bit flag, e.g., hevc_intra_flag, may be signaled for each depth block, e.g., PU, to specify whether DMM or unified (HEVC) intra prediction is applied.

For better representations of sharp edges in depth maps, the current reference software for 3D-HEVC (HTM 9.0)

enables application of DMMs for intra coding of depth maps. Accordingly, in 3D-HEVC, video encoder 20 and/or video decoder 30 may use DMMs to code a PU of a depth slice. In some instances, four DMMs may be available for intra-coding depth data. In all four modes, video encoder 20 and/or video decoder 30 partitions a depth block, e.g., PU, into more than one region, e.g., two regions, as specified by a DMM pattern. Video encoder 20 and/or video decoder 30 then generates a predicted depth value for each region, which may be referred to as a constant or "DC" predicted depth value, that is based on the values of neighboring depth samples.

The DMM pattern may be explicitly signaled, predicted from spatially neighboring depth blocks, and/or predicted from a co-located texture block. For example, a first DMM (e.g., DMM mode 1) may include signaling starting and/or ending points of a partition boundary of a depth block. A second DMM (e.g., DMM mode 2) may include predicting partition boundaries of a depth block based on a spatially neighboring depth block. Third and fourth DMMs (e.g., DMM mode 3 and DMM mode 4) may include predicting partition boundaries of a depth block based on a co-located texture block of the depth block.

With four DMMs available, there may be signaling associated with each of the four DMMs (e.g., DMM modes 1-4). For example, video encoder 20 may select a DMM to code a depth PU based on a rate-distortion optimization. Video encoder 20 may provide an indication of the selected DMM in an encoded bitstream with the encoded depth data. Video decoder 30 may parse the indication from the bitstream to determine the appropriate DMM for decoding the depth data. In some instances, a fixed length code may be used to indicate a selected DMM. In addition, the fixed length code may also indicate whether a prediction offset (associated with a predicted DC value) is applied.

Figure 3:
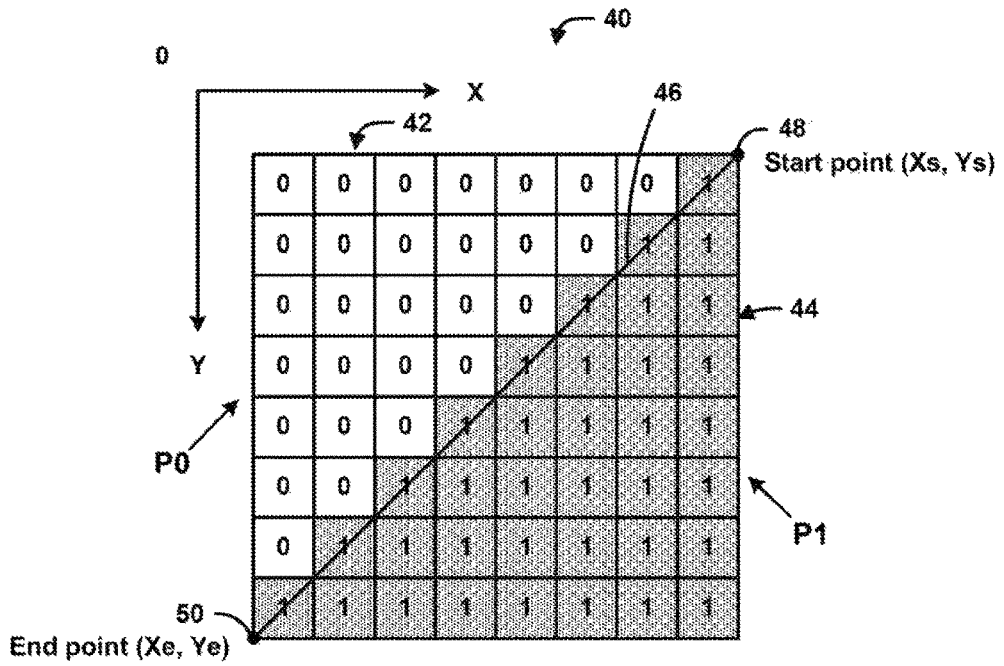
FIG. 3 is a diagram illustrating an example of one wedgelet partition pattern for use in coding an 8×8 block of pixel samples.
Figure 4:
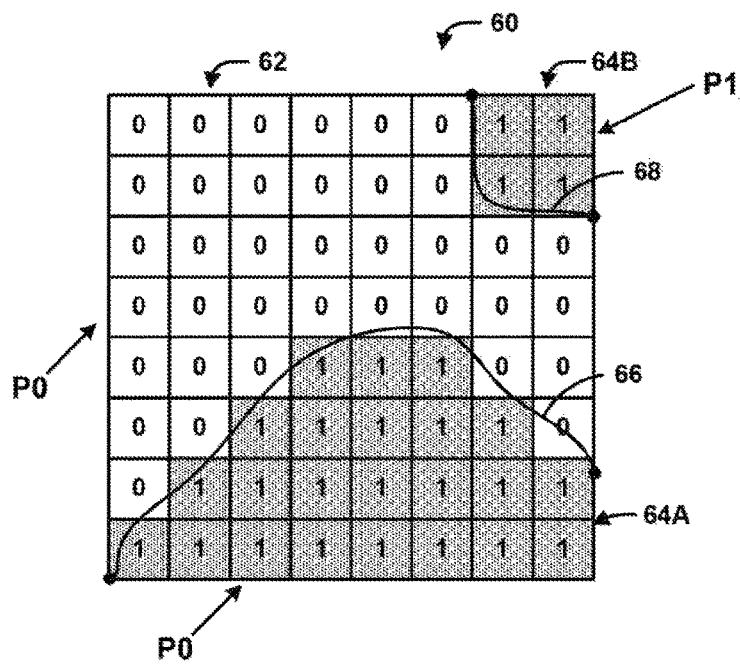
FIG. 4 is a diagram illustrating an example of one contour partition pattern for use in coding an 8×8 block of pixel samples.

There are two types of partitioning models defined in the DMM, including Wedgelet partitioning and Contour partitioning. FIG. 3 is a diagram illustrating an example of a Wedgelet partition pattern for use in coding an 8×8 block of pixel samples. FIG. 4 is a diagram illustrating an example of a contour partition pattern for use in coding an 8×8 block of pixel samples.

Hence, as one example, FIG. 3 provides an illustration of a Wedgelet pattern for an 8×8 block. For a Wedgelet partition, a depth block, e.g., PU, is partitioned into two regions by a straight line, with a start point located at (Xs, Ys) and an end point located at (Xe, Ye), as illustrated in FIG. 3, where the two regions are labeled with $P_0$ and $P_1$. Each pattern consists of an array of size uB×vB binary digit labeling whether the corresponding sample belongs to region P0 or P1 where uB and vB represents the horizontal and vertical size of the current PU respectively. The regions P0 and P1 are represented in FIG. 3 by white and shaded samples, respectively. The Wedgelet patterns are initialized at the beginning of both encoding and decoding.

FIG. 4 shows a contour pattern for an 8×8 block. For a Contour partitioning, a depth block can be partitioned into two irregular regions, as shown in FIG. 4. The contour partitioning is more flexible than the Wedgelet partitioning, but difficult to be explicitly signaled. In DMM mode 4, a contour partitioning pattern is implicitly derived using reconstructed luma samples of the co-located texture block.

With reference to FIGS. 3 and 4, each individual square within depth blocks 40 and 60 represents a respective individual pixel of depth blocks 40 and 60, respectively. Numeric values within the squares represent whether the corresponding pixel belongs to region 42 (value "0" in the example of FIG. 3) or region 44 (value "1" in the example of FIG. 3). Shading is also used in FIG. 3 to indicate whether a pixel belongs to region 42 (white squares) or region 44 (grey shaded squares).

As discussed above, each pattern (that is, both Wedgelet and Contour) may be defined by an array of size uB×vB binary digit labeling of whether the corresponding sample (that is, pixel) belongs to region P0 or P1 (where P0 corresponds to region 42 in FIG. 3 and region 62 in FIG. 4, and P1 corresponds to region 44 in FIG. 3 and region 64A, 64B in FIG. 4), where uB and vB represent the horizontal and vertical size of the current PU, respectively. In the examples of FIG. 3 and FIG. 4, the PU corresponds to blocks 40 and 60, respectively. Video coders, such as video encoder 20 and video decoder 30, may initialize Wedgelet patterns at the beginning of coding, e.g., the beginning of encoding or the beginning of decoding.

As shown in the example of FIG. 3, for a Wedgelet partition, depth block 40 is partitioned into two regions, region 42 and region 44, by straight line 46, with start point 48 located at (Xs, Ys) and end point 50 located at (Xe, Ye). In the example of FIG. 3, start point 48 may be defined as point (8, 0) and end point 50 may be defined as point (0, 8).

As shown in the example of FIG. 4, for Contour partitioning, a depth block, such as depth block 60, can be partitioned into two irregularly-shaped regions. In the example of FIG. 4, depth block 60 is partitioned into region 62 and region 64A, 64B using contour partitioning. Although pixels in region 64A are not immediately adjacent to pixels in region 64B, regions 64A and 64B may be defined to form one single region, for the purposes of predicting a PU of depth block 60. Contour partitioning may be more flexible than the Wedgelet partitioning, but may be relatively more difficult to signal. In DMM mode 4, in the case of 3D-HEVC, the contour partitioning pattern is implicitly derived using reconstructed luma samples of the co-located texture block.

In this manner, a video coder, such as video encoder 20 and video decoder 30 of FIG. 1, and FIGS. 7 and 8 described below, may use line 46, as defined by start point 48 and end point 50, to determine whether a pixel of depth block 40 belongs to region 42 (which may also be referred to as region "P0") or to region 44 (which may also be referred to as region "P1"), as shown in FIG. 3. Likewise, in some examples, a video coder may use lines 66, 68 of FIG. 4 to determine whether a pixel of depth block 60 belongs to region 64A (which may also be referred to as region "P0") or to region 64B (which may also be referred to as region "P1"). Regions "P0" and "P1" are default naming conventions for different regions partitioned according to DMM, and thus, region P0 of depth block 40 would not be considered the same region as region P0 of depth block 60.

Region boundary chain coding is another partition-based depth intra prediction mode for coding depth blocks, e.g., depth PUs, in 3D-HEVC. Region boundary chain coding mode is introduced together with the HEVC intra prediction modes and DMM modes to code an intra prediction unit of a depth slice. For brevity, "region boundary chain coding mode" is denoted by "chain coding" for simplicity in the texts, tables and figures described below.

Figure 5:
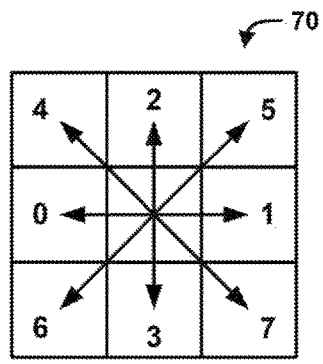
FIG. 5 is a diagram illustrating eight possible types of chains defined in a region boundary chain coding process.
Figure 6:
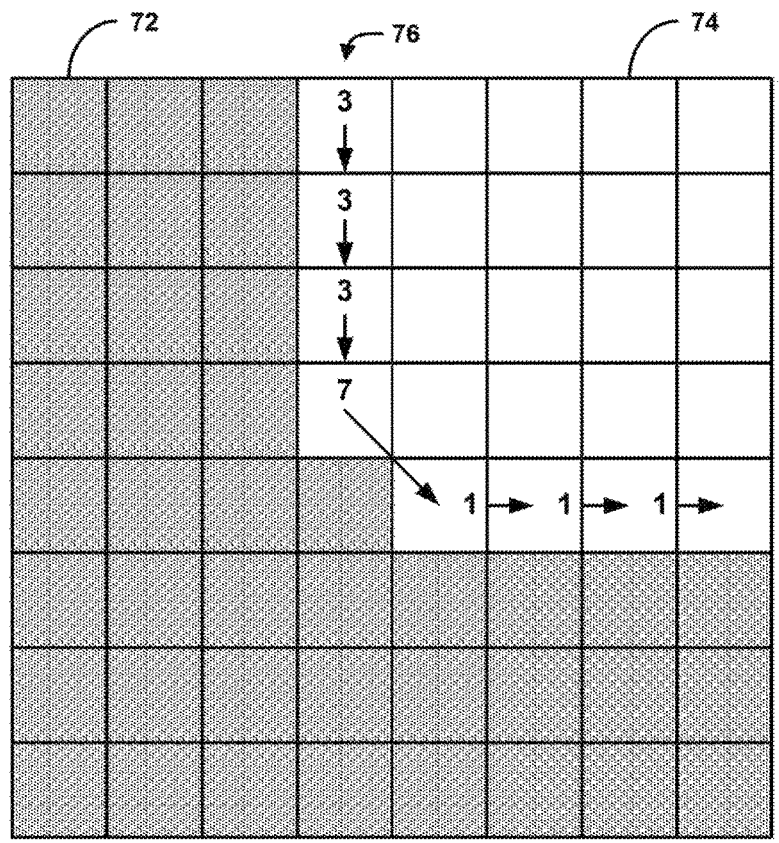
FIG. 6 is a diagram illustrating a region boundary chain coding mode with one depth prediction unit (PU) partition pattern and the coded chains in chain coding.

A chain coding of a PU is signaled with a starting position of the chain, the number of the chain codes and for each chain code, a direction index. A chain is a connection between a sample and one of its eight-connectivity samples. FIG. 5 illustrates eight possible types of chains defined in a chain coding process. FIG. 6 illustrates region boundary chain coding mode with one depth prediction unit (PU)

partition pattern and the coded chains in chain coding. One example of the chain coding process is illustrated in FIGS. 5 and 6. As shown in FIG. 5, there are eight different types of chain, each assigned with a direction index ranging from 0 to 7. A chain is a connection between a sample and one of its eight-connectivity samples.

To signal the arbitrary partition pattern shown in FIG. 6, a video encoder identifies the partition pattern and encodes the following information in the bitstream:
1. One bit "0" is encoded to signal that the chains start from the top boundary
2. Three bits "011" are encoded to signal the starting position "3" at the top boundary
3. Four bits "0110" are encoded to signal the total number of chains as 7
4. A series of connected chains indexes "3, 3, 3, 7, 1, 1, 1" are encoded, where each chain index is converted to a code word using a lookup-table.

As shown in block 70 of FIG. 5, there are 8 different types of chain, each assigned with a direction index ranging from 0 to 7. The chain direction types may aid a video coder in determining partitions of a depth block. Note, that instead of directly coding the direction index (0 . . . 7), differential coding may be applied for signaling the direction index.

The example of FIG. 6 includes a first partition 72 and a second partition 74 separated by a chain 76 that indicates the partitioning structure and the boundary between partitions. A video encoder (such as video encoder 20) may determine and signal chain 76 for a PU in an encoded bitstream, while a video decoder (such as video decoder 30) may parse data representing chain 76 from an encoded bitstream.

In general, chain 76 includes a starting position, an indication of a number of links in the chain (e.g., a number of chain codes), and for each chain code, a direction index. To signal the arbitrary partition pattern shown in the example of FIG. 6, video encoder 20 may encode one bit (e.g., 0) to indicate that chain 76 begins from the top boundary. Video encoder 20 may encode three bits (e.g., 011) to indicate that chain 76 begins after the third depth sample of the top boundary. Video encoder 20 may encode four bits (e.g., 0110) to indicate that there are 7 total links in chain 76. Video encoder 20 may also encode a series of connected chains indexes (e.g., 3, 3, 3, 7, 1, 1, 1) to indicate the direction of each chain link (e.g., in accordance with block 70). In some examples, video encoder 20 may convert each index to a code word using a lookup-table. A video decoder, such as video decoder 30, may parse the signaling described above to determine the partitioning pattern of a block. Video decoder 30 may then decode depth values for each partition.

For application of the HEVC intra prediction modes to a depth block, e.g., PU, a pixel specific predictor value is generated for each pixel in the block by using neighboring samples of the block, e.g., as specified in sub-clause 8.4.2 in HEVC WD 10. For the various 3D-HEVC depth intra modes discussed above, e.g., DMM and chain coding, video encoder 20 and/or video decoder 30 calculates a partition specific DC predictor for each partition within the depth block, e.g., PU, by using up to two neighboring samples of the depth block, e.g., reconstructed samples of a left or upper neighboring depth block. One example technique for calculating a partition specific DC predictor for each partition of a depth PU that may be employed by a video coder is as follows:

Let bPattern[x][y] be the partition pattern of the PU, where x=0 . . . N−1, y=0 . . . N−1 and N is the width of the PU. bPattern[x][y] indicates to which partition a particular pixel (x, y) belongs to and bPattern[x][y] can be equal to 0 or 1. Let BitDepth be the bit depth of depth samples and let RecSample[x][y] be the reconstructed neighboring samples of the PU, with x=−1 and y=0 . . . N−1 (corresponds to left neighboring pixels of the PU) or y=−1, x=0 . . . N−1 (corresponds to above neighboring pixels of the PU). Then, DC predictor of partition X, namely DCPred[X], with X=0 or 1 may be derived as follows:

Set bT=(bPattern[0][0]!=bPattern[N−1][0])?1:0
Set bL=(bPattern[0][0]!=bPattern[0][N−1])?1:0
If bT equals bL
    DCPred[X]=(RecSample[−1][0]+RecSample[0][−1])>>1
    DCPred[1−X]=bL?(RecSample[−1][N−1]+RecSample[N−1][−1])>>1:$2^{Bit\text{-}Depth-1}$
Otherwise
    DCPred[X]=bL?RecSample[(N−1)>>1][−1]: RecSample[−1][(N−1)>>1]
    DCPred[1−X]=bL?RecSample[−1][N−1]: RecSample[N−1][−1]

According to 3D-HEVC, a video encoder 20 and/or video decoder 30 may also apply a simplified depth coding (SDC) mode, which is introduced in 3D-HEVC together with the HEVC intra prediction modes, DMM modes and chain coding mode, to code an intra PU of a depth slice. More particularly, the video encoder 20 and/or video decoder 30 may apply the SDC mode to code residual data for the depth block. For 3D-HEVC, video encoder 20 signals an additional flag for each intra depth PU to specify whether the current PU is coded using SDC modes. In existing proposals for 3D-HEVC, SDC is only applied for a 2N×2N PU partition size, and is not applied for PU partition sizes of less than 2N×2N. Additionally, in existing proposals for 3D-HEVC, SDC is only applied for two types of partitioning of the depth PU, i.e., DMM mode 1 (2 partitions) and Planar (1 partition, i.e., not partitioned).

When SDC is used, video encoder 20 does not include individual residual values for all samples in a depth block, and does not generate quantized transform coefficients. Instead of coding quantized transform coefficients, in SDC modes, video encoder 20 represents a depth block with the following types of information:
1. The type of partition of the current depth block, including:
    a. DMM mode 1 (2 partitions), and
    b. Planar (1 partition); and
2. For each partition, a single residual value (in the pixel domain) is signaled in the bitstream.

Hence, in SDC, video encoder 20 encodes only one residual for each PU, or each partition of a PU of an intra-coded depth CU. For each PU or partition of a PU, instead of encoding the differences for each pixel, video encoder 20 determines a difference between a DC or representative value of the original signal (e.g., an average value of the pixels in the PU or partition, denoted Aver) and a prediction signal or predictor, denoted Pred, generated based on one or more neighboring samples from the current PU (e.g., an average value of the neighboring samples), and uses this difference as the DC residual for all pixels in the PU or partition. Video encoder 20 may then signal or encode this DC residual value for the PU or partition for receipt or decoding by video decoder 30.

For 3D-HEVC, two sub-modes are defined in SDC including SDC mode 1 and SDC mode 2, which correspond to the partition types of Planar and DMM mode 1. In SDC, as mentioned above, no transform or quantization is applied by video encoder 20. Likewise, in SDC, video decoder 30 does not apply inverse quantization or inverse transform operations.

Depth values can be optionally mapped to indexes using a Depth Lookup Table (DLT), which a video encoder 20 may construct by analyzing the frames within a first intra period before encoding a full video sequence. In existing proposals for 3D-HEVC, all of the valid depth values are sorted in ascending order and inserted into the DLT with increasing indexes. According to existing proposals for 3D-HEVC, if DLT is used, the entire DLT is transmitted by video encoder 20 to video decoder 30 in a parameter set, such as a sequence parameter set (SPS) or video parameter set (VPS), and decoded index difference values are mapped back to depth values by video decoder 30 based on the DLT. With the use of DLT, further coding gain is observed.

DLT is an optional coding tool. According to HTM 9.0, video encoder 20 will not use DLT if more than half the values from 0 to MAX_DEPTH_VALUE (e.g., 255 for 8-bit depth samples) appear in the original depth map at the analysis step. Otherwise, a video coder will code the DLT in an SPS or VPS. In order to code DLT, the video coder codes the number of valid depth values with Exp-Golomb code. Then, the video coder codes each valid depth value with an Exp-Golomb code.

For generating a DLT, video encoder 20 may read a pre-defined number of frames from the input video sequence to be encoded, and scans all samples for available depth map values. During this process, video encoder 20 generates a mapping table that maps depth values to valid depth values based on the original uncompressed depth map.

The Depth Lookup Table Idx2Depth(.), the Index Lookup TableDepth2Idx(.), the Depth Mapping Table M(.) and the number of valid depth values $d_{valid}$ are derived by the following algorithm, that analyses the depth map $D_t$.

1. Initialization
   boolean vector B(d)=FALSE for all depth values d
   index counter t=0
2. Process each pixel position p in $D_t$ for multiple time instances t:
   Set B($D_t$(p))=TRUE to mark valid depth values
3. Count number of TRUE values in B(d)→$d_{valid}$
4. For each d with B(d)==TRUE:
   Set Idx2Depth(i)=d
   Set M(d)=d
   Set Depth2Idx(d)=i
   i=i+1
5. For each d with B(d)==FALSE:
   Find d̂=argmin|d−d| and B(r)==TRUE
   Set M(d)=d̂
   Set Depth2Idx(d)=Depth2Idx(d̂)

Mapping from an index Idx back to a depth value d is as follows: d=Idx2Depth [Idx]. Mapping from a depth value d to an index Idx is as follows: Idx=Depth2Idx [d].

For the signaling of DC residual values in SDC modes, as described above, for each partition, or for the entire depth block in the case of no partitioning, video encoder 20 signals a DC residual value in the encoded bitstream without transform and quantization. The DC residual value may be the difference between a DC (representative) value of the depth pixel values within the depth block or partition thereof (e.g., Aver for average value) and a DC predictor value (Pred). It should be noted that the residual may be signaled by video encoder 20 using two different methods depending on the usage of DLT:

1. When DLT is not used, the video encoder 20 directly transmits or encodes into the bitstream the DC residual value, e.g., the delta between the representative value or DC value of a current depth block or partition thereof (Aver) in current PU form and its DC predictor value (Pred).
2. When DLT is used, instead of directly signaling or coding the residual value, i.e., the difference of depth values, video encoder 20 signals or codes the difference of the indices to the DLT, i.e., the difference between the index of the representative value (e.g., Aver) of the current partition and the index of the predictor (Pred) in the DLT. Video decoder 30 maps the sum of decoded index difference and the index of Pred back to depth values based on the DLT.

In some examples, when the value of the representative value (e.g., Aver) of the current partition or the value of the predictor (Pred) is not included in the DLT, a video coder may map the value to an index I, wherein the absolute value of (Pred/Aver—the value of the i-th entry in the DLT) is the minimum one.

There are problems with existing proposals for SDC. For example, according to existing proposals for 3D-HEVC, SDC is only applied for certain depth intra prediction modes and, more particularly, DMM mode 1 and Planar mode. Accordingly, the benefits of simplified residual coding, which is part of SDC, cannot be achieved in other depth intra modes, such as DMM mode 3, DMM mode 4, the chain coding mode, or the other HEVC intra modes (other than Planar mode). Such benefits may include increased coding efficiency.

This disclosure describes techniques that may address the problems with existing proposals for SDC. For example, this disclosure describes techniques for simplified residual coding that may be applicable to a broader set of possible depth intra prediction modes than has been proposed for SDC in 3D-HEVC. In this manner, the benefits of simplified residual coding, such as greater coding efficiency, may be achieved for depth blocks coded according to a broader variety of depth intra coding modes.

According to some example techniques of this disclosure, when intra prediction coding a depth block according to any of at least three depth intra prediction modes, a video coder may perform an SDC mode, and apply simplified residual coding. The video coder may accordingly code, e.g., encode or decode, a single DC residual value for a depth block, or respective DC residual values for partitions of the depth block. The three or more depth intra prediction modes include one or more depth intra prediction modes other than DMM 1 and Planar. In some examples, the video coder skips both transform and quantization of the residual value (or inverse quantization and inverse transform). In some examples, no additional residual is produced, i.e., the transform tree is not present in the 3D codec based on HEVC.

For example, a video coder configured according to the techniques of this disclosure may partition a depth block according to DMM 3, DMM 4, or the chain coding mode, and perform the SDC mode to determine two DC residual values for each of the two partitions of a depth block. For simplified residual coding in such examples, video encoder 20 encodes, and video decoder 30 decodes, one DC residual value for each partition of the PU.

In some examples, a video coder configured according to the techniques of this disclosure may determine pixel-specific predictor values for each pixel of a depth block according to one of the non-partitioning-based HEVC intra prediction modes, such as DC mode and directional modes 2 to 34. A depth block, e.g., PU, coded with such HEVC intra prediction modes has one partition, i.e., all pixels within the PU are in the same partition. For simplified residual coding in such examples, video encoder 20 encodes, and video decoder 30 decodes, one DC residual value for the depth block. Video encoder 20 may determine the DC residual value based on a DC depth value representative of the depth pixel values of the depth block, e.g., an average of the depth pixel values of the depth block, and a DC value representative of the pixel-specific predictor values. Video decoder 30 may reconstruct the depth block by, for each pixel, summing the DC residual value with the pixel-specific predictor values.

For simplified residual coding for DMM modes and the chain coding mode, video encoder 20 may need only signal two DC residual values (one DC residual value for each partition) for the video block e.g., PU. For simplified residual coding for the original HEVC intra prediction modes (e.g., DC, Planar and the directional modes), the video encoder may need only signal one DC residual value for the whole PU. In some examples, even when the simplified residual coding is applied, quantization may be still applied to the DC residual value.

In some examples, video encoder 20 and video decoder 30 may selectively apply the SDC mode when depth intra prediction coding a given depth block. In such examples, video encoder 20 may encode into the bitstream, and video decoder 30 may decode from the bitstream information, one or more syntax elements, e.g., a flag, indicating whether the SDC mode is performed for the depth block. Video encoder 20 may determine and signal whether the SDC mode is performed for depth blocks on a block-by-block, slice-by-slice, picture-by-picture, sequence-by-sequence, or other basis. Video encoder 20 may encode, and video decoder 30 may decode the syntax element(s) or other information in, as examples, a slice header, a parameter set, such as a picture parameter set (PPS), SPS, or VPS, or supplemental enhancement information (SEI) message. In examples in which the SDC mode is selectively applied on a block-by-block basis, the syntax element(s), e.g., flags, or other information may be included in a map or other data structure, e.g., in a slice header, relating depth blocks to respective indications of whether the SDC mode is performed for the depth block.

In some examples, a video coder may infer whether the SDC mode is performed for a particular depth block. For example, a video coder may always perform the SDC mode when a depth block is intra coded with one or more particular depth intra prediction modes, e.g., any one or more of the partition-based, 3D-HEVC intra prediction modes, or may never perform the SDC mode for certain depth intra prediction modes. In some examples, a video coder may infer whether the SDC mode is performed for a particular depth block based on a characteristic of the block, such as size. For example, a video coder may perform the SDC mode only when the block, e.g., PU, is less than 32×32, and/or only when the block, e.g., PU, partition size is 2N×2N.

In existing proposals for 3D-HEVC, DMM 1, DMM 3, DMM 4 and chain coding mode can have a delta DC signaled, corresponding to mode numbers 36, 38, 40 and 42, respectively. Simplified residual coding according to the techniques of this disclosure may not be applicable to these modes. In such cases, the syntax used to indicate the simplified residual coding may not need to be present for those modes. Alternatively, or in addition, such modes may be removed from the standard, such that they are not performed by a video coder configured according to the standard.

Although the predictor value for each pixel of a depth block or partition thereof can be different according to at least some of the depth intra prediction modes, when the video coder performs the SDC mode, and uses simplified residual coding for the current depth block, e.g., depth PU, the residual for each pixel in the block or partition can be the same, as specified by the DC residual value. For a depth block coded according to the non-partition-based (e.g., HEVC) intra prediction modes, a video coder may produce the pixel specific predictor value, namely PredSample[x][y] according to the intra predictor generated as specified in the base standard (e.g., HEVC). For a depth block coded according to one of the DMM modes or the chain coding mode, a video coder may produce the partition-specific DC predictor, DCPred[i], as specified in 3D-HEVC.

When DLT is not used, for each pixel (x, y), video encoder 20 and video decoder 30 may use three variables to determine the DC residual value (video encoder 20) or to reconstruct the depth block based on the DC residual value according to the simplified residual prediction mode (video decoder 30) according to this disclosure. In particular, video encoder 20 and video decoder 30 may utilize: (1) PredSample[x][y], (2) a partition specific DC predictor, namely DCPred[i], wherein i is the index to the partition the pixel belongs to; and (3) a partition specific DC residual, namely DCResi[i]. For example, video decoder 30 may calculate a reconstructed pixel value, namely RecSample[x][y], for a depth block as follows:

RecSample[x][y]=PredSample[x][y]+DCResi[i]+DCPred[i]. In partition-based, 3D-HEVC depth intra coding modes, PredSample[x][y] may be set to 0. In non-partition-based, HEVC depth intra prediction modes, DCPred[i] may be set to be 0.

In general, video encoder 20 determines a DC predictor value for a depth block or partition thereof based on the depth intra prediction mode used to encode the depth block. For example, for partition-based intra prediction modes, video decoder 20 determines respective DC predictor values for each partition based on one or more samples of one or more reconstructed neighboring depth blocks. For non-partition-based intra prediction modes, video encoder 20 determines a DC predictor value for the depth block based on a subset of pixel-specific predictor values for the depth block, e.g., four corner and/or center predictor values for the depth block. Video encoder 20 also determines a DC depth value, e.g., average of depth pixel values, for the depth block or partition, and determines the DC residual value for the depth block or partition as a difference between the DC depth value of the current block or partition and the DC predictor value for the block or partition. Video encoder 20 determines the DC residual value for the depth block or partition as a difference between the DC depth value of the current block or partition and the DC predictor value for the block or partition.

Video decoder 30 may determine pixel-specific predictor values for a depth block coded with a non-partition-based intra prediction mode, or partition-specific predictor values for a depth block coded with a partition-based intra prediction mode. In either case, video decoder 30 sums the predictor values with the DC residual value(s) to reconstruct the depth block.

When DLT is used, video decoder 30 may calculate RecSample[x][y] as follows, where Index2Depth and Depth2Idx are the Index Lookup Table and Depth Lookup Table respectively:

For non-partition-based (e.g., HEVC) depth intra prediction modes:
RecSample[x][y]=PredSample[x][y]+Idx2Depth [Depth2Idx [DCPred[i]]+DCResi[i]]−DCPred[i]

In partition-based (e.g., 3D-HEVC) depth intra prediction modes:
RecSample[x][y]=Idx2Depth [Depth2Idx [DCPred[i]]+DCResi[i]].

Accordingly, video encoder 20 may encode a difference between an index in a DLT of the DC depth value for the depth block or partition and an index in the DLT for the DC predictor value for the depth block or partition as the DC residual value for the depth block or partition thereof. Video decoder 30 decodes the difference. Video decoder 30 also determines a DC predictor value for the depth block. For depth blocks decoded according to a partition-based depth intra prediction coding mode, video decoder 30 determines respective DC predictors for the partitions according to the mode, e.g., based on one or more neighboring samples to the depth block, as described above. For depth blocks decoded according to a non-partition-based depth intra prediction coding mode, video decoder 30 determines a single DC predictor for the depth block based on a subset of the pixel-specific predictor values determined according to the intra prediction mode.

In some examples, for each non-partition-based, HEVC intra prediction mode, the DC predictor, DCPred[0] for the depth block, e.g., PU, may be generated as average of the four corner pixels of the depth block's prediction block, e.g., as follows: let w and h be the width and height of the PU respectively, DCPred[0]=(PredSample[0][0]+PredSample[0][w−1]+PredSample[h−1][0]+PredSample[h−1][w−1]+2) >>2. In some examples, for each non-partition-based, HEVC intra prediction mode, even less pixels of the current PU's prediction block (e.g., 1 or 2 pixels) may be utilized to calculate the predictor of DC value. In some examples, a center pixel of the PU's prediction block may be utilized as DCPred[0]. Additionally, although intra prediction as specified in HEVC is discussed herein, the prediction block of current PU may be generated in any of a variety of ways in addition to those specified in HEVC.

In some examples, for either partition- or non-partition-based intra prediction where a DLT is used, video decoder 30 determines an index for the DC predictor value in the DLT, and determines a sum of the index for the DC predictor value and the difference that was decoded from bitstream. Video decoder 30 further identifies a depth value associated with the sum of DC predictor value and the difference in the depth lookup table as the DC depth value for the depth block or partition thereof. In the case of non-partition-based intra prediction, video decoder 30 may further determine a difference between the identified depth value and the DC predictor value as the DC residual value for the depth block, and, to reconstruct the depth values of the depth block, sum the respective prediction values for the pixels with the determined difference.

In some examples according to this disclosure, signaling of simplified residual coding for DMM mode 1, DMM mode 3, DMM mode 4, chain coding mode and the HEVC intra prediction modes can be unified. In general, as discussed above, video encoder 20 may encode and video decoder 30 may decode information indicating which of the depth intra prediction modes is used to code the depth block and, in some cases, whether SDC mode is performed for the depth block. In some examples, the video coders may code information, e.g., a flag or other syntax element, indicating whether a partition-based or non-partition-based depth intra prediction mode is used to code the depth block.

In some examples, a video coder may code, e.g., video encoder may encode or video decoder may decode, a first syntax element, e.g., one-bit flag, indicating whether a non-partition-based, HEVC intra prediction mode is used for the depth block, e.g., PU. Alternatively, or in addition, this first syntax element may not be required when the PU size is larger than 32×32. In such examples, video decoder 30 may infer that a non-partition-based intra prediction mode was used to encode the depth block. In some examples, a first value of the first syntax element indicates that a depth intra prediction mode selected for a depth block from a plurality of depth intra prediction modes is a non-partition-based HEVC intra prediction mode, e.g., one of a Planar intra prediction mode, DC intra prediction mode, or directional intra prediction mode, and a second value of the first syntax element indicates that the depth intra prediction mode selected for the depth block is a partition-based intra prediction mode, e.g., one of a plurality of depth modeling modes or a region boundary chain coding mode. In some examples, the first syntax element is a hevc_intra_flag. In some examples, hevc_intra_flag equal to 1 means an HEVC intra prediction mode is used for the coding unit, and hevc_intra_flag equal to 0 means an additional depth intra prediction mode is used for the coding unit. In some examples, the first syntax element is included in an intra mode extension structure. In some examples, the first syntax element is included in a depth_mode_parameters syntax structure.

In some examples, a video coder may code a second syntax element, e.g., one-bit flag, indicating whether the SDC mode and simplified residual coding is used for the depth block, e.g., depth PU. In some examples, the second syntax element is an sdc_flag. In some examples, sdc_flag equal to 1 means the SDC mode is used for the coding unit, and sdc_flag equal to 0 means the SDC mode is not used for the coding unit or prediction unit. In some examples, the second syntax element is included in an intra mode extension structure. In some examples, the second syntax element is included in a depth_mode_parameters syntax structure.

Alternatively, or in addition, this second syntax element is only required when the PU partition size is 2N×2N. If the PU partition size is not 2N×2N, video decoder 30 may infer that the SDC mode is not performed. In some examples, if the first syntax element indicates (or it is inferred) that a non-partition-based intra prediction mode was not used to encode the depth block, a video coder codes a third syntax element indicating which of DMM mode 1, DMM mode 3, DMM mode 4 or chain coding mode is used for coding depth block. In some examples, region boundary chain coding mode is not used or not available for use for coding depth blocks. In such examples, a video coder may not need to code the third syntax element, and a first value of the first syntax element, e.g., hevc_intra_flag, being equal to 0 indicates that a DMM mode is used to intra-code the current depth block. In some examples, when region boundary chain coding mode is not used or not available for use for coding depth blocks, the second value of the first syntax element, e.g., hevc_intra_flag, is not coded, and the first value of the first syntax element indicates that a DMM mode is used to intra-code the current depth block.

In some examples according to the techniques of this disclosure, a video coder signals and/or codes the DC residual value for the depth block or partition thereof in the same manner as specified for SDC in existing proposals for 3D-HEVC. More specifically, for each partition, to signal or code the DC residual value the following syntax elements may be signaled or coded:

- A syntax element indicating whether the DC residual value is equal to 0 or not.
- A syntax element indicating whether the DC residual value is a positive integer or a negative integer.
    - This syntax is required only when the DC residual value is not equal to 0.
- A syntax element indicating "absolute value of the DC residual value" minus 1.
    - This syntax is required only when the DC residual value is not equal to 0.

In some examples, the simplified residual coding according to the techniques of this disclosure is only applied to CUs with 2N×2N partition size. In some examples, the simplified residual coding is only applied to certain depth intra modes.

Implementation of the techniques of this disclosure described above according to one or more examples may be as follows. Syntax and semantics are illustrated as changes relative to 3D-HEVC Draft Text 1, with additions to the 3D-HEVC Draft Text 1 represented with underlined text, and deletions from the 3D-HEVC Draft Text 1 represented between the bookend labels of <start removal> and <end removal>.

Depth Mode Parameter Syntax

| depth_mode_parameters( x0 , y0 , log2CbSize ) { | Descriptor |
|---|---|
| <start removal> if( ( log2CbSize = = 3 && PartMode[ xC ][ yC ] = = PART_2Nx2N ) | |
| \|\| ( log2CbSize > 3 && log2CbSize < 6 ) ) | |
|    depth_intra_mode_set_indication_flag | ae(v <end removal> |
| if(log2CbSize<6) | |
|   hevc_intra_flag[x0][y0] | ae(v) |
| if(PartMode[xC][yC]==PART_2Nx2N) | |
|   sdc_flag[x0][y0] | ae(v) |
| if(!hevc_intra_flag[x0][y0]){ | |
|   depth_intra_mode[x0][y0] | ae(v) |
|   if ( DepthIntraMode[ x0 ][ y0 ] = = INTRA_DEP_DMM_WFULL<start removal> \|\| DepthIntraMode[ x0 ][ y0] = = INTRA_DEP_SDC_DMM_\|WFULL\| )<end removal> | |
|    wedge_full_tab_idx[ x0 ][ y0 ] | ae(v) |
|   else if( DepthIntraMode[ x0 ][ y0 ] = = INTRA_DEP_DMM_WPREDTEX ) | |
|    wedge_predtex_tab_idx[ x0 ][ y0 ] | ae(v) |
|   else if( DepthIntraMode[ x0 ][ y0 ] = = INTRA_DEP_CHAIN ) { | |
|    edge_start_left_flag[ x0 ][ y0 ] | ae(v) |
|    edge_start_position[ x0 ][ y0 ] | ae(v) |
|    num_edge_codes_minus1[ x0 ][ y0 ] | ae(v) |
|    for( k = 0; k <= num_edge_codes_minus1; k++) | |
|     edge_code[ k ] | ae(v) |
|   } | |
| } | |
| if(!sdc_flag[x0][y0]){ | |
|   if ( DmmFlag[ x0 ][ y0 ] ) { | |
|    dmm_dc_flag[ x0 ][ y0 ] | ae(v) |
|    if ( dmm_dc_flag[ x0 ][ y0 ] ) | |
|     for( i = 0; i < 2; i ++) { | |
|      dmm_dc_abs[ x0 ][ y0 ][ i ] | ae(v) |
|      if ( dmm_dc_abs[ x0 ][ y0 ][ i ]) | |
|       dmm_dc_sign_flag[ x0 ][ y0 ][ i ] | ae(v) |
|     } | |
|   } | |
|   else if( DepthIntraMode[ x0 ][ y0 ] = = INTRA_DEP_CHAIN ) { | |
|    edge_dc_flag[ x0 ][ y0 ] | ae(v) |
|    if( edge_dc_flag[ x0 ][ y0 ] ) { | |
|     for( i = 0; i < 2; i++) { | |
|      edge_dc_abs[ x0 ][ y0 ][ i ] | ae(v) |
|      if( edge_dc_abs[ x0 ][ y0 ][ i ] != 0 ) | |
|       edge_dc_sign_flag[ x0 ][ y0 ][ i ] | ae(v) |
|     } | |
|    } | |
|   } | |
| } | |
| else <start removal> if( SdcFlag[ x0 ][ y0 ] ) <end removal>{ | |
|   sdcNumSegments = <start removal> ( DepthIntraMode[ x0 ][ y0 ] = =INTRA_DEP_SDC_DMM_\|WFULL\| <end removal> !hevc_intra_flag[x0][y0]) ? 2 : 1 | |
|   for( i = 0; i < sdcNumSegments; i++) { | |
|    sdc_residual_flag[ x0 ][ y0 ][ i ] | ae(v) |
|    if( sdc_residual_flag[ x0 ][ y0 ][ i ]) { | |
|     sdc_residual_sign_flag[ x0 ][ y0 ][ i ] | ae(v) |

```
depth_mode_parameters( x0 , y0 , log2CbSize ) {                 Descriptor
            sdc_residual_abs_minus1[ x0 ][ y0 ][ i ]            ae(v)
        }
      }
    }
}
```

General Coding Unit Syntax

```
coding_unit( x0, y0, log2CbSize , ctDepth) {
    if( transquant_bypass_enable_flag ) {
        cu_transquant_bypass_flag                               ae(v)
...
    } else {
        pbOffset = ( PartMode == PART_NxN ) ? ( nCbS / 2 ) : 0
        log2PbSize = log2CbSize -
            ( PartMode == PART_NxN ? 1 : 0 )
        for( j = 0; j <= pbOffset; j = j + pbOffset )
            for( i = 0; i <= pbOffset; i = i + pbOffset ) {
                if( vps_depth_modes_flag[ nuh_layer_id ] )
                    depth_mode_parameters( x0 + i , y0+ j ,
                        log2CbSize )
                <start removal>if( DepthIntraMode[ x0 + i ]
                    [ y0 + j ] = =INTRA_DEP_|NONE| ) <end
                    removal>
                if(hevc_intra_flag[x0][y0])
                    prev_intra_luma_pred_flag[ x0 + i ][ y0 + j ]  ae(v)
            }
        for( j = 0; j <= pbOffset; j = j + pbOffset )
            for( i = 0; i <= pbOffset; i = i + pbOffset ) {
                <start removal>if( DepthIntraMode[ x0 + i ]
                    [ y0 + j ] = =INTRA_DEP_|NONE|) {<end
                    removal>
                if(hevc_intra_flag[x0][y0]){
                    if( prev_intra_luma_pred_flag[ x0 + i ]
                        [ y0+ j ] )
                        mpm_idx[ x0 + i ][ y0+ j ]              ae(v)
                    else
                        rem_intra_luma_pred_mode[ x0 + i ][ y0+   ae(v)
                            j ]
                }
            }
        if ( !SdcFlag[ x0 ][ y0 ] )
            intra_chroma_pred_mode[ x0 ][ y0 ]                  ae(v)
    }
...
    if( !pcm_flag ) {
        if( PredMode[ x0 ][ y0 ] != MODE_INTRA &&
            !(PartMode == PART_2Nx2N && merge_flag[x0][y0]))
            rqt_root_cbf                                        ae(v)
        if( rqt_root_cbf && !inter_sdc_flag ) {
            MaxTrafoDepth = ( PredMode[ x0 ][ y0 ] ==
                MODE_INTRA ?
                max_transform_hierarchy_depth_intra +
                IntraSplitFlag:
                max_transform_hierarchy_depth_inter )
            transform_tree( x0, y0, x0, y0, log2CbSize, 0, 0 )
        }
    }
}
```

Depth Mode Parameter Intra Semantics

<Start removal> depth_intra_mode_set_indication_flag indicates the set of possible depth intra modes.

The variables depthIntraModeSet is derived as specified in the following:

If cLog2CbSize is equal ot 6, depthIntraModeSet is set equal to 0.

Otherwise, if cLog2CbSize is equal to 3 and PartMode[xC][yC] is equal to PART_NxN, depthIntraModeSet is set equal to 1.

Otherwise ((cLog2CbSize==3 && PartMode[xC][xC]==PART_2N×2N||cLog2CbSize>3 && cLog2CbSize<6), the following applies:

If depth_intra_mode_set_indication_flags is equal to 1, depthIntraMode Set is set equal to 2.

Otherwise (depth_intra_mode_set_indication_flag is equal to 0), depthIntraModeSet is set equal to 3.<end removal> hevc_intra_flag[x0][y0] equal to 1 specifies that intra modes with intraPredMode in the range of 0 to 34 is used for the current prediction unit. hevc_intra_flag[x0][y0] equal to 0 specifies that another intra mode is used for the current prediction unit. When not present, hevc_intra_flag[x0][y0] is inferred to be equal to 1.

sdc_flag[x0][y0] equal to 1 specifies that the residual of each partition of the current prediction unit is only represented by sdc_residual_flag[x0][y0][i], sdc_residual_sign_flag[x0][y0][i] and sdc_residual_abs_minus1[x0][y0][i]. sdc_flag[x0][y0] equal to 0 specifies that more residual may be present in the transform tree. When not present. sdc_flag[x0][y0] is inferred to be equal to 0.

depth_intra_mode[x0][y0] specifies the depth intra mode of the current prediction unit. Table H-2 specifies the value of the variable depthIntraModeMaxLen <start removal> depending on depthIntraModeSet <end removal> and the value of the variable DepthIntraMode and the associated name depending on the on depth_intra_mode <start removal> and depthIntraModeSet <end removal>When depth_intra_mode[x0][y0] is not present, DepthIntraMode is inferred to be equal to 4.

SdcFlag[x0][y0] is set to be equal to sdc_flag[x0][y0]. [Ed. (CY): a replace from SdcFlag to sdc_flag can be made, manually, to avoid this setting.]

<Start removal>The variable SdcFlag[x0][y0] is derived as specified in the following: SdcFlag[x0][y0] (DepthIntraMode[x0][y0]==INTRA_DEP_SDC_PLANAR)81 (H-17) (DepthIntraMode[x0][y0]==INTRA_DEP_DMM_WFULL) <end removal>

The variable DmmFlag[x0][y0] is derived as specified in the following: DmmFlag[x0][y0]=(DepthIntraMode[x0][y0]==INTRA_DEP_DMM_WFULL)||(H-18) (DepthIntraMode[x0][y0]==INTRA_DEP_DMM_CPREDTEX)||(DepthIntraMode[x0][y0]==INTRA_DEP_DMM_WPREDTEX)

TABLE H-2

Specification of DepthIntraMode and associated name depending on
<start removal>depthIntraModeSet |and| <end removal> depth_intra_mode and specification of and
depthIntraModeMaxLen <start removal>depdending on |depthIntraModeSet|<end removal>

| DepthIntraMode | depthIntraModeMaxLen<br>Associatedname | 3<br>depthintramode | | | |
|---|---|---|---|---|---|
| 0 | INTRA_DEP_DMM_WFULL | 0 | | | |
| 1 | INTRA_DEP_DMM_CPREDTEX | 2 | | | |
| 2 | INTRA_DEP_DMM_WPREDTEX | 6 | | | |
| 3 | INTRA_DEP_CHAIN | 7 | | | |
| | <start removal>depthIntraModeSet | 0 | 1 | 2 | 3 |
| | depthIntraModeMaxLen | 1 | 3 | 3 | 2 |
| DepthIntraMode | Associated name | depth_intra_mode | | | |
| 0 | INTRA_DEP_SDC_PLANAR | 0 | — | 0 | — |
| 1 | INTRA_DEP_NONE | 1 | 0 | — | 0 |
| 2 | INTRA_DEP_SDC_DMM_WFULL | — | — | — | 1 |
| 3 | INTRA_DEP_DMM_WFULL | — | 1 | 3 | — |
| 4 | INTRA_DEP_DMM_CPREDTEX | — | — | — | 2 |
| 5 | INTRA_DEP_DMM_WPREDTEX | — | — | — | — |
| 6 | INTRA_DEP_CHAIN | — | 3 | 1<end removal> | — |

Alternatively, instead of binarizing depth_intra_mode independently from other syntax elements, depth_intra_mode can also be binarized dependent on CU size and partition mode. The syntax and semantics of depth_intra_mode[x0][y0] may be defined alternatively as follows:

depth_intra_mode[x0][y0] specifies the depth intra mode of the current prediction unit. Table H-2 specifies the value of the variable depthIntraModeMaxLen depending on depthDmmRbcModeSet <start removal>depthIntraModeSet <end removal> and the value of the variable DepthIntraMode and the associated name depending on the on depth_intra_mode and depthDmmRbcModeSet <start removal>depthIntraModeSet <end removal>. When depth_intra_mode[x0][y0] is not present. DepthIntraMode is inferred to be equal to 4.

The variables depthDmmRbcModeSet is derived as specified in the following:

If cLog 2CbSize is equal to 3 and PartMode[xC][yC] is equal to PART_N×N, depthDmmRbcModeSet is set equal to 1.

Otherwise (cLog 2CbSize is not equal to 3 or PartMode[xC][yC] is not equal to PART_N×N), depthDmmRbcModeSet is set equal to 0.

TABLE H-2

Specification of DepthIntraMode and associated name depending on
depthDmmRbcModeSet and depth intra mode and specification of and
depthIntraModeMaxLen depdending on depthDmmRbcModeSet

| | depthDmmRbcModeSet | 0 | 1 |
|---|---|---|---|
| | depthIntraModeMaxLen | 3 | 2 |
| DepthIntra-Mode | Associated name | depth intra mode | |
| 0 | INTRA_DEP_DMM_WFULL | 0 | 0 |
| 1 | INTRA_DEP_DMM_CPREDTEX | 2 | — |
| 2 | INTRA_DEP_DMM_WPREDTEX | 6 | 2 |
| 3 | INTRA_DEP_CHAIN | 7 | 3 |

Alternatively, the modes where simplified residual coding is applied are treated as new depth intra modes and signaled with the current syntax element, e.g., depth_intra_mode. In this way, there is no need to introduce additional syntax elements, like hevc_intra_flag and sdc_flag.

Decoding Process

H.8.4.2 Derivation Process for Luma Intra Prediction Mode

Inputs to this process are:
a luma location (xB, yB) specifying the top-left luma sample of the current block relative to the top-left luma sample of the current picture,
a variable log 2PbSize specifying the size of the current luma prediction block.

Table H-4 specifies the value for the intra prediction mode and the associated names.

TABLE H-4

Specification of intra prediction mode and associated names

| Intra prediction mode | Associated names |
|---|---|
| 0 | Intra_Planar |
| 1 | Intra_DC |
| 2 ... 34 | Intra_Angular |
| 35 ... 40 | Intra_DepthPartition<br>(used only for depth) |
| Otherwise (41, 42) | Intra_Chain<br>(used only for depth) |

Figure 8:
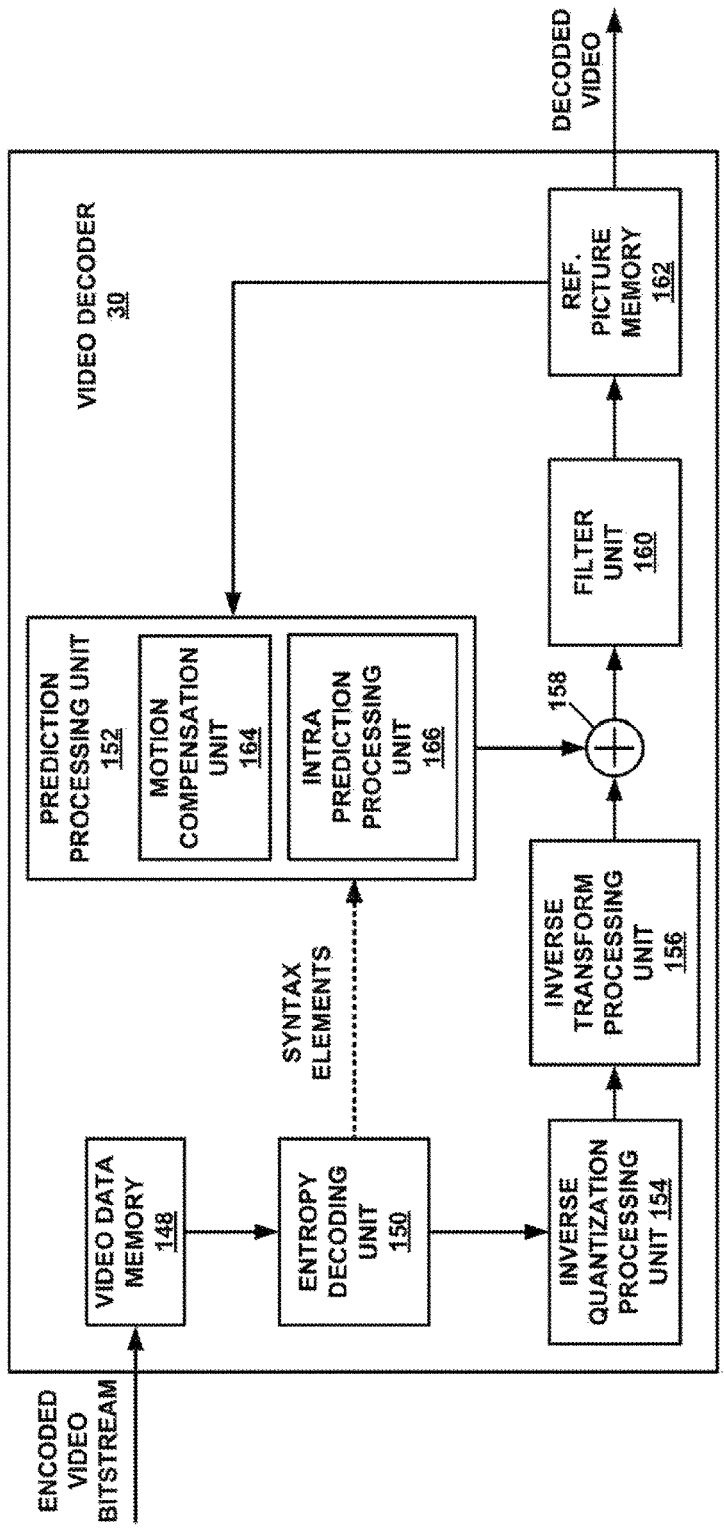
FIG. 8 is a block diagram illustrating an example video decoder that may implement the techniques of this disclosure.

IntraPredMode[xB][yB] labelled 0 ... 34 represents directions of predictions as illustrated in FIG. 8-1.

<Start Removal>If DepthIntraMode[yB][yB] is equal to INTRA_DEP_SDC_PLANAR, IntraPredMode[xB][yB] is set equal to Intra_Planar.

Otherwise, if DepthIntraMode[xB][yB] is equal to INTRA_DEP_SDC_DMM_WFULL, IntraPredMode[xB][yB] is set equal to Intra_DepthPartition(35).

Otherwise, I <end removal>If DepthIntraMode[xB][yB] is equal to INTRA_DEP_DMM_WFULL, IntraPredMode[xB][yB] is set equal to Intra_DepthPartition(35+dmm_dc_flag[xB][yB]).

Otherwise, if DepthIntraMode[xB][yB] is equal to INTRA_DEP_DMM_WPREDTEX, IntraPredMode[xB][yB] is set equal to Intra_DepthPartition(37+dmm_dc_flag[xB][yB]).

Otherwise if DepthIntraMode[xB][yB] is equal to INTRA_DEP_DMM_CPREDTEX, IntraPredMode[xB][yB] is set equal to Intra_DepthPartition(39+dmm_dc_flag[xB][yB]).

Otherwise if DepthIntraMode[xB][yB] is equal to INTRA_DEP_CHAIN, IntraPredMode[xB][yB] is set equal to Intra_Chain(41+edge_dc_flag[xB][yB]).

Otherwise (DepthIntraMode[xB][yB] is equal to 4 <start removal>INTRA_DEP_NONE) <end removal>, IntraPredMode[xB][yB] is derived as the following ordered steps.

H.8.4.4.2.1 General Intra Sample Prediction

The specification in subclause 8.4.4.2.1 with the following paragraphs added to the end of subclause apply:

Set variable bSamplePredFlag to 1.

If intraPredMode is equal to Intra_DepthPartition(35, 36), the corresponding intra prediction mode specified in subclause H.8.4.4.2.7 is invoked with the location (xB0, yB0), the intra prediction mode intraPredMode, the sample array p and the transform block size nT an bSamplePredFlag as the inputs and the output are the predicted sample array predSamples.

Otherwise, if intraPredMode is equal to Intra_DepthPartition(37,38), the corresponding intra prediction mode specified in subclause H.8.4.4.2.8 is invoked with the location (xB0, yB0), the intra prediction mode intraPredMode, the sample array p and the transform block size nT and bSamplePredFlag as the inputs and the output are the predicted sample array predSamples.

Otherwise, if intraPredMode is equal to Intra_DepthPartition(39,40), the corresponding intra prediction mode specified in subclause H.8.4.4.2.9 is invoked with the location (xB0, yB0), the intra prediction mode intraPredMode, with the sample array p and the transform block size nT and bSamplePredFlag as the inputs and the output are the predicted sample array predSamples.

Otherwise, if intraPredMode is equal to Intra_Chain (41,42), the corresponding intra prediction mode specified in subclause H.8.4.4.2.10 is invoked with the location (xB0, yB0), the intra prediction mode intraPredMode, with the sample array p and the transform block size nT and bSamplePredFlag as the inputs and the output are the predicted sample array predSamples.

H.8.4.4.3 Depth Value Reconstruction Process

Inputs to this process are:
- a luma location (xB, yB) specifying the top-left luma sample of the current block relative to the top-left luma sample of the current picture,
- a variable nT specifying the prediction size
- predicted samples predSamples[x][y], with x, y=0 . . . nT−1
- a variable intraPredMode specifying the prediction mode of the current prediction block Output of this process is:
- reconstructed depth value samples resSamples[x][y], with x, y=−1 . . . 2*nT−1.

Set variable bSamplePredFlag to 0.

Depending on intraPredMode the array wedgePattern[x][y] with x, y=0 . . . nT−1 specifying the binary segmentation pattern is derived as follows.

If intraPredMode is equal to Intra_DepthPartition(35), the following applies.

wedgePattern=WedgePatternTable[Log 2(nT)][wedge_full_tab_idx[xB][yB]]

Otherwise, if intraPredMode is equal to Intra_DepthPartition(37), subclause H.8.4.4.2.8 is invoked with the location (xB, yB), the intra prediction mode intraPredMode, the transform block size nT and bSamplePredFlag as the inputs and the output is the wedgelet pattern wedgePattern.

Otherwise, if intraPredMode is equal to Intra_DepthPartition(39), subclause H.8.4.4.2.9 is invoked with the location (xB, yB), the intra prediction mode intraPredMode, the transform block size nT and bSamplePredFlag as the inputs and the output is the wedgelet pattern wedgePattern.

Otherwise, if intraPredMode is equal to Intra_Chain (41), subclause H.8.4.4.2.10 is invoked with the location (xB, yB), the intra prediction mode intraPredMode, the transform block size nT and bSamplePredFlag as the inputs and the output is the edge pattern wedgePattern.

Otherwise (intraPredMode is smaller than <start removal>not equal to Intra_DepthPartition(35)) <end removal>, the following applies.

For x, y=0 . . . nT−1 wedgePattern[x][y] is set equal to 0.

Depending on dlt_flag[nuh_layer_id] the reconstructed depth value samples resSamples[x][y] are derived as specified in the following:

If dlt_flag[nuh_layer_id] is equal to 0, the following applies:

For x, y=0 . . . nT−1, the reconstructed depth value samples resSamples[x][y] are derived as specified in the following:

resSamples[x][y]=predSamples[x][y]+SdcResidual[xB][yB][wedgePattern[x][y]] (H−54)

Otherwise (dlt_flag[nuh_layer_id] is equal to 1), the following applies:

For p in the range of 0 to Ivariables dcPred[0] and dcPred[1] are derived as specified in the following:

<Start removal>If intraPredMode is equal to Intra_DC, the following applies:

dcPred[0]=predSamples[nT−1][nT−1] (H−55)

Otherwise, <end removal>If intraPredMode is smaller than 35 <start removal>equal to Intra_Planar, <end removal>the following applies:

dcPred[0]=(predSamples[0][0]+predSamples[0][nT−1]+predSampDles[nT−1][0] predSamples[nT−1][nT−1]+2)>>2 (H-56)

Otherwise, if intraPredMode is equal to Intra_DepthPartition(35) or intraPredMode is equal to Intra_DepthPartition(37), the following applies.

dcPred[wedgePattern[0][0]]=predSamples[0][0](H-57)

dcPred[wedgePattern[nT−1][0]]=predSamples[nT−1][0] (H-58)

dcPred[wedgePattern[0][nT−1]]=predSamples[0][nT−1] (H-59)

dcPred[wedgePattern[nT−1][nT−1]]_predSamples[nT−1][nT−1] (H-60)

Otherwise, (intraPredMode is equal to Intra_DepthPartition(39) or intraPredMode is equal to Intra_Chain(41)), the following applies.

dcPred[wedePattern[0][0]]=predSamples[0][1]

dcPred1Found=0:

for (x=0;x<nT−1:x++)

for (v=0; y<nT−1; y++)

if (wedgePattern[x][y]!=wedgePattern[0][0] && dcPred1Found==0) {dcPred[wedgePattern[x][y]]=predSamples[x][y] dcPred1Found=1}

For x, y=0 . . . nT−1, the reconstructed depth value samples resSamples[x][y] are derived as specified in the following:

dltIdxPred=DepthValue2Idx[dcPred[wedgePattern
[x][y]]] (H-61)

dltIdxResi=SdcResidual[xB][yB][wedgePattern[x]
[y]] (H-62)

resSamples[x][y]=predSamples[x][y]+
Idx2DepthValue[dltIdxPred+dltIdxResi]−dcPred
[wedgePattern[x][y]] (H-63)

H. 8.4.4.2.8 Specification of Intra_DepthPartition (37, 38) Prediction Mode

Inputs to this process are:
  a sample location (xB, yB) specifying the top-left sample of the current block relative to the top-left sample of the current picture,
  a variable intraPredMode specifying the intra prediction mode,
  the neighbouring samples p[x][y], with x, y=−1 . . . 2*nT−1,
  a variable nT specifying the transform size,
  a variable bSamplePredFlag specifving whether to generate the prediction samples or not Output of this process is:
  predicted samples predSamples[x][y], with x, y=0 . . . nT−1.
  wedgelet pattern wedgePattern[x][v], with x, y=0 . . . nT−1.

This intra prediction mode is invoked when intraPredMode is equal to 37 or 38.

Let textureComp be the texture view component with view order index equal to ViewIdx and DepthFlag equal to 0. The variable texturePredMode is set equal to the PredMode[xB][yB] of textureComp. The variable textureIntraPredMode is set equal to IntraPredMode [xB][yB] of the textureComp. [Ed. (GT) Consider storing texturePredMode and texturentraPredMode explicitly.]

The values of the prediction samples predSamples[x][y], with x, y=0 . . . nT−1, are derived by the following ordered steps.

1. Depending on texturePredMode and textureIntraPredMode, the list candWedgeIndList specifying indices of candidate wedgelets is derived as specified in the following:
  a. If texturePredMode is equal to MODE_INTRA and textureIntraPredMode is in the range of 2 to 34, the following applies.
    candWedgeIndList=TextModePredWedgeInd Table[Log 2(nT)][texturePredMode] (H-34)
  b. Otherwise (texturePredMode is not equal to MODE_INTRA or textureIntraPredMode is not in the range of 2 to 34), the following applies.
    candWedgeIndList=CoarseWedgeIndTable[Log 2(nT)](H-35)

2. The variable wedgeIdx is derived as:
  wedgeIdx=candWedgeIndList[wedge_predtex_tab_idx[xB][yB]](H-36)

3. The variable wedgePattern [x][y] with x, y=0 . . . nT−1, specifying a binary partition pattern is derived as:
  wedgePattern=WedgePatternTable[Log 2(nT)] [wedgeIdx](H-37)

4. When bSamplePredFlag is equal to 1, the depth partition value derivation and assignment process as specified in subclause H.8.4.4.2.11 is invoked with the neighbouring samples p[x][y], the binary pattern wedgePattern[x][y], the transform size nT, the dcOffsetAvailFlag set equal to (intraPredMode==Intra_DepthPartition(38)), intra-ChainFlag set equal to 0, and the DC Offsets DcOffset[xB][yB][0], and DcOffset[xB][yB][1] as inputs and the output is assigned to predSamples[x][y].

H. 8.4.4.2.9 Specification of Intra_DepthPartition (39, 40) Prediction Mode

Inputs to this process are:
  a sample location (xB, yB) specifying the top-left sample of the current block relative to the top-left sample of the current picture,
  a variable intraPredMode specifying the intra prediction mode,
  the neighbouring samples p[x][y], with x, y=−1 . . . 2*nT−1,
  a variable nT specifying the transform size,
  a variable bSamplePredFlag specifving whether to generate the prediction samples or not Output of this process is:
  predicted samples predSamples[x][y], with x, y=0 . . . nT−1
  wedgelet pattern wedgeletPattern[x][y], with x, y=0 . . . nT−1.

This intra prediction mode is invoked when intraPredMode is equal to 39 or 40.

The values of the prediction samples predSamples[x][y], with x, y=0 . . . nT−1, are derived as specified by the following ordered steps:

1. The variable recTextPic is set equal to the array of the reconstructed luma picture samples of the view component with view order index equal to ViewIdx and DepthFlag equal to 0.

2. The variable textThresh specifying a threshold for the segmentation of recTextPic is derived as specified in the following.
  a. The variable sumTextPicVals is set equal to 0.
  b. For x=0 . . . nT−1 the following applies
    i. For y=0 . . . nT−1 the following applies
    sumTextPicVals+=recTextPic[xB+x][yB+y] (H-38)
  c. The variable textThresh is set equal to (sumTextPicVals>>(2*log 2(nT)))

3. The variable wedgeletPattern[x][y] with x, y=0 . . . nT−1 specifying a binary partition pattern is derived as specified in the following.
  a. For x=0 . . . nT−1 the following applies
    i. For y=0 . . . nT−1 the following applies
    wedgeletPattern[x][y]=(recTextPic[xB+x][yB+y]>textThresh) (H-39)

4. When bSamplePredFlag is equal to 1, the depth partition value derivation and assignment process as specified in subclause H.8.4.4.2.11 is invoked with the neighbouring samples p[x][y], the binary pattern wedgeletPattern[x][y], the transform size nT, the dcOffsetAvailFlag set equal to (intraPredMode==Intra_DepthPartition(40)), intra-ChainFlag set equal to 0, and the DC Offsets DcOffset[xB][yB][0], and DcOffset[xB][yB][1] as inputs and the output is assigned to predSamples[x][y].

H. 8.4.4.2.10 Specification of Intra_Chain (41, 42) Prediction Mode

Inputs to this process are:
  a sample location (xB, yB) specifying the top-left sample of the current block relative to the top-left sample of the current picture,
  a variable intraPredMode specifying the intra prediction mode,
  the neighbouring samples p[x][y], with x, y=−1 . . . 2*nT−1, a variable nT specifying the transform size,
a variable bSamplePredFlag specifying whether to generate the prediction samples or not Output of this process is:
predicted samples predSamples[x][y], with x, y=0 . . . nT−1.
edge pattern edgePattern[x][y], with x, v=0 . . . nT−1.

This intra prediction mode is invoked when intraPredMode is equal to 43 or 44.

The values of the prediction samples predSamples[x][y], with x, y=0 . . . nT−1, are derived as specified in the following ordered steps.
1. The start point of the chain in the current prediction unit is derived from edge_start_left_flag[xB][yB] and edge_start_position[xB][yB].
   a. If edge_start_left_flag[xB][yB] is equal to 1, the start point is set as s[0][yS] where yS is equal to edge_start_position[xB][yB].
   b. Otherwise, the start point is set as s[xS][0] where xS is equal to edge_start_position[xB][yB].
2. The number of edges and the direction of each edge are derived from num_edge_codes_minus1[xB][yB] and edge_code[xB][yB][k], for k=0 . . . num_edge_codes_minus1[xB][yB]. The direction of the edge is derived from edge_code as shown in Table H-3.
3. The region boundary generated by connecting each edge separates the predicted samples predSamples[x][y], with x, y=0 . . . nT−1 into two regions: the region rA that covers the top-left pixel (x0, y0) and the region rB that covers the remaining region.
   a. For x, y=0 . . . nT−1 the binary pattern edgePattern[x][y] is derived as follows:
      i. If (x, y) is covered by rA, edgePattern[x][y]=0.
      ii. Otherwise, edgePattern[x][y]=1.
4. If bSamplePredFlag is equal to 1, the depth partition value derivation and assignment process as specified in subclause H.8.4.4.2.11 is invoked with the neighbouring samples p[x][y], the binary pattern edgePattern[x][y], the transform size nT, the dcOffsetAvailFlag set equal to (intraPredMode==Intra_DepthPartition(44)), intraChainFlag set equal to 1, and the DC offsets DcOffset[xB][yB][0], and DcOffset[xB][yB][1] as inputs and the output is assigned to predSamples[x][y].

In some examples, video coders may use a CABAC entropy coding process to code syntax elements signaled according to the techniques of this disclosure. For example, video coders may use the CABAC process to code the first syntax element, e.g., hevc_intra_flag, that indicates whether a non-partition based (HEVC) depth intra prediction mode, or a partition-based depth intra prediction mode, is used to code a depth block. Video coders may also use the CABAC process to code the second syntax element, e.g., sdc_flag, which indicates whether the SDC mode is used to code the depth block.

In some examples, a video coder determines the context index used in CABAC coding of the first and second syntax elements, e.g., the hevc_intra_flag and the sdc_flag, for the current depth block, e.g., depth CU/PU, where nbLeft and nbAbove are the left and above neighboring blocks of a current CU/PU, respectively, as follows:
Context index of hevc_intra_flag is calculated as:
   hevc_intra_flag of nbLeft+hevc_intra_flag of nbAbove
Context index of sdc_flag is calculated as:
   sdc_flag of nbLeft+sdc_flag of nbAbove
The context index value can be 0, 1 or 2. Therefore, in some examples, three contexts are used for both hevc_intra_flag and sdc_flag, respectively. In some examples, for each context, a video coder initializes the probability of 0 and 1 to be equal to 0.5, which is the equal probability state. The equal probability state corresponds to an initialization value, which is represented by the variable initValue in the HEVC specification, for the initialization of context variables equal to 154. However, for both flags, a value of 1 may occur with much higher probability than a value of 0. Therefore, for either hevc_intra_flag or sdc_flag, equi-probability distribution may not match well with the true probability distribution, and therefore will increase bits spent by a video coder to code the flag.

Consequently, in some examples according to the techniques of this disclosure, a video coder, e.g., video encoder 20 and/or video decoder 30, is configured to initialize the probability state for CABAC coding of syntax elements used in intra SDC signaling, e.g., the hevc_intra_flag and/or sdc_flag, to a non-equal probability state. For example, the video coder may be configured to initialize the probability state for CABAC coding the hevc_intra_flag to a non-equal probability state. In some examples, different initial probabilities are proposed for both the hevc_intra_flag and the sdc_flag. In the example techniques described below, the variable initValue is used in the initialization process of context variables in the same way as disclosed in the HEVC standard, and the initialized probability state is updated in the same manner as disclosed in the HEVC standard.

In some examples, a video coder determines the initial probability state for coding syntax elements, such as the hevc_intra_flag and/or the sdc_flag, for a current depth block, e.g., PU, by referring to the values of the respective flag for neighboring blocks of the current depth block. In some examples, three initialized probability states are provided for the flag (e.g., hevc_intra_flag and/or the sdc_flag) for the current block, each of the initialized probability states associated with one of the following conditions: (1) the value of the flag for both left neighboring block and above neighboring block was 0; (2) the value of the flag for one neighboring block (either left neighboring block or above neighboring block) was 0; and (3) the value of the flag for both left neighboring block and above neighboring block was 1. The video coder may update the initialized probability states accordingly for each of the three cases listed above.

Additionally, for the hevc_intra_flag and/or sdc_flag, a video coder may select a different value for the initValue variable for different slice types, e.g., B slice, P slice, or I slice. In other words, the video coder may determine a slice type of a slice that includes the current depth block, e.g., a slice type associated with the current PU, and select the initial probability state for decoding at least one of the hevc_intra_flag and/or sdc_flag from a plurality of probability states based on the determined slice type. In some examples, a video coder selects different value for the initValue variable for the hevc_intra_flag for different slice types.

Example values of the initValue variable for coding the hevc_intra_flag for different context indices and slice types are shown in Table 1 below. A video coder may determine the context index value (0, 1, or 2) for coding the hevc_intra_flag for a current depth block based values for the hevc_intra_flag for neighboring blocks, as discussed above. Similarly, example values of the initValue variable for coding the sdc_flag for different context indices and slice types are shown in Table 2 below. A video coder may determine the context index value (0, 1, or 2) for coding the sdc_flag for a current depth block based values for the sdc_flag for neighboring blocks, as discussed above.

TABLE 1

Values of initValue for ctxIdx of hevc_intra_flag.

| ctxIdx (context index) | 0 | 1 | 2 |
|---|---|---|---|
| B slice | 154 | 155 | 156 |
| P slice | 141 | 185 | 214 |
| I slice | 155 | 170 | 157 |

TABLE 2

Values of initValue for ctxIdx of sdc_flag.

| ctxIdx (context index) | 0 | 1 | 2 |
|---|---|---|---|
| B slice | 214 | 229 | 230 |
| P slice | 215 | 202 | 174 |
| I slice | 213 | 201 | 246 |

In some examples, a video coder only uses and updates one initialized probability state for CABAC coding of the hevc_intra_flag, regardless of the value of the hevc_intra_flag for the left neighboring block or the above neighboring block of the current prediction unit. In other words, a video coder may set an initial probability state for coding the hevc_intra_flag for a current depth block without reference to a value of the hevc_intra_flag for any neighboring depth block of the current depth block. In such examples, the video coder may still determine a slice type of a slice that includes the current depth block, and select the initial probability state for coding the hevc_intra_flag from a plurality of probability states based on the determined slice type. Example values of the initValue variable for coding the hevc_intra_flag for different slice types are shown in Tables 3 and 4 below.

TABLE 3

Values of initValue for hevc_intra_flag.

| B slice | 169 |
|---|---|
| P slice | 127 |
| I slice | 142 |

TABLE 4

Values of initValue for hevc_intra_flag.

| B slice | 154 |
|---|---|
| P slice | 141 |
| I slice | 155 |

In some examples, a video coder only uses and updates one initialized probability state for CABAC coding of the sdc_flag, regardless of the value of the sdc_flag for the left neighboring block or the above neighboring block of the current prediction unit. In other words, a video coder may set an initial probability state for coding the sdc_flag for a current depth block without reference to a value of the sdc_flag for any neighboring depth block of the current depth block. In such examples, the video coder may still determine a slice type of a slice that includes the current depth block, and select the initial probability state for coding the sdc_flag from a plurality of probability states based on the determined slice type. Example values of the initValue variable for coding the sdc_flag for different slice types are shown in Table 5.

TABLE 5

Values of initValue for sdc_flag.

| B slice | 200 |
|---|---|
| P slice | 202 |
| I slice | 288 |

In some examples, a video coder only uses and updates one initialized probability state for CABAC coding of each of the hevc_intra_flag and sdc_flag, regardless of the value of the hevc_intra_flag or sdc_flag for the left neighboring block or the above neighboring block of the current prediction unit. In other words, a video coder may set initial probability states for coding both the hevc_intra_flag and sdc_flag for a current depth block without reference to values of the hevc_intra_flag and sdc_flag for any neighboring depth block of the current depth block.

One or more example implementations of the techniques of this disclosure to a decoding process, e.g., as may be implemented by video decoder 30 in accordance with this disclosure, are described below. Certain aspects of this disclosure change the CABAC parsing process of the decoding process that video decoder 30 may implement. The new parts of the CABAC parsing process added by aspects of this disclosure are distinguished by underlining, and the parts of the CABAC parsing process deleted by aspects of this disclosure are marked between the bookend labels of <start removal> and <end removal>. Changes described herein are relative to the 3D-HEVC Draft Text 2.

As discussed above, in some examples a video coder, such as a video decoder, selects different initial probability states to code the hevc_intra_flag and sdc_flag using a CABAC process for different slice types, and also based on the context of the neighboring blocks. In one example CABAC parsing process, three initialized values (use to derive initialize probability state) are provided for hevc_intra_flag/sdc_flag for each slice type (including B slice, P slice, and I slice) respectively. According to the example, nine initialized values are provided for hevc_intra_flag/sdc_flag in total, as specified in Tables H-24 and H-25 below. Additionally, Table H-10 is a description of which initialized values in Table H-24/H-25 a video decoder use for each slice type, in which initType equal to 0, 1, and 2 corresponds to B slice, P slice and I slice respectively. For example, a video decoder uses initialized values with ctxIdx equal to 3~5 in Table H-24/H-25 for a P slice. Note that ctxIdx is an index to a certain context model used for a given syntax element/variable. Furthermore, Tables H-22 and H-23 below, when considered together, specify which initialized value described in Table H-10 a video decoder uses in different cases (for all slice types). In the case of a P slice, for example, Table H-10 specifies that ctxIdx equal to 3~5 are used for P slice. In such an example, ctxInc equal to i means ctxIdx equal to 3+i in Table H-24/H-25 is used to code a depth block in the P slice.

In typical CABAC coding, a syntax element may be coded (e.g., by video decoder 30 and/or video encoder 20) with or without dependency on the neighboring blocks. If ctxIdx of a context variable is independent of neighboring blocks, the binarization of this variable is described in Table H-22 below. Otherwise (i.e., if ctxIdx of a context variable depends on neighboring blocks), ctxInc of the context variable is described in Table H-23 below. Therefore, ctxInc, being a different index from the context models of each context variable, should be described in either Table H-22 or Table H-23, but will not be described in both tables, for a given syntax element. In some examples, as described above, ctxIdx of hevc_intra_flag and/or sdc_flag depends on neighboring blocks. In such examples, ctxInc of the hevc_intra_flag and/or sdc_flag are described in Table H-23.
H.9.3 CABAC Parsing Process for Slice Segment Data
. . . .
H.9.3.2.2 Initialization Process for Context Variables
. . . .

TABLE H-10

Association of ctxIdx and syntax elements for each initializationType in the initialization process

| Syntax structure | Syntax element | ctxIdxTable | initType 0 | 1 | 2 |
|---|---|---|---|---|---|
| coding_unit( ) | ... | | | | |
| depth_mode_parameters( ) | sdc_flag | Table H-24 | 0..2 | 3..5 | 6..8 |
| | hevc_ultra_flag | Table H-25 | 0..2 | 3..5 | 6..8 |
| | ... | | | | |

<Start removal>TABLE H-2x

Values of variable initValue for sdc_flag ctxIdx

| Initialization variable | sdc_flag | | | | | | | | |
|---|---|---|---|---|---|---|---|---|---|
| | 0 | 1 | 2 | 3 | 4 | 5 | 6 | 7 | 8 |
| initValue | 154 | 154 | 154 | 154 | 154 | 154 | 154 | 154 | 154 |

TABLE H-2x

Values of variable initValue for hevc_intra_flag ctxIdx

| Initialization variable | hevc_intra_flag | | | | | | | | |
|---|---|---|---|---|---|---|---|---|---|
| | 0 | 1 | 2 | 3 | 4 | 5 | 6 | 7 | 8 |
| initValue | 154 | 154 | 154 | 154 | 154 | 154 | 154 | 154 | 154<end removal> |

TABLE H-24

Values of variable initValue for sdc flag ctxIdx

| Initialization variable | ctxIdx of sdc flag | | | | | | | | |
|---|---|---|---|---|---|---|---|---|---|
| | 0 | 1 | 2 | 3 | 4 | 5 | 6 | 7 | 8 |
| initValue | 214 | 229 | 230 | 215 | 202 | 174 | 213 | 201 | 246 |

TABLE H-25

Values of variable initValue for hevc intra flag ctxIdx

| Initialization variable | ctxIdx of hevc intra flag | | | | | | | | |
|---|---|---|---|---|---|---|---|---|---|
| | 0 | 1 | 2 | 3 | 4 | 5 | 6 | 7 | 8 |
| initValue | 154 | 155 | 156 | 141 | 185 | 214 | 155 | 170 | 157 |

H.9.3.4.2.1 General

The specifications in subclause 9.3.4.2.1 apply with the following modifications: Table H-22 is appended to the end of Table 9-37.

TABLE H-22

Assignment of ctxInc to syntax elements with context coded bins

| Syntax element | binIdx | | | | | |
|---|---|---|---|---|---|---|
| | 0 | 1 | 2 | 3 | 4 | >=5 |
| wedge_full_tab_idx | 0 | 0 | 0 | 0 | 0 | 0 |
| depth_dc_flag | 0 | na | na | na | na | na |
| depth_dc_abs | 0 | 0 | 0 | 0 | 0 | 0 |
| depth_dc_sign_flag | bypass | 0 | 0 | 0 | 0 | 0 |
| res_pred_flag | 0 | na | na | na | na | na |
| ic_flag | 0 | na | na | na | na | na |
| inter_sdc_flag | 0 | na | na | na | na | na |
| inter_sdc_resi_abs_minus1 | 0 | 0 | 0 | 0 | 0 | 0 |
| inter_sdc_resi_sign_flag | 0 | na | na | na | na | na |

H.9.3.4.2.2 Derivation Process of ctxInc Using Left and Above Syntax Elements

The specifications in subclause 9.3.4.2.2 apply with the following modifications: Table H-23 is appended to the end of Table 9-38.

TABLE H-23

| Syntax element | condL | condA | ctxIdxInc |
|---|---|---|---|
| iv_res_pred_weight_idx | iv_res_pred_weight_idx [xL][yL] | iv_res_pred_weight_idx [xA][yA] | (condL && availableL) + (condA && availableA) |
| ic_flag | ic_flag[xL][yL] | ic_flag[xA][yA] | (condL && availableL) + (condA && availableA) |
| sdc_flag | sdc_flag[xL][yL] | sdc_flag[xA][yA] | (condL && availableL) + (condA && availableA) |
| hevc_intra_flag | hevc_intra_flag[xL][yL] | hevc_intra_flag[xA][yA] | (condL && availableL) + (condA && availableA) |

As discussed above, in some examples a video coder, such as a video decoder, selects different initial probability states to code the hevc_intra_flag using a CABAC process for different slice types, but without considering the context of the neighboring blocks. Such examples may provide non-equal probability for different slice types, but not depending on the context of the neighboring blocks, to code hevc_intra_flag. In such examples, only one initialized value (used to derive initialized probability state) is provided and updated for CABAC coding of hevc_intra_flag for each slice type. Therefore, three initialized values (one for each slice type including B slice, P slice and I slice) are provided in Table H-25, and Table H-10 is also modified accordingly. Meanwhile, ctxIdx of hevc_intra_flag is always 0, and is independent of neighboring blocks. Therefore, according to such example implementations, ctxInc of the hevc_intra_flag is removed from Table H-23, and added into Table H-22.

The changes to 3D-HEVC Draft Text 2 for this example implementation are illustrated as changes relative to the previous example implementation in which the initial probability states for both the hevc_intra_flag and sdc_flag are determined based on the context of the neighboring blocks. Additions are distinguished by underlining, and the deleted parts are marked between the bookend labels of <start removal>and<end removal> below.

H.9.3 CABAC Parsing Process for Slice Segment Data
. . . .
H.9.3.2.2 Initialization Process for Context Variables
. . . .

TABLE H-10

Association of ctxIdx and syntax elements for each initializationType in the initialization process

| Syntax structure | Syntax element | ctxIdxTable | initType 0 | 1 | 2 |
|---|---|---|---|---|---|
| coding_unit( ) depth_mode_parameters( ) | ... sdc_flag hevc_intra_flag ... | Table H-24 Table H-25 | 0..2 0 | 3..5 1 | 6..8 2 |

TABLE H-25

Values of variable initValue for hevc intra flag ctxIdx

|  | ctxIdx of hevc intra flag | | |
|---|---|---|---|
| Initialization variable | 0 | 1 | 2 |
| initValue | 169 | 127 | 142 |

Alternatively, equal probable state may be used as initialization probability state for hevc_intra_flag, and Table H-25 is designed as follows:

TABLE H-25

Values of variable initValue for hevc intra flag ctxIdx

|  | ctxIdx of hevc_intra_flag | | |
|---|---|---|---|
| Initialization variable | 0 | 1 | 2 |
| initValue | 154 | 154 | 154 |

H.9.3.4.2.1 General

The specifications in subclause 9.3.4.2.1 apply with the following modifications:

Table H-22 is appended to the end of Table 9-37.

TABLE H-22

Assignment of ctxInc to syntax elements with context coded bins

|  | binIdx | | | | | |
|---|---|---|---|---|---|---|
| Syntax element | 0 | 1 | 2 | 3 | 4 | >=5 |
| wedge_full_tab_idx | 0 | 0 | 0 | 0 | 0 | 0 |
| depth_dc_flag | 0 | na | na | na | na | na |
| depth_dc_abs | 0 | 0 | 0 | 0 | 0 | 0 |
| depth_dc_sign_flag | bypass | 0 | 0 | 0 | 0 | 0 |
| res_pred_flag | 0 | na | na | na | na | na |
| ic_flag | 0 | na | na | na | na | na |
| inter_sdc_flag | 0 | na | na | na | na | na |
| inter_sdc_resi_abs_minus1 | 0 | 0 | 0 | 0 | 0 | 0 |
| inter_sdc_resi_sign_flag | 0 | na | na | na | na | na |
| hevc_intra_flag | 0 | na | na | na | na | na |

H.9.3.4.2.2 Derivation Process of ctxInc Using Left and Above Syntax Elements

The Specifications in Subclause 9.3.4.2.2 Apply with the Following Modifications:

Table H-23 is appended to the end of Table 9-38.

TABLE H-23

Specification of ctxInc using left and above syntax elements

| Syntax element | condL | condA | ctxIdxInc |
|---|---|---|---|
| iv_res_pred_weight_idx | iv_res_pred_weight_idx [xL][yL] | iv_res_pred_weight_idx [xA][yA] | (condL && availableL) + (condA && availableA) |
| ic_flag | ic_flag[xL][yL] | ic_flag[xA][yA] | (condL && availableL) + (condA && availableA) |
| sdc_flag | sdc_flag[xL][yL] | sdc_flag[xA][yA] | (condL && availableL) + (condA && availableA) |
| <start removal> hevc_intra_flag | hevc_intra_flag[xL][yL] | hevc_intra_flag[xA][yA] | (condL && availableL) + (condA && availableA) <end removal> |

As discussed above, in some examples a video coder, such as a video decoder, selects different initial probability states to code the sdc_flag using a CABAC process for different slice types, but without considering the context of the neighboring blocks. Such examples may provide non-equal probability for different slice types, but not depending on the context of the neighboring blocks, to code sdc_flag. In such examples, only one initialized value (used to derive initialized probability state) is provided and updated for CABAC coding of sdc_flag for each slice type. Therefore, according to this example implementation, three initialized values (one for each slice type including B slice, P slice and I slice) are provided in Table H-24, and Table H-10 is also modified accordingly. Meanwhile, ctxIdx of sdc_flag is always 0, and is independent of neighboring blocks. Therefore, according to such example implementations, ctxInc of the sdc_flag is removed from Table H-23 and added into Table H-22.

The changes to 3D-HEVC Draft Text 2 for this example implementation are illustrated as changes relative to the first example implementation in which the initial probability states for both the hevc_intra_flag and sdc_flag are determined based on the context of the neighboring blocks. Additions are distinguished by underlining, and the deleted parts are marked between the bookend labels of <start removal>and <end removal> below.

H.9.3 CABAC Parsing Process for Slice Segment Data
. . . .
H.9.3.2.2 Initialization Process for Context Variables
. . . .

TABLE H-10

Association of ctxIdx and syntax elements for each initializationType in the initialization process

| Syntax structure | Syntax element | ctxIdxTable | initType 0 | 1 | 2 |
|---|---|---|---|---|---|
| coding_unit( ) | ... | | | | |
| depth_mode_parameters( ) | sdc_flag | Table H-24 | 0 | 1 | 2 |
| | hevc_ultra_flag | Table H-25 | 0..2 | 3..5 | 6..8 |
| | ... | | | | |

TABLE H-24

Values of variable initValue for sdc flag ctxIdx

| | ctxIdx of sdc flag | | |
|---|---|---|---|
| Initialization variable | 0 | 1 | 2 |
| initValue | 200 | 202 | 288 |

In some examples, equal probable state is used as the initialization probability state for sdc_flag, and Table H-24 is designed as follows.

TABLE H-24

Values of variable initValue for sdc flag ctxIdx

| | ctxIdx of sdc flag | | |
|---|---|---|---|
| Initialization variable | 0 | 1 | 2 |
| initValue | 154 | 154 | 154 |

H.9.3.4.2.1 General

The specifications in subclause 9.3.4.2.1 apply with the following modifications:

Table H-22 is appended to the end of Table 9-37.

TABLE H-22

Assignment of ctxInc to syntax elements with context coded bins

| | binIdx | | | | | |
|---|---|---|---|---|---|---|
| Syntax element | 0 | 1 | 2 | 3 | 4 | >=5 |
| wedge_full_tab_idx | 0 | 0 | 0 | 0 | 0 | 0 |
| depth_dc_flag | 0 | na | na | na | Na | na |
| depth_dc_abs | 0 | 0 | 0 | 0 | 0 | 0 |
| depth_dc_sign_flag | bypass | 0 | 0 | 0 | 0 | 0 |
| res_pred_flag | 0 | na | na | na | Na | na |
| ic_flag | 0 | na | na | na | Na | na |
| inter_sdc_flag | 0 | 0 | 0 | 0 | 0 | 0 |
| inter_sdc_resi_abs_minus1 | 0 | 0 | 0 | 0 | 0 | 0 |
| inter_sdc_resi_sign_flag | 0 | 0 | 0 | 0 | 0 | 0 |
| sdc_flag | 0 | na | na | na | Na | na |

H.9.3.4.2.2 Derivation Process of ctxInc Using Left and Above Syntax Elements

The specifications in subclause 9.3.4.2.2 apply with the following modifications:

Table H-23 is appended to the end of Table 9-38.

TABLE H-23

Specification of ctxInc using left and above syntax elements

| Syntax element | condL | condA | ctxIdxInc |
|---|---|---|---|
| iv_res_pred_weight_idx | iv_res_pred_weight_idx [xL][yL] | iv_res_pred_weight_idx [xA][yA] | (condL && availableL) + (condA && availableA) |
| ic_flag | ic_flag[xL][yL] | ic_flag[xA][yA] | (condL && availableL) + (condA && availableA) |
| <start removal> sdc_flag | sdc_flag[xL][yL] | sdc_flag[xA][yA] | (condL && availableL) + (condA && availableA) <end removal> |
| hevc_intra_flag | hevc_intra_flag[xL][yL] | hevc_intra_flag[xA][yA] | (condL && availableL) + (condA && availableA) |

In some examples of the techniques of this disclosure, a video encoder, e.g., video encoder 20, may be configured to use a view synthesis optimization (VSO) process for identification of a DC residual value to encode in an encoded video bitstream. In such examples, the video encoder may be configured, for each partition within a PU encoded with SDC mode, to determine a DC residual of the partition by searching from a set of candidate values through a VSO process. With respect to VSO, while lossy coding of depth data causes distortions in the synthesized intermediate views, the geometry information given by depth data is exploited only indirectly in the rendering process, and depth map itself is not visible to a viewer. The efficiency of depth coding may be improved using a VSO process by considering these properties. According to a VSO process, the distortion measure for the mode decision process for depth maps may be modified such that a weighted average of the synthesized view distortion and the depth map distortion may be obtained. To obtain a measure of the synthesized view distortion, two different metrics are applied in rate distortion optimization (RDO).

The first metric is the synthesized view distortion change (SVDC). The computation of the SVDC requires the usage of rendering functionalities in the encoding process. Since computational complexity is a critical factor in distortion calculation, a method, which is also referred to as renderer model, has been utilized that allows minimal re-rendering of parts of the synthesized view that are affected by a depth distortion. For this, a special renderer is included in the video encoder, e.g., video encoder 20, which supports the basic functionalities, shared by most rendering approaches, like sub-sample accurate warping, hole filling and view blending. The second metric is a model based synthesized view distortion estimation without rendering, which may be an estimate derived for the synthesized view distortion by weighting the depth distortion with a factor derived from the absolute value of the derivation of texture view in horizontal direction. More details of view synthesis optimization can be found in 3D-HEVC Test Model 5.

As described herein, a video encoder, e.g., video encoder 20, may be configured to apply an SDC mode to determine at least one DC residual value for a depth block, e.g., a single DC residual value for the block, or a DC residual value for each of a plurality of partitions of the depth block. In some examples, the video encoder may be further configured to identify a set of candidate DC residual values within a range of DC residual values that includes the determined DC residual value. In such examples, the video encoder applies a VSO process to each of the set of candidate DC residual values, and selects one DC residual value from the set of candidate DC residual values based on the VSO process. The video encoder is further configured to encode the selected DC residual value into an encoded video bitstream. That is, the video encoder may encode a value for the selected DC residual value for all or a portion of a coding unit (CU) in place of a transform unit including quantized transform coefficients representative of a residual block for the CU (or a portion of the CU). A video coder may be configured to apply this example technique for any Intra mode belonging to one of the DMM modes, HEVC Intra prediction modes to a CU size up to 32×32 and HEVC fashion Intra prediction modes for a CU size up to 64×64.

For example, let DCPred[i] be the partition specific DC predictor of partition i, and DCOrig[i] be the original DC of partition i. In such example, when a DLT table is not used, let DCResi[i]=DCOrig[i]−DCPred[i], i=0, 1. DC residual of partition i is determined, e.g., by video encoder 20, by searching a plurality of, e.g., all, candidate values in [DCResi[i]−Offset1, DCResi[i]+Offset2] through a VSO process. The video encoder may select the candidate value with the smallest cost, calculated according to the VSO process, as the DC residual. Offset1 and Offset2 may be non-negative integer values, and may be selected to adjust the search range of DC residual. In one example, Offset and Offset2 are both set to 2.

When the video encoder uses a DLT table, Depth2Idx, DCResi[i]=Depth2Idx[DCOrig[i]]−Depth2Idx[DCPred[i]], i=0, 1. In such example, the DC residual of partition i is determined, e.g., by video encoder 20, by searching a plurality of, e.g., all, candidate values in [DCResi[i]−Offset, DCResi[i]+Offset2] through a VSO process. The video encoder may select the candidate value with the smallest cost, calculated in the VSO process, as the DC residual for the depth block. Offset1 and Offset2 may be non-negative integer values, which may be selected to adjust the search range of DC residual values. In one example, Offset1 and Offset2 are both set to 2.

Figure 7:
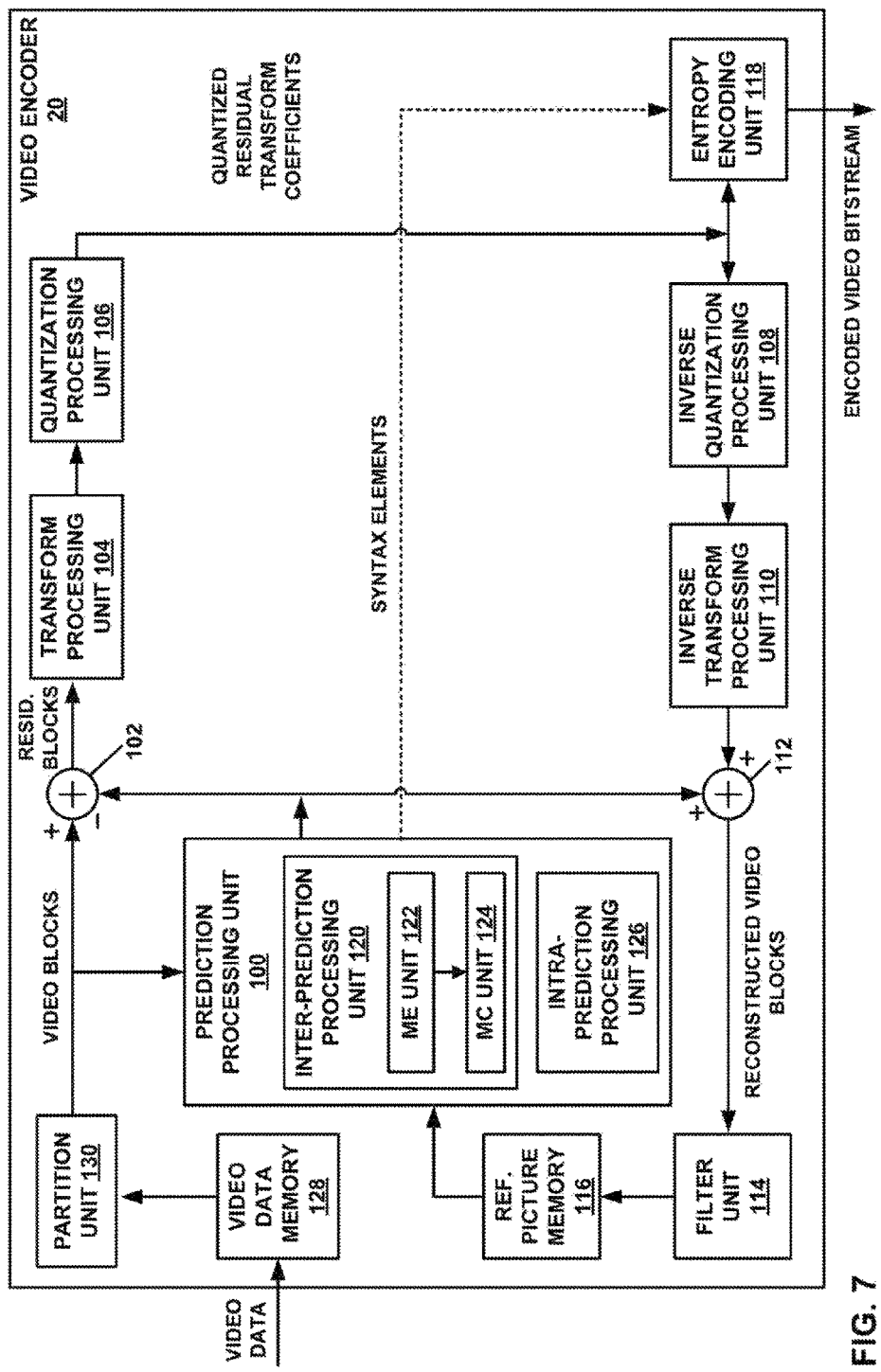
FIG. 7 is a block diagram illustrating an example video encoder that may implement the techniques of this disclosure.

FIG. 7 is a block diagram illustrating an example video encoder 20 that may be configured to implement the techniques of this disclosure. FIG. 7 is provided for purposes of explanation and should not be considered limiting of the techniques as broadly exemplified and described in this disclosure. For purposes of explanation, this disclosure describes video encoder 20 in the context of HEVC coding and, more particularly, 3D-HEVC. However, the techniques of this disclosure may be applicable to other coding standards or methods.

In the example of FIG. 7, video encoder 20 includes a prediction processing unit 100, a residual generation unit 102, a transform processing unit 104, a quantization processing unit 106, an inverse quantization processing unit 108, an inverse transform processing unit 110, a reconstruction unit 112, a filter unit 114, a reference picture memory 116, an entropy encoding unit 118, a video data memory 128, and a partition unit 130. Prediction processing unit 100 includes an inter-prediction processing unit 120 and an intra-prediction processing unit 126. Inter-prediction processing unit 120 includes a motion estimation (ME) unit 122 and a motion compensation (MC) unit 124. In other examples, video encoder 20 may include more, fewer, or different functional components.

Video encoder 20 may receive video data. Video data memory 128 may store video data to be encoded by the components of video encoder 20. The video data stored in video data memory 128 may be obtained, for example, from video source 18. Reference picture memory 116 may be a reference picture memory that stores reference video data for use in encoding video data by video encoder 20, e.g., in intra- or inter-coding modes. Video data memory 128 and reference picture memory 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 128 and reference picture memory 116 may be provided by the same memory device or separate memory devices. In various examples, video data memory 128 may be on-chip with other components of video encoder 20, or off-chip relative to those components.

Partition unit 130 may receive video data from video data memory 128, and partition the pictures within video data into sub-units, e.g., into slices, tiles, and video blocks, including coding tree blocks (CTBs), also referred to as largest coding units (LCUs), which may be further partitioned into coding tree units (CTUs), also referred to as coding units (CUs). Video encoder 20 may encode each CTU in a slice of a picture of the video data. Each of the CTUs may be associated with equally-sized luma coding tree blocks (CTBs) and corresponding CTBs of the picture. As part of encoding a CTU, partition unit 130 may perform quad-tree partitioning to divide the CTBs of the CTU into progressively-smaller blocks. The smaller block may be coding blocks of CUs. For example, partition unit 124 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks.

Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction. In accordance with aspects of this disclosure, video encoder 20 and video decoder 30 also support non-rectangular partitions of a PU for depth inter coding.

Inter-prediction processing unit 120 may generate predictive data for a PU by performing inter prediction on each PU of a CU. The predictive data for the PU may include a predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference pictures may be stored in reference picture memory 116. The reference region for the PU may be a region, within a reference picture, that contains sample blocks that most closely corresponds to the sample blocks of the PU. Motion estimation unit 122 may generate a reference index that indicates a position in RefPicList0 of the reference picture containing the reference region for the PU. In addition, motion estimation unit 122 may generate an MV that indicates a spatial displacement between a coding block of the PU and a reference location associated with the reference region. For instance, the MV may be a two-dimensional vector that provides an offset from the coordinates in the current decoded picture to coordinates in a reference picture. Motion estimation unit 122 may output the reference index and the MV as the motion information of the PU. Motion compensation unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive sample blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference picture indexes that indicate positions in RefPicList0 and RefPicList1 of the reference pictures that contain the reference regions. In addition, motion estimation unit 122 may generate MVs that indicate spatial displacements between the reference location associated with the reference regions and a sample block of the PU. The motion information of the PU may include the reference indexes and the MVs of the PU. Motion compensation unit 124 may generate the predictive sample blocks of the PU based at least in part on actual or interpolated samples at the reference region indicated by the motion vector of the PU.

Intra-prediction processing unit 126 may generate predictive data for a PU by performing intra prediction on the PU.

The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU, and then select one of the intra-prediction modes that yields acceptable or optimal coding performance, e.g., using rate-distortion optimization techniques. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU. In some examples, intra-prediction processing unit 126 may use any of the non-partition based or partition-based intra prediction modes described herein for a current block, e.g., PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization processing unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization processing unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization processing unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Reference picture memory 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in reference picture memory 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Video encoder 20 is an example of a video encoder configured to perform any of the techniques for simplified residual coding for depth intra prediction described herein. In accordance with one or more techniques of this disclosure, one or more units within video encoder 20 may perform one or more techniques described herein as part of a video encoding process. Similarly, video encoder 20 may perform a video decoding process using any of the techniques of this disclosure, to reproduce video data used as reference for subsequently coded video data. As discussed above, inverse quantization processing unit 108, inverse transform processing unit 110, and reconstruction unit 112, among other elements of video encoder 20, may be utilized in the video decoding process. Additional 3D components may also be included within video encoder 20.

For example, prediction processing unit 100 and, more particularly, intra-prediction processing unit 126, may perform an SDC mode for depth intra prediction encoding depth blocks as described herein. Intra-prediction processing unit 126 may determine a DC residual value for the depth block, e.g., PU, or each partition thereof. In some examples, intra-prediction processing unit 126 may apply a VSO process to a set of candidate DC residual values within a range that includes a determined DC residual value, and select one of the DC residual values from the set, as described herein.

Intra-prediction processing unit 126 may provide DC residual value(s) for the depth block, along with other syntax information, to entropy encoding unit 118, e.g., as illustrated by the dashed line in FIG. 7. Intra-prediction processing unit 126 may provide the DC residual values to entropy encoding unit 118 without the values being processed by transform processing unit 104 and quantization unit 106. In other examples, quantization unit 106 may quantize the DC residual values prior to entropy coding by entropy encoding unit 118. The syntax information may include various information, flags, or other syntax elements described herein for signaling in association with the techniques of this disclosure. For example, the syntax information may indicate, as examples, whether the SDC mode is performed for the depth block, e.g., an sdc_flag, whether a partition-based (e.g., 3D-HEVC) or non-partition-based (HEVC) mode was used to determine the DC residual value, e.g., an hevc_intra_flag, and which depth intra prediction mode was used to determine the DC residual value. In some examples, entropy encoding unit 118 is configured to initialize a probability state for encoding the syntax elements, e.g., the hevc_intra_flag and/or sdc_flag, according to a CABAC process to a non-equal probability state. In some examples, entropy encoding unit 118 is configured to initialize a probability state for encoding these syntax elements according to a CABAC process to a value determined based on a slice type associated with a current block.

Accordingly, video encoder 20 is an example of a video encoder configured to encode information into a bitstream, the information indicating which of at least three depth intra prediction modes is used to encode a depth block and, for any of the at least three depth intra prediction modes, perform a simplified depth coding (SDC) mode for encoding the depth block. According to the SDC mode, video encoder 20 is configured to determine at least one DC residual value for the depth block based on the indicated one of the depth intra prediction modes, wherein the DC residual value represents residual values of a plurality of pixels of the depth block, and encode the DC residual value into the bitstream.

Video encoder 20 is also an example of a video encoder configured to encode information in a bitstream, the information indicating that one of depth modeling mode 3 or depth modeling mode 4 is used to code a depth block, determine a partitioning pattern for the depth block based on a co-located texture block and the indicated depth modeling mode, and partition the depth block into two partitions based on the partitioning pattern. Video encoder 20 is an example of a video encoder further configured to perform a simplified depth coding (SDC) mode for encoding the depth block, the SDC mode comprising, for each of the partitions of the depth block, encoding a respective DC residual value in the bitstream, wherein the DC residual value represents residual values of the pixels of the partition.

Video encoder 20 is also an example of a video encoder configured to encode information in a bitstream, the information indicating that a region boundary chain coding mode is used code a depth block, and encode information in the bitstream defining a plurality of chains that define a boundary between two partitions of the depth block based on the region boundary chain coding mode. Video encoder 20 is an example of a video encoder further configured to partition the depth block into two partitions based on the boundary, and perform a simplified depth coding (SDC) mode for encoding the depth block, the SDC mode comprising, for each of the partitions of the depth block, encoding a respective DC residual value in the bitstream, wherein the DC residual value represents residual values of the pixels of the partition.

Video encoder 20 is also an example of a video encoder configured to encode information in a bitstream, the information indicating that a DC intra prediction mode is used code a depth block, determine respective predictor values for each of the pixels in the depth block based on the DC intra prediction mode, and perform a simplified depth coding (SDC) mode for encoding the depth block, the SDC mode comprising encoding a single DC residual value in the bitstream, wherein the DC residual value is determined based on the predictor values and represents residual values of the pixels of the depth block.

Video encoder 20 is also an example of a video encoder configured to encode information in a bitstream, the information indicating that a directional intra prediction mode is used code a depth block, determine respective predictor values for each of the pixels in the depth block based on the directional intra prediction mode, and perform a simplified depth coding (SDC) mode for encoding the depth block, the SDC mode comprising encoding a single DC residual value in the bitstream, wherein the DC residual value is determined based on the predictor values and represents residual values of the pixels of the depth block.

A device may comprise video encoder 20, which comprises memory configured to store an encoded video bitstream that encodes the video data, and one or more processors. The one or more processors are configured to select a depth intra prediction mode for encoding a depth block in an encoded video bitstream from a plurality of depth intra prediction modes, determine whether to perform a simplified depth coding (SDC) mode for encoding the depth block in the encoded video bitstream, the SDC mode comprising encoding at least one DC residual value in the bitstream, wherein the DC residual value represents residual values of a plurality of samples of the depth block, and encode the depth block in the encoded video bitstream according to the selected depth intra prediction mode and the determination of whether to perform the SDC mode. The one or more processors are configured to encode a first syntax element in the encoded video bitstream, wherein a first value of the first syntax element indicates that the selected depth intra prediction mode is one of a Planar intra prediction mode, DC intra prediction mode, or directional intra prediction mode, and a second value of the first syntax element indicates that the selected depth intra prediction mode for the depth block is one of a plurality of depth modeling modes or a region boundary chain coding mode. The one or more processors are configured to encode a second syntax element in the encoded video bitstream, wherein the second syntax element indicates whether the SDC mode was performed to encode the depth block in the encoded video bitstream.

A device may comprise video encoder 20, which comprises memory configured to store an encoded video bitstream that encodes the video data, and one or more processors. The one or more processors are configured to encode a depth block according to a depth intra prediction mode selected from a plurality of depth intra prediction modes, wherein encoding the depth block comprises performing a simplified depth coding (SDC) mode to determine at least one DC residual value for the depth block based on the indicated one of the depth intra prediction modes, wherein the DC residual value represents residual values of a plurality of samples of the depth block. The one or more processors are further configured to identify a set of candidate DC residual values within a range of DC residual values that includes the determined DC residual value, apply a view synthesis optimization process to each of the set of candidate DC residual values, and select one DC residual value from the set of candidate DC residual values based on the view synthesis optimization process. The one or more processors are further configured to encode the selected DC residual value into an encoded video bitstream.

FIG. 8 is a block diagram illustrating an example video decoder 30 that is configured to perform the techniques of this disclosure. FIG. 8 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 8, video decoder 30 includes video data memory 148, an entropy decoding unit 150, a prediction processing unit 152, an inverse quantization processing unit 154, an inverse transform processing unit 156, a reconstruction unit 158, a filter unit 160, and a reference picture memory 162. Prediction processing unit 152 includes a motion compensation unit 164 and an intra-prediction processing unit 166. In other examples, video decoder 30 may include more, fewer, or different functional components.

Video data memory 148 may store video data, such as an encoded video bitstream, to be decoded by the components of video decoder 30. The video data stored in video data memory 148 may be obtained, for example, from computer-readable medium 16, e.g., from a local video source, such as a camera, via wired or wireless network communication of video data, or by accessing physical data storage media. Video data memory 148 may form a coded picture buffer (CPB) that stores encoded video data from an encoded video bitstream. Reference picture memory 162 may store reference video data for use in decoding video data by video decoder 30, e.g., in intra- or inter-coding modes. Video data memory 148 and reference picture memory 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 148 and reference picture memory 296 may be provided by the same memory device or separate memory devices. In various examples, video data memory 148 may be on-chip with other components of video decoder 30, or off-chip relative to those components.

Video decoder 30 may receive an encoded video bitstream that represents video blocks and associated syntax elements from video encoder 20. Entropy decoding unit 150 may parse the bitstream to decode syntax elements from the bitstream. Entropy decoding unit 150 may entropy decode entropy-encoded syntax elements in the bitstream. Prediction processing unit 152, inverse quantization processing unit 154, inverse transform processing unit 156, reconstruction unit 158, and filter unit 160 may generate decoded video data based on the syntax elements extracted from the bitstream.

The bitstream may comprise a series of NAL units. The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice. The PPS may refer to an SPS, which may in turn refer to a VPS. Entropy decoding unit 150 may also entropy decode other elements that may include syntax information, such as SEI messages. Decoded syntax elements in any of the slice header, parameter sets, or SEI messages may include information described herein as being signaled to perform the SDC mode and simplified residual coding techniques described herein. For example, the decoded syntax elements may indicate whether the SDC mode is performed for the depth block, e.g., an sdc_flag, whether a partition-based (e.g., 3D-HEVC) or non-partition-based (HEVC) mode was used to determine the DC residual value, e.g., a hevc_intra_flag, and which depth intra prediction mode was used to determine the DC residual value. Such syntax information may be provided to prediction processing unit 152 for reconstruction of a depth block according to the techniques described herein. In some examples, entropy decoding unit 150 is configured to initialize a probability state for decoding the syntax elements, e.g., the hevc_intra_flag and/or sdc_flag, according to a CABAC process to a non-equal probability state. In some examples, entropy decoding unit 150 is configured to initialize a probability state for decoding these syntax elements according to a CABAC process to a value determined based on a slice type associated with a current block.

In general, in addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct blocks of the CU.

As part of performing a reconstruction operation on a TU of a CU, inverse quantization processing unit 154 may inverse quantize, i.e., de-quantize, coefficient blocks associated with the TU. Inverse quantization processing unit 154 may use a QP value associated with the CU of the TU to determine a degree of quantization and, likewise, a degree of inverse quantization for inverse quantization unit processing 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization processing unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Continuing reference is now made to FIG. 8. Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in reference picture memory 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Video decoder 30 is an example of a video decoder configured to perform any of the techniques for simplified residual coding for depth intra prediction modes, as described herein. In accordance with one or more techniques of this disclosure, one or more units within video decoder 30 may perform one or more techniques described herein as part of a video decoding process. Additional 3D components may also be included within video decoder 30.

For example, prediction processing unit 152 and, more particularly, intra-prediction processing unit 166, may perform an SDC mode for depth intra prediction encoding depth blocks as described herein. Entropy decoding unit 150 may entropy decode one or more DC residual values for a depth block, as well as syntax information described herein, e.g., which depth intra prediction mode was used to encode the block, as well as whether the SDC mode was performed to encode the block.

Entropy decoding unit 150 may provide the DC residual value(s) and the syntax information for the block to prediction processing unit 152, as indicated by the dashed line in FIG. 8. In this manner, the DC residual value(s) need not be first provided to inverse quantization unit 154 and inverse transform processing unit 156 for inverse quantization and inverse transformation. In other examples, inverse quantization unit 154 may inverse quantize the DC residual value(s), and provide de-quantized DC residual values to prediction processing unit 152.

Intra-prediction processing unit 166 may determine predictor values for the depth block based on the depth intra prediction mode indicated by the syntax information, e.g., according to any of the technique described herein. Intra-prediction processing unit 166 may utilize reconstructed depth blocks stored in decoded picture buffer 162 to determine the predictor values. Intra-prediction processing unit 166 may reconstruct the depth block by summing the DC residual value(s) and the predictor values, as described herein. In some examples, intra-prediction processing unit 166 may utilize reconstruction unit 158 for the summing of the residual and predictor values for the depth block. For example, entropy decoding unit 150 may provide the DC residual value(s) to the reconstruction unit, and intra prediction processing unit 166 may provide the predictor values to the reconstruction unit.

Accordingly, video decoder 30 is an example of a video decoder configured to decode information from a bitstream, the information indicating which of at least three depth intra prediction modes is used to decode a depth block, for any of the at least three depth intra prediction modes, perform a simplified depth coding (SDC) mode for decoding the depth block, the SDC mode comprising decoding at least one DC residual value from the bitstream, wherein the DC residual value represents residual values of a plurality of pixels of the depth block, and reconstruct the depth block based on the indicated depth intra prediction mode and the at least one DC residual value.

Video decoder 30 is also an example of a video decoder configured to decode information in a bitstream, the information indicating that one of depth modeling mode 3 or depth modeling mode 4 is used to decode a depth block, determine a partitioning pattern for the depth block based on a co-located texture block and the indicated depth modeling mode, and partition the depth block into two partitions based on the partitioning pattern. Video decoder 30 is an example of a video decoder further configured to perform a simplified depth coding (SDC) mode for decoding the depth block, the SDC mode comprising, for each of the partitions of the depth block, decoding a respective DC residual value in the bitstream, wherein the DC residual value represents residual values of the pixels of the partition.

Video decoder 30 is also an example of a video decoder configured to decode information in a bitstream, the information indicating that a region boundary chain coding mode is used decode a depth block, and decode information in the bitstream defining a plurality of chains that define a boundary between two partitions of the depth block based on the region boundary chain coding mode. Video decoder 30 is an example of a video decoder further configured to partition the depth block into two partitions based on the boundary, and perform a simplified depth coding (SDC) mode for decoding the depth block, the SDC mode comprising, for each of the partitions of the depth block, decoding a respective DC residual value in the bitstream, wherein the DC residual value represents residual values of the pixels of the partition.

Video decoder 30 is also an example of a video decoder configured to decode information in a bitstream, the information indicating that a DC intra prediction mode is used to decode a depth block, determine respective predictor values for each of the pixels in the depth block based on the DC intra prediction mode, and perform a simplified depth coding (SDC) mode for decoding the depth block, the SDC mode comprising decoding a single DC residual value in the bitstream, wherein the DC residual value is determined based on the predictor values and represents residual values of the pixels of the depth block.

Video decoder 30 is also an example of a video decoder configured to decode information in a bitstream, the information indicating that a directional intra prediction mode is used decode a depth block, determine respective predictor values for each of the pixels in the depth block based on the directional intra prediction mode, and perform a simplified depth coding (SDC) mode for decoding the depth block, the SDC mode comprising decoding a single DC residual value in the bitstream, wherein the DC residual value is determined based on the predictor values and represents residual values of the pixels of the depth block.

In some examples, a device may comprise video decoder 30, which comprises memory configured to store an encoded video bitstream that encodes the video data, and one or more processors. The one or more processors are configured to decode a first syntax element from the encoded video bitstream, wherein a first value of the first syntax element indicates that a depth intra prediction mode selected for a depth block from a plurality of depth intra prediction modes is one of a Planar intra prediction mode, DC intra prediction mode, or directional intra prediction mode, and a second value of the first syntax element indicates that the depth intra prediction mode selected for the depth block is one of a plurality of depth modeling modes or a region boundary chain coding mode. The or more processors are configured to decode a second syntax element from the encoded video bitstream, wherein the second syntax element indicates whether to perform a simplified depth coding (SDC) mode to reconstruct the depth block, the SDC mode comprising decoding at least one DC residual value from the bitstream, wherein the DC residual value represents residual values of a plurality of samples of the depth block. The one or more processors are configured to reconstruct the depth block according the depth intra prediction mode selected for the depth block and the indication of whether to perform the SDC mode.

Figure 9:
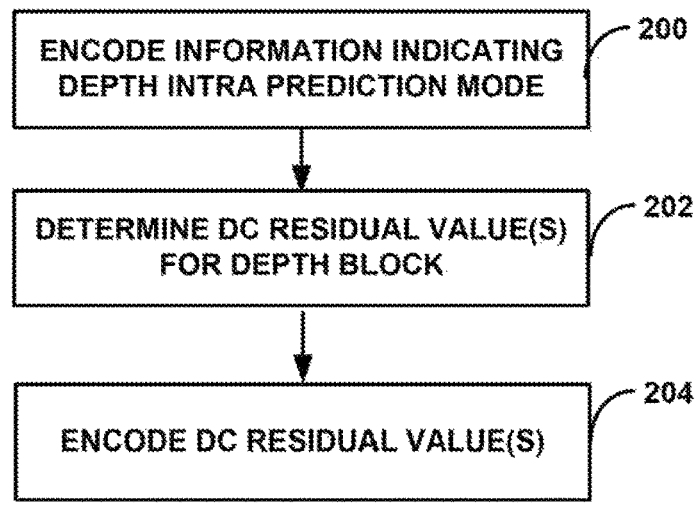
FIG. 9 is a flow diagram illustrating an example method of performing a simplified depth coding (SDC) mode for depth intra prediction encoding a depth block.

FIG. 9 is a flow diagram illustrating an example method of performing a simplified depth coding (SDC) mode for depth intra prediction encoding a depth block. The example method of FIG. 9 may be performed by video encoder 20, as described herein, or any video encoder.

According to the example of FIG. 9, video encoder 20 encodes information into a bitstream, e.g., syntax elements as described herein, that indicates which of at least three depth intra prediction modes is used to encode a depth block (200). The at least three depth intra prediction modes include at least one of DMM 3, DMM 4, chain coding mode, DC mode, and the directional intra prediction modes, and may include any depth intra prediction modes described herein. Video encoder 20 further determines one or more DC residual values for the depth block based on the indicated depth intra prediction mode (202). For example, video encoder 20 may determine a single DC residual value for the depth block when the depth block is encoded using a non-partitioning-based, e.g., HEVC, intra prediction mode, or may determine respective DC residual values for each of two partitions of the depth block when the depth block is encoded using a partitioning-based (e.g., 3D-HEVC) depth intra prediction mode. Video encoder 20 encodes the DC residual value(s) into the bitstream (204).

Figure 10:
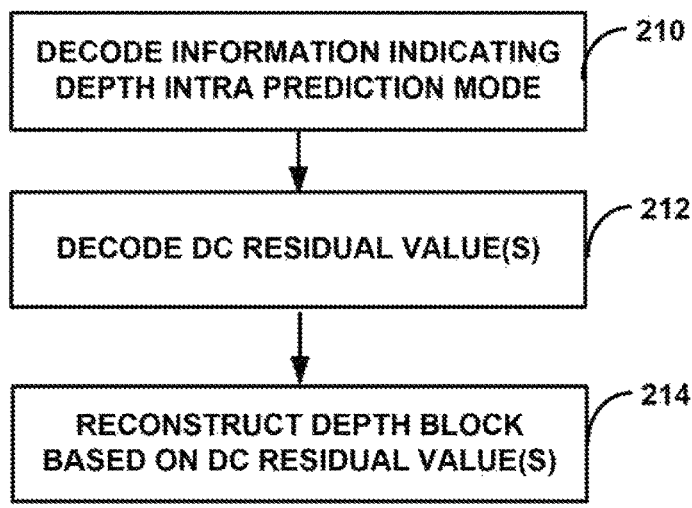
FIG. 10 is a flow diagram illustrating an example method of performing an SDC mode for depth intra prediction decoding a depth block.

FIG. 10 is a flow diagram illustrating an example method of performing an SDC mode for depth intra prediction decoding a depth block. The example method of FIG. 10 may be performed by video decoder 30, as described herein, or any video decoder. Similarly, the method of FIG. 10 may be performed by a video encoder, such as video encoder 20, to generate reconstructed video data from encoded video data, where the reconstructed video data may be used to subsequently predict video data for encoding.

According to the example of FIG. 10, video decoder 20 decodes information from a bitstream, e.g., syntax elements as described herein, that indicates which of at least three depth intra prediction modes is used to decode a depth block (210). The at least three depth intra prediction modes include at least one of DMM 3, DMM 4, chain coding mode, DC mode, and the directional intra prediction modes, and may include any depth intra prediction modes described herein. Video decoder 30 may also generate a predicted block using the depth intra prediction mode. Video decoder 30 further decodes one or more DC residual values for the depth block from the bitstream (212). For example, video decoder 30 may decode a single DC residual value for the depth block when the depth block is encoded using a non-partitioning-based, e.g., HEVC, intra prediction mode, or may decode respective DC residual values for each of two partitions of the depth block when the depth block is encoded using a partitioning-based (e.g., 3D-HEVC) depth intra prediction mode. Video decoder 30 reconstructs the depth block based on the DC residual values, e.g., using any of the techniques described herein (214). Reconstruction of the depth block may include, for example, combining the predicted block with a residual block generated from the DC residual value, pixel-by-pixel.

Figure 11:
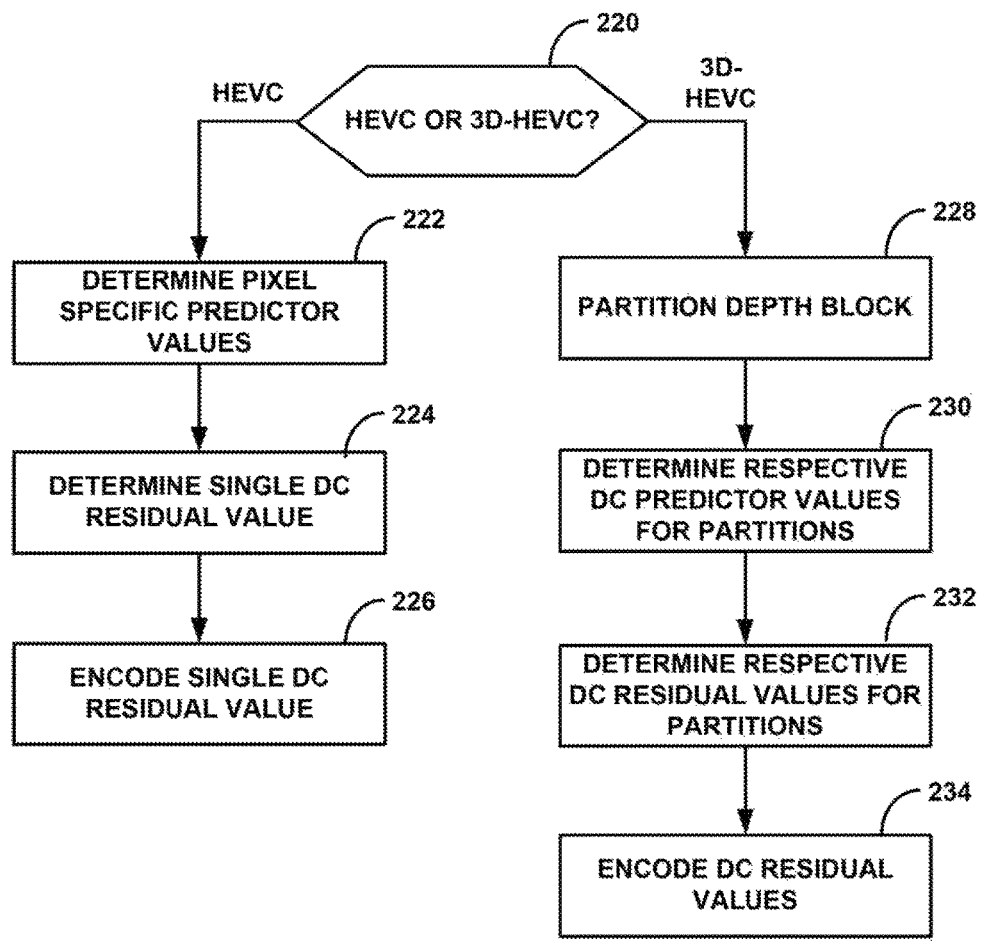
FIG. 11 is a flow diagram illustrating an example method for performing an SDC mode for depth intra prediction encoding a depth block according to either an HEVC intra prediction mode or a 3D-HEVC depth intra prediction mode.

FIG. 11 is a flow diagram illustrating an example method for performing an SDC mode for depth intra prediction encoding a depth block according to either a non-partition-based (e.g., HEVC) intra prediction mode or a partition-based (e.g., 3D-HEVC) depth intra prediction mode. The example method of FIG. 11 may be performed by video encoder 20, as described herein, or another video encoder.

According to the example method of FIG. 11, video encoder 20 determines whether the depth block is encoded using a non-partition-based (e.g., HEVC) intra prediction mode, or a partition-based (e.g., 3D-HEVC) intra prediction mode (220). Video encoder 20 may encode syntax elements or other information in the bitstream indicating to a video decoder which type of depth intra prediction mode is used to encode the depth block, as described herein.

If the depth block is encoded using a non-partition-based (e.g., HEVC) intra prediction mode, video encoder 20 determines pixel-specific predictor values for the depth block according to the particular non-partition-based (e.g., HEVC) intra prediction mode (222). Video encoder 20 then determines a single DC residual value for the depth block, e.g., using any of the techniques described herein (224). For example, video encoder 20 may determine a DC depth value for the depth block e.g., an average depth value, and a DC predictor value based on a subset of the pixel-specific DC predictor values. Video encoder 20 may determine the DC residual value as the difference between the DC depth value and the DC predictor value. Video encoder 20 may then encode the single DC residual value into the bitstream (226).

If the depth block is encoded using a partition-based (e.g., 3D-HEVC) depth intra prediction mode, video encoder 20 partitions the depth block according to the particular partition-based depth intra prediction mode, e.g., as described above for DMM modes and the chain coding mode (228). Video encoder 20 also determines respective DC predictor values for partitions according to the particular mode, e.g., based on one or more neighboring samples of the depth block (230). Video encoder 20 then determines respective DC residual values for the partitions based on the DC predictor values (232). For example, video encoder 20 may determine respective DC depth values, e.g., average depth values, for each partition, and determine the DC residual value for each partition as the difference between the DC depth value and the DC predictor value for the partition. Video encoder 20 encodes the respective DC residual values into the bitstream (234).

Figure 12:
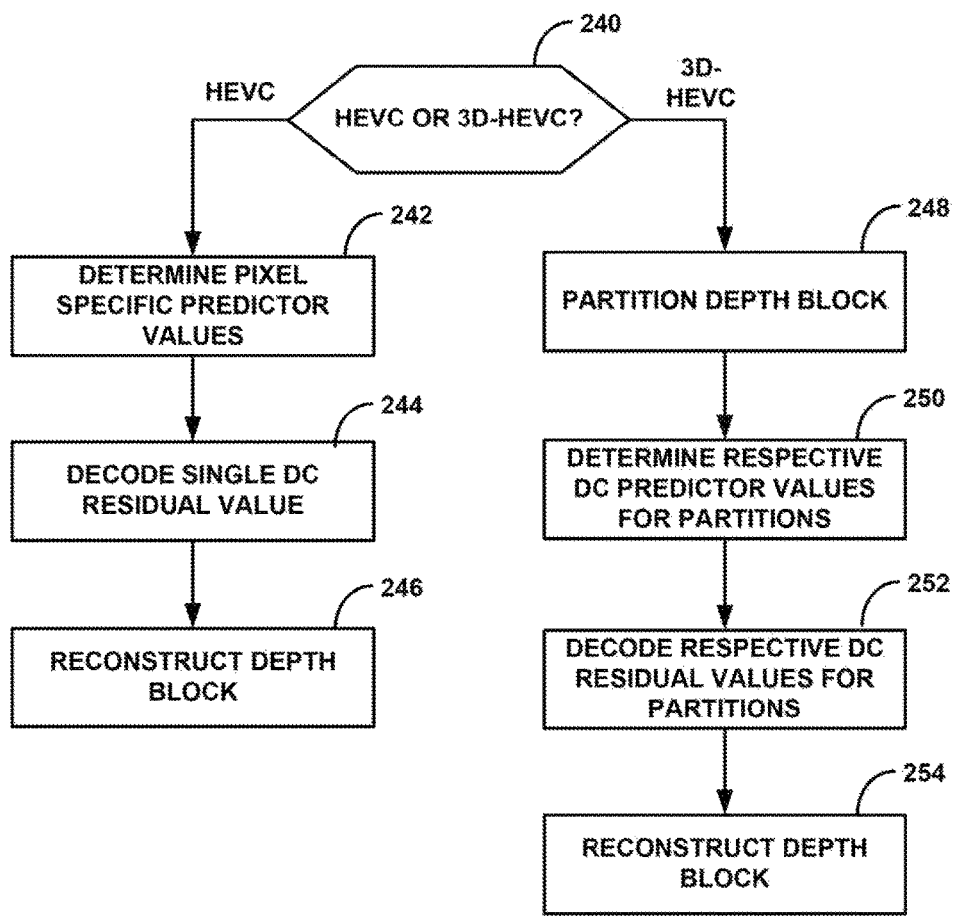
FIG. 12 is a flow diagram illustrating an example method for performing an SDC mode for depth intra prediction decoding a depth block according to either an HEVC intra prediction mode or a 3D-HEVC depth intra prediction mode.

FIG. 12 is a flow diagram illustrating an example method for performing an SDC mode for depth intra prediction decoding a depth block according to either an HEVC intra prediction mode or a 3D-HEVC depth intra prediction mode. The example method of FIG. 12 may be performed by video decoder 30, as described herein, or another video encoder.

According to the example method of FIG. 12, video decoder 30 determines whether the depth block was encoded using a non-partition-based (e.g., HEVC) intra prediction mode, or a partition-based (e.g., 3D-HEVC) intra prediction mode (240). Video decoder 30 may decode syntax elements or other information from the bitstream indicating which type of depth intra prediction mode was used to encode the depth block, as described herein.

If the depth block was encoded using a non-partition-based (e.g., HEVC) intra prediction mode, video decoder 30 determines pixel-specific predictor values for the depth block according to the particular non-partition-based (e.g., HEVC) intra prediction mode (242). Video decoder 30 also decodes a single DC residual value for the depth block (244). Video decoder 30 may then reconstruct the depth block based on the pixel-specific predictor values and the DC residual value (246). For example, for reconstructing each depth pixel value, video decoder 30 may sum the respective pixel-specific predictor value with the single DC residual value.

If the depth block was encoded using a partition-based (e.g., 3D-HEVC) depth intra prediction mode, video decoder 30 partitions the depth block according to the particular partition-based depth intra prediction mode, e.g., as described above for DMM modes and the chain coding mode (248). Video decoder 30 also determines respective DC predictor values for the partitions according to the particular mode, e.g., based on one or more neighboring samples of the depth block (250). Video decoder 30 also decodes respective DC residual values for the partitions from the bitstream (252). Video decoder 30 may then reconstruct the depth block based on the DC predictor values and the DC residual values for the partitions, e.g., by summing the predictor and residual values (254).

Figure 13:
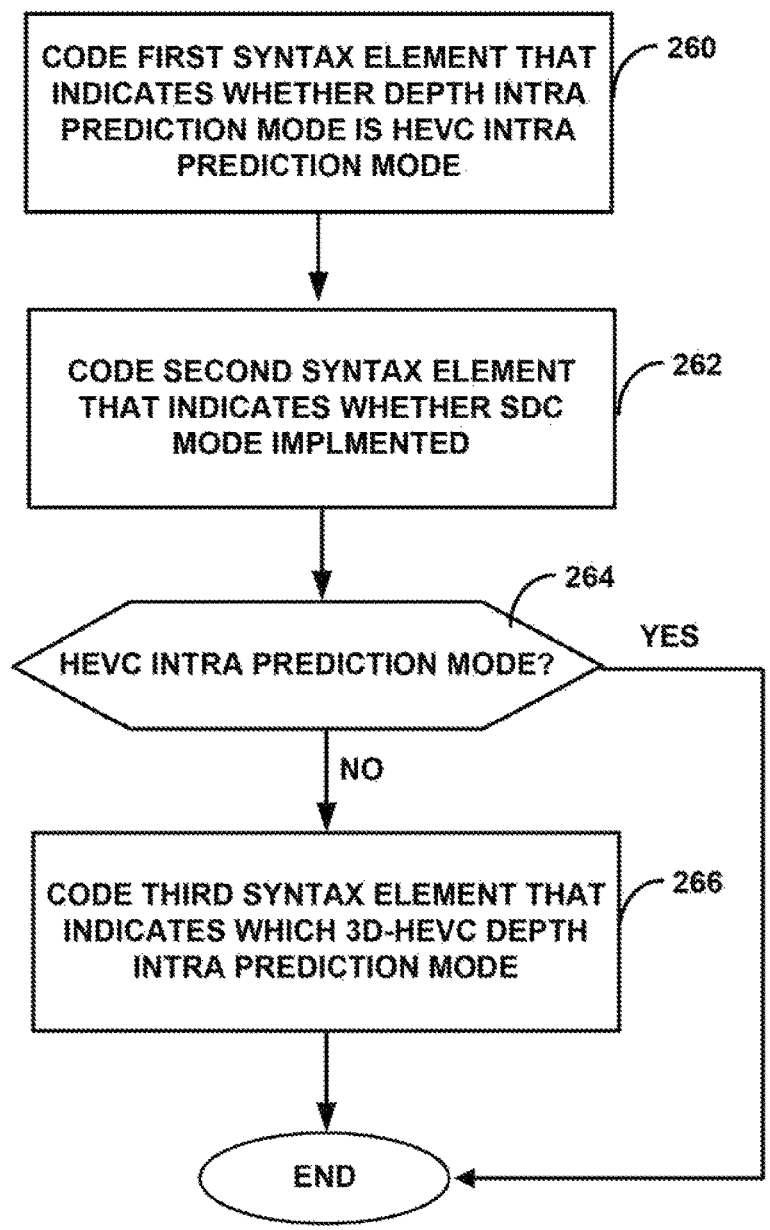
FIG. 13 is a flow diagram illustrating an example method for coding syntax elements in a bitstream indicating which depth intra prediction mode is used to code a depth block and whether an SDC mode is used to code the depth block.

FIG. 13 is a flow diagram illustrating an example method for coding syntax elements in a bitstream indicating which depth intra prediction mode is used to code a depth block and whether an SDC mode is used to code the depth block. The method illustrated in FIG. 13 represents an example of techniques that may be performed by video encoder 20 and/or decoder 30 in accordance with the techniques described above. For FIG. 13, the example method will be described jointly with reference to similar or reciprocal operations performed by a video encoder 20 and video decoder 30.

According the example method of FIG. 13, a video coder codes (e.g., video encoder 20 encodes or video decoder 30 decodes) a first syntax element, e.g., a hevc_intra_flag, that indicates whether a depth block is coded (e.g., encoded or decoded) using any of the non-partition-based (e.g., HEVC) intra prediction modes (260). In some examples, a first value of the first syntax element indicates that a depth intra prediction mode selected for a depth block from a plurality of depth intra prediction modes is one of a Planar intra prediction mode, DC intra prediction mode, or directional intra prediction mode, and a second value of the first syntax element indicates that the depth intra prediction mode selected for the depth block is one of a plurality of depth modeling modes or a region boundary chain coding mode.

The video coder codes a second syntax element, e.g., an sdc_flag, indicating whether an SDC mode is used to code one or more DC residual values for the depth block or for each partition of the depth block (262). The video coder may also code one or more syntax elements indicating which of the non-partition-based (e.g., HEVC) intra prediction modes is used to code the depth block. If the first syntax element indicates that the depth block is not coded using any of the non-partition-based (e.g., HEVC) intra prediction modes (NO of 264), the video coder codes a third syntax element indicating which of the partition-based (3D-HEVC) depth intra prediction modes is used to code the depth block (266). In some examples, region boundary chain coding mode is not used or not available for use for coding depth blocks. In such examples, a video coder may not need to code the third syntax element, and a first value of the first syntax element, e.g., hevc_intra_flag, being equal to 0 indicates that a DMM mode is used to intra-code the current depth block.

In some examples, the video coder codes (e.g., video encoder 20 encodes and/or video decoder 30 decodes) the first syntax element and/or the second syntax elements according to a CABAC process, and sets an initial probability state for coding at least one of the first and second syntax elements, e.g., the hevc_intra_flag, according to the CABAC process to a non-equal probability state. In some examples, the video coder determines a slice type of a slice that includes the depth block, and selects an initial probability state for coding at least one of the first and second syntax elements according to the CABAC process from a plurality of probability states based on the slice type, as described herein. In various examples, the video coder sets the initial probability state for one or both the first and second syntax elements either with reference to, or without reference to a value of the syntax element for any neighboring depth block of the depth block.

Figure 14:
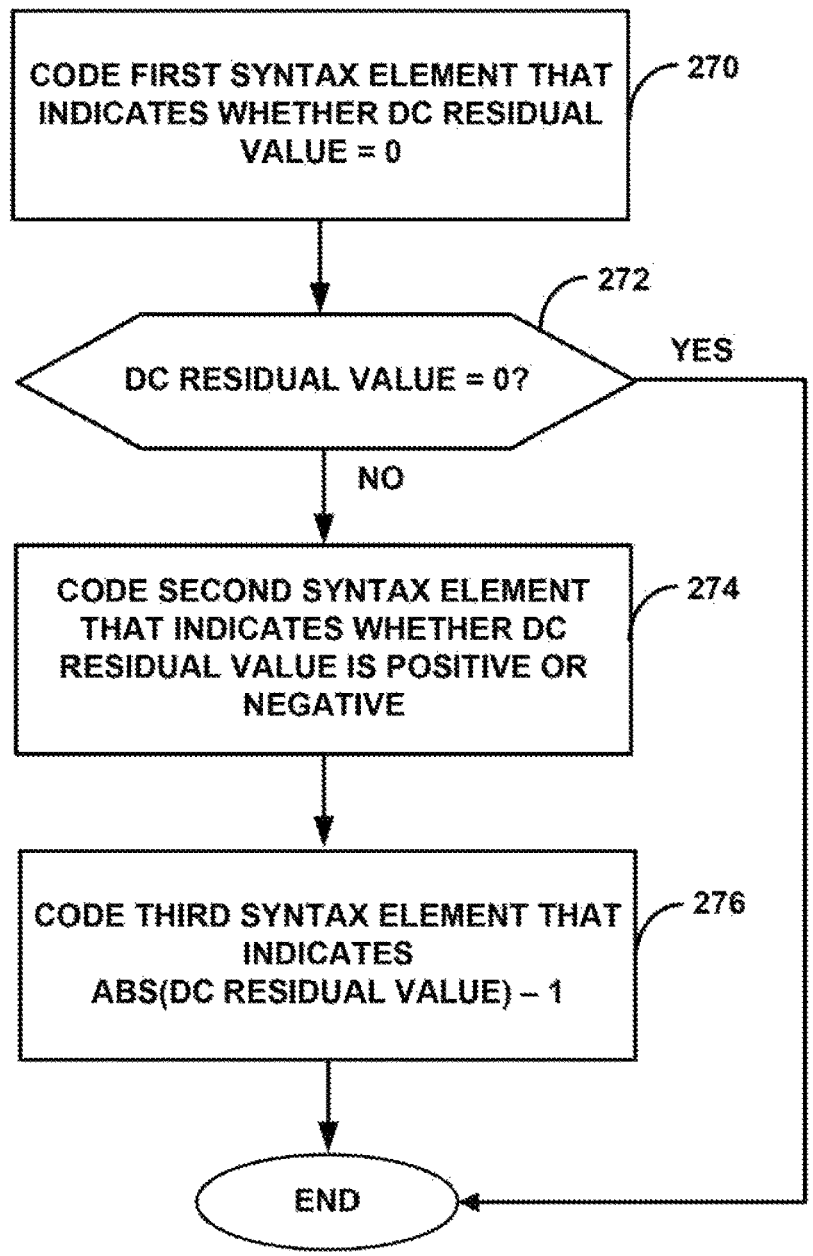
FIG. 14 is a flow diagram illustrating an example method for coding a DC residual value in a bitstream.

FIG. 14 is a flow diagram illustrating an example method for coding a DC residual value in a bitstream. The method illustrated in FIG. 14 represents an example of techniques that may be performed by video encoder 20 and/or decoder 30 in accordance with the techniques described above. For FIG. 14, the example method will be described jointly with reference to similar or reciprocal operations performed by a video encoder 20 and video decoder 30.

According to the example method of FIG. 14, a video coder codes a first syntax element that indicates whether the DC residual value is equal to 0 (270). If the DC residual value equals 0 (YES of 272), the method for coding the DC residual value ends. If the DC residual value does not equal 0 (NO of 272), the video coder further codes a second syntax element that indicates whether the DC residual value is positive or negative (274), and a third syntax value that indicates the "absolute value of DC residual value" minus 1 (276).

Figure 15:
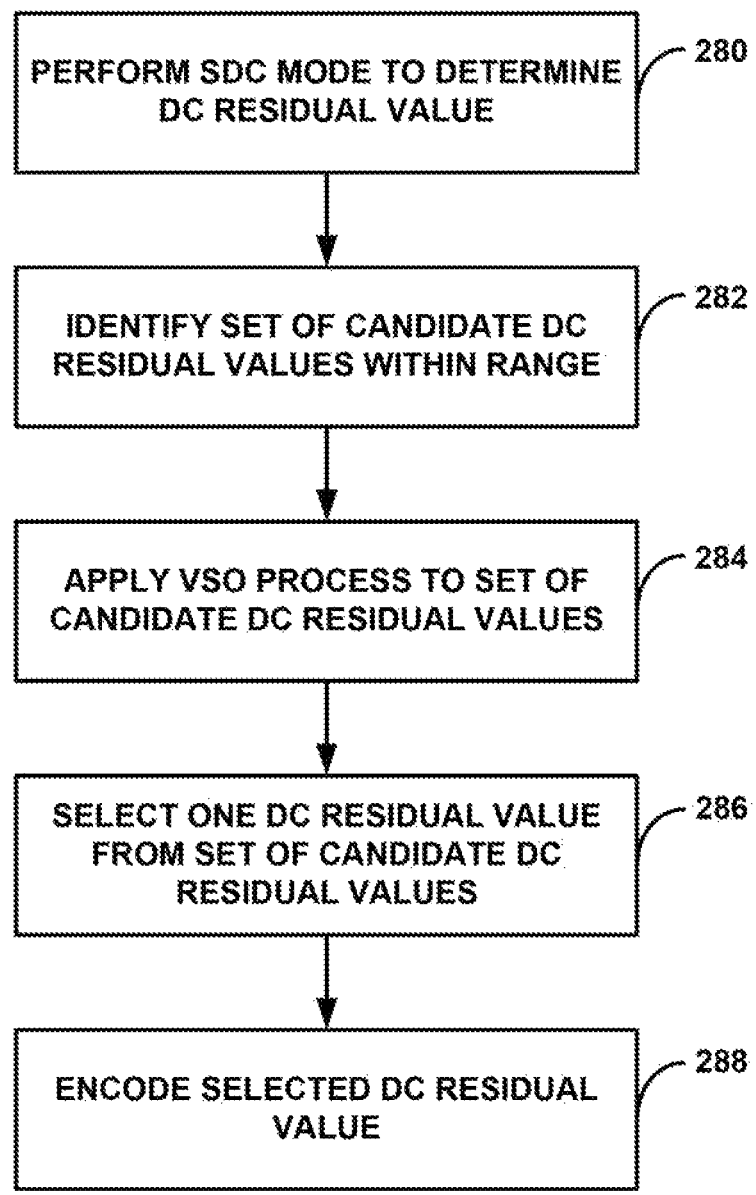
FIG. 15 is a flow diagram illustrating an example method for encoding a DC residual value in a bitstream.

FIG. 15 is a flow diagram illustrating an example method for encoding a DC residual value in a bitstream. The method illustrated in FIG. 15 represents an example of techniques that may be performed by video encoder 20 in accordance with the techniques described above.

According to the example method of FIG. 15, a video encoder, e.g., video encoder 20, performs an SDC mode to determine a DC residual value for a block, or partition of a block, as described herein (280). The video encoder identifies a set of candidate DC residual values within a range that includes the DC residual value determined according to the SDC mode (282). For example, the video encoder may apply one or more offsets to the determined DC residual value to define the range of DC residual values that includes the set of candidate DC residual values.

The video encoder applies a VSO process to the set of candidate DC residual values (286). The video encoder selects one of the DC residual values from the set of candidate DC residual values based on the results of the VSO process (288). For example, the video encoder may select the DC residual value having the lowest cost according to the VSO process from the set of candidate DC residual values. The video encoder encodes the selected DC residual value in the encoded video bitstream, e.g., instead of the DC residual value determined according to the SDC process. In this manner, the video decoder need not be modified to take advantage of the DC residual value selected from the VSO process.

The techniques described above may be performed by video encoder 20 (FIGS. 1 and 7) and/or video decoder 30 (FIGS. 1 and 8), both of which may be generally referred to as a video coder. In addition, video coding may generally refer to video encoding and/or video decoding, as applicable.

While the techniques of this disclosure are generally described with respect to 3D-HEVC, the techniques are not limited in this way. The techniques described above may also be applicable to other current standards or future standards not yet developed. For example, the techniques for depth coding may also be applicable to other current or future standards requiring coding of a depth component.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of techniques according to this disclosure have been described. A number of particular examples are described below. The examples described herein, and other examples, are within the scope of the following claims.

Example 1

A method of decoding video data, the method comprising: decoding a first syntax element from an encoded video bitstream, wherein a first value of the first syntax element indicates that a depth intra prediction mode selected for a depth block from a plurality of depth intra prediction modes is one of a Planar intra prediction mode, DC intra prediction mode, or directional intra prediction mode, and a second value of the first syntax element indicates that the depth intra prediction mode selected for the depth block is one of a plurality of depth modeling modes or a region boundary chain coding mode; decoding a second syntax element from the encoded video bitstream, wherein the second syntax element indicates whether to perform a simplified depth coding (SDC) mode to reconstruct the depth block, the SDC mode comprising decoding at least one DC residual value from the bitstream, wherein the DC residual value represents residual values of a plurality of samples of the depth block; and reconstructing the depth block according the depth intra prediction mode selected for the depth block and the indication of whether to perform the SDC mode.

Example 2

The method of example 1, wherein the first syntax element comprises a hevc_intra_flag syntax element and the second syntax element comprises an sdc_flag syntax element.

Example 3

The method of example 1, wherein decoding the first and second syntax elements comprises decoding the first and second syntax elements according to a context adaptive binary arithmetic coding (CABAC) process.

Example 4

The method of example 3, further comprising setting an initial probability state for decoding at least one of the first and second syntax elements according to the CABAC process to a non-equal probability state.

Example 5

The method of example 4, wherein setting the initial probability state for decoding at least one of the first and second syntax elements according to the CABAC process to a non-equal probability state comprises setting the initial probability state for decoding the first syntax element according to the CABAC process to a non-equal probability state.

Example 6

The method of example 3, further comprising: determining a slice type of a slice that includes the depth block; and selecting an initial probability state for decoding at least one of the first and second syntax elements according to the CABAC process from a plurality of probability states based on the slice type.

Example 7

The method of example 6, wherein determining the slice type of the slice comprises determining whether the slice is a B slice, a P slice, or an I slice, and wherein selecting the initial probability state comprises: selecting a first initial probability state when the slice is a B slice; selecting a second initial probability state when the slice is a P slice; and selecting a third initial probability state when the slice is an I slice.

Example 8

The method of example 3, further comprising setting an initial probability state for decoding at least one of the first and second syntax elements for the depth block according to the CABAC process without reference to a value of the syntax element for any neighboring depth block of the depth block.

Example 9

The method of example 1, wherein at least one the first and second syntax elements comprise a syntax element of a depth_mode_parameters syntax structure.

Example 10

A method of encoding video data, the method comprising: selecting a depth intra prediction mode for encoding a depth block in an encoded video bitstream from a plurality of depth intra prediction modes; determining whether to perform a simplified depth coding (SDC) mode for encoding the depth block in the encoded video bitstream, the SDC mode comprising encoding at least one DC residual value in the bitstream, wherein the DC residual value represents residual values of a plurality of samples of the depth block; encoding the depth block in the encoded video bitstream according to the selected depth intra prediction mode and the determination of whether to perform the SDC mode; encoding a first syntax element in the encoded video bitstream, wherein a first value of the first syntax element indicates that the selected depth intra prediction mode is one of a Planar intra prediction mode, DC intra prediction mode, or directional intra prediction mode, and a second value of the first syntax element indicates that the selected depth intra prediction mode for the depth block is one of a plurality of depth modeling modes or a region boundary chain coding mode; and encoding a second syntax element in the encoded video bitstream, wherein the second syntax element indicates whether the SDC mode was performed to encode the depth block in the encoded video bitstream.

Example 11

The method of example 10, wherein the first syntax element comprises a hevc_intra_flag syntax element and the second syntax element comprises an sdc_flag syntax element.

Example 12

The method of example 10, wherein encoding the first and second syntax elements comprises encoding the first and second syntax elements according to a context adaptive binary arithmetic coding (CABAC) process.

Example 13

The method of example 12, further comprising setting an initial probability state for encoding at least one of the first and second syntax elements according to the CABAC process to a non-equal probability state.

Example 14

The method of example 13, wherein setting the initial probability state for encoding at least one of the first and second syntax elements according to the CABAC process to a non-equal probability state comprises setting the initial probability state for encoding the first syntax element according to the CABAC process to a non-equal probability state.

Example 15

The method of example 12, further comprising: determining a slice type of a slice that includes the depth block; and selecting an initial probability state for encoding at least one of the first and second syntax elements according to the CABAC process from a plurality of probability states based on the slice type.

Example 16

The method of example 15, wherein determining the slice type of the slice comprises determining whether the slice is a B slice, a P slice, or an I slice, and wherein selecting the initial probability state comprises: selecting a first initial probability state when the slice is a B slice; selecting a second initial probability state when the slice is a P slice; and selecting a third initial probability state when the slice is an I slice.

Example 17

The method of example 12, further comprising setting an initial probability state for encoding at least one of the first and second syntax elements for the depth block according to the CABAC process without reference to a value of the syntax element for any neighboring depth block of the depth block.

Example 18

The method of example 10, wherein at least one the first and second syntax elements comprise a syntax element of a depth_mode_parameters syntax structure.

Example 19

A device comprising a video decoder, the video decoder comprising: a memory configured to store an encoded video bitstream that encodes the video data; and one or more processors configured to: decode a first syntax element from the encoded video bitstream, wherein a first value of the first syntax element indicates that a depth intra prediction mode selected for a depth block from a plurality of depth intra prediction modes is one of a Planar intra prediction mode, DC intra prediction mode, or directional intra prediction mode, and a second value of the first syntax element indicates that the depth intra prediction mode selected for the depth block is one of a plurality of depth modeling modes or a region boundary chain coding mode; decode a second syntax element from the encoded video bitstream, wherein the second syntax element indicates whether to perform a simplified depth coding (SDC) mode to reconstruct the depth block, the SDC mode comprising decoding at least one DC residual value from the bitstream, wherein the DC residual value represents residual values of a plurality of samples of the depth block; and reconstruct the depth block according the depth intra prediction mode selected for the depth block and the indication of whether to perform the SDC mode.

Example 20

The device of example 19, wherein the first syntax element comprises a hevc_intra_flag syntax element and the second syntax element comprises an sdc_flag syntax element.

Example 21

The device of example 19, wherein the one or more processors are configured to decode the first and second syntax elements according to a context adaptive binary arithmetic coding (CABAC) process.

Example 22

The device of example 21, wherein the one or more processors are further configured to set an initial probability state for decoding at least one of the first and second syntax elements according to the CABAC process to a non-equal probability state.

Example 23

The device of example 22, wherein the one or more processors are configured to set the initial probability state for decoding the first syntax element according to the CABAC process to a non-equal probability state.

Example 24

The device of example 21, wherein the one or more processors are further configured to: determine a slice type of a slice that includes the depth block; and select an initial probability state for decoding at least one of the first and second syntax elements according to the CABAC process from a plurality of probability states based on the slice type.

Example 25

The device of example 24, wherein the one or more processors are configured to: determine whether the slice is a B slice, a P slice, or an I slice; select a first initial probability state when the slice is a B slice; select a second initial probability state when the slice is a P slice; and select a third initial probability state when the slice is an I slice.

Example 26

The device of example 21, wherein the one or more processors are further configured to set an initial probability state for decoding at least one of the first and second syntax elements for the depth block according to the CABAC process without reference to a value of the syntax element for any neighboring depth block of the depth block.

Example 27

The device of example 19, wherein at least one the first and second syntax elements comprise a syntax element of a depth_mode_parameters syntax structure.

Example 28

The device of example 19, wherein the device comprises at least one of: an integrated circuit implementing the video decoder; a microprocessor implementing the video decoder; and a wireless communication device including the video decoder.

Example 29

A device comprising a video encoder, the video encoder comprising: a memory configured to store an encoded video bitstream that encodes the video data; and one or more processors configured to: select a depth intra prediction mode for encoding a depth block in an encoded video bitstream from a plurality of depth intra prediction modes; determine whether to perform a simplified depth coding (SDC) mode for encoding the depth block in the encoded video bitstream, the SDC mode comprising encoding at least one DC residual value in the bitstream, wherein the DC residual value represents residual values of a plurality of samples of the depth block; encode the depth block in the encoded video bitstream according to the selected depth intra prediction mode and the determination of whether to perform the SDC mode; encode a first syntax element in the encoded video bitstream, wherein a first value of the first syntax element indicates that the selected depth intra prediction mode is one of a Planar intra prediction mode, DC intra prediction mode, or directional intra prediction mode, and a second value of the first syntax element indicates that the selected depth intra prediction mode for the depth block is one of a plurality of depth modeling modes or a region boundary chain coding mode; and encode a second syntax element in the encoded video bitstream, wherein the second syntax element indicates whether the SDC mode was performed to encode the depth block in the encoded video bitstream.

Example 30

The device of example 29, wherein the first syntax element comprises a hevc_intra_flag syntax element and the second syntax element comprises an sdc_flag syntax element.

Example 31

The device of example 29, wherein the one or more processors are configured to encode the first and second syntax elements according to a context adaptive binary arithmetic coding (CABAC) process.

Example 32

The device of example 31, wherein the one or more processors are further configured to set an initial probability state for encoding at least one of the first and second syntax elements according to the CABAC process to a non-equal probability state.

Example 33

The device of example 32, wherein the one or more processor are configured to set the initial probability state for encoding the first syntax element according to the CABAC process to a non-equal probability state.

Example 34

The device of example 31, wherein the one or more processors are further configured to: determine a slice type of a slice that includes the depth block; and select an initial probability state for encoding at least one of the first and second syntax elements according to the CABAC process from a plurality of probability states based on the slice type.

Example 35

The device of example 34, wherein the one or more processors are configured to: determine whether the slice is a B slice, a P slice, or an I slice; select a first initial probability state when the slice is a B slice; select a second initial probability state when the slice is a P slice; and select a third initial probability state when the slice is an I slice.

Example 36

The device of example 31, wherein the one or more processors are further configured to set an initial probability state for encoding at least one of the first and second syntax elements for the depth block according to the CABAC process without reference to a value of the syntax element for any neighboring depth block of the depth block.

Example 37

The device of example 29, wherein at least one the first and second syntax elements comprise a syntax element of a depth_mode_parameters syntax structure.

Example 38

The device of example 29, wherein the device comprises at least one of: an integrated circuit implementing the video encoder; a microprocessor implementing the video encoder; and a wireless communication device including the video encoder.

Example 39

A device comprising a video coder, wherein the video coder comprises: means for coding a first syntax element in an encoded video bitstream, wherein a first value of the first syntax element indicates that a depth intra prediction mode selected for a depth block from a plurality of depth intra prediction modes is one of a Planar intra prediction mode, DC intra prediction mode, or directional intra prediction mode, and a second value of the first syntax element indicates that the depth intra prediction mode selected for the depth block is one of a plurality of depth modeling modes or a region boundary chain coding mode; means for coding a second syntax element in the encoded video bitstream, wherein the second syntax element indicates whether to perform a simplified depth coding (SDC) mode to reconstruct the depth block, the SDC mode comprising decoding at least one DC residual value from the bitstream, wherein the DC residual value represents residual values of a plurality of samples of the depth block; and means for coding the depth block in the encoded video bitstream according to the first and second syntax elements.

Example 40

The device of example 39, wherein the first syntax element comprises a hevc_intra_flag syntax element and the second syntax element comprises an sdc_flag syntax element.

Example 41

The device of example 39, wherein the means for coding the first and second syntax elements comprises means for coding the first and second syntax elements according to a context adaptive binary arithmetic coding (CABAC) process.

Example 42

The device of example 41, further comprising means for setting an initial probability state for coding at least one of the first and second syntax elements according to the CABAC process to a non-equal probability state.

Example 43

The device of example 42, wherein the means for setting the initial probability state for coding at least one of the first and second syntax elements according to the CABAC process to a non-equal probability state comprises means for setting the initial probability state for coding the first syntax element according to the CABAC process to a non-equal probability state.

Example 44

The device of example 41, further comprising: means for determining a slice type of a slice that includes the depth block; and means for selecting an initial probability state for decoding at least one of the first and second syntax elements according to the CABAC process from a plurality of probability states based on the slice type.

Example 45

The device of example 44, wherein the means for determining the slice type of the slice comprises means for determining whether the slice is a B slice, a P slice, or an I slice, and wherein the means for selecting the initial probability state comprises: means for selecting a first initial probability state when the slice is a B slice; means for selecting a second initial probability state when the slice is a P slice; and means for selecting a third initial probability state when the slice is an I slice.

Example 46

The device of example 41, further comprising means for setting an initial probability state for coding at least one of the first and second syntax elements for the depth block according to the CABAC process without reference to a value of the syntax element for any neighboring depth block of the depth block.

Example 47

The device of example 39, wherein at least one the first and second syntax elements comprise a syntax element of a depth_mode_parameters syntax structure.

Example 48

A computer-readable storage medium having instructions stored thereon that, when executed by one or more processors of a video coder, cause the video coder to: code a first syntax element in an encoded video bitstream, wherein a first value of the first syntax element indicates that a depth intra prediction mode selected for a depth block from a plurality of depth intra prediction modes is one of a Planar intra prediction mode, DC intra prediction mode, or directional intra prediction mode, and a second value of the first syntax element indicates that the depth intra prediction mode selected for the depth block is one of a plurality of depth modeling modes or a region boundary chain coding mode; and code a second syntax element in the encoded video bitstream, wherein the second syntax element indicates whether to perform a simplified depth coding (SDC) mode to reconstruct the depth block, the SDC mode comprising decoding at least one DC residual value from the bitstream, wherein the DC residual value represents residual values of a plurality of samples of the depth block; and code the depth block in the encoded video bitstream according to the first and second syntax elements.

Example 49

The computer-readable storage medium of example 48, wherein the first syntax element comprises a hevc_intra_flag syntax element and the second syntax element comprises an sdc_flag syntax element.

Example 50

The computer-readable storage medium of example 48, wherein the instructions that cause the video coder to code the first and second syntax elements comprise instructions that cause the video coder to code the first and second syntax elements according to a context adaptive binary arithmetic coding (CABAC) process.

Example 51

The computer-readable storage medium of example 50, further comprising instructions that cause the video coder to set an initial probability state for coding at least one of the first and second syntax elements according to the CABAC process to a non-equal probability state.

Example 52

The computer-readable storage medium of example 51, wherein the instructions that cause the video coder to set the initial probability state for coding at least one of the first and second syntax elements according to the CABAC process to a non-equal probability state comprise instructions that cause the video coder to set the initial probability state for coding the first syntax element according to the CABAC process to a non-equal probability state.

Example 53

The computer-readable storage medium of example 50, further comprising instructions that cause the video coder to: determine a slice type of a slice that includes the depth block; and select an initial probability state for decoding at least one of the first and second syntax elements according to the CABAC process from a plurality of probability states based on the slice type.

Example 54

The computer-readable storage medium of example 53, wherein the instructions that cause the video coder to determine the slice type of the slice comprise instructions that cause the video coder to determine whether the slice is a B slice, a P slice, or an I slice, and wherein the instructions that cause the video coder to select the initial probability state comprise instructions that cause the video coder to: select a first initial probability state when the slice is a B slice; select a second initial probability state when the slice is a P slice; and select a third initial probability state when the slice is an I slice.

Example 55

The computer-readable storage medium of example 50, further comprising instructions that cause the video coder to set an initial probability state for coding at least one of the first and second syntax elements for the depth block according to the CABAC process without reference to a value of the syntax element for any neighboring depth block of the depth block.

Example 56

The computer-readable storage medium of example 48, wherein at least one the first and second syntax elements comprise a syntax element of a depth_mode_parameters syntax structure.

Example 57

A method of encoding video data, the method comprising: encoding a depth block according to a depth intra prediction mode selected from a plurality of depth intra prediction modes, wherein encoding the depth block comprises performing a simplified depth coding (SDC) mode to determine at least one DC residual value for the depth block based on the indicated one of the depth intra prediction modes, wherein the DC residual value represents residual values of a plurality of samples of the depth block; identifying a set of candidate DC residual values within a range of DC residual values that includes the determined DC residual value; applying a view synthesis optimization process to each of the set of candidate DC residual values; selecting one DC residual value from the set of candidate DC residual values based on the view synthesis optimization process; and encoding the selected DC residual value into an encoded video bitstream.

Example 58

The method of example 57, wherein applying a view synthesis optimization process to each of the set of candidate DC residual values comprises determining a cost for each of the set of candidate DC residual values according to the view synthesis optimization process, and wherein selecting one DC residual value from the set of candidate DC residual values based on the view synthesis optimization process comprises selecting the one DC residual value from the set of candidate DC residual values that has the lowest cost.

Example 59

The method of example 57, wherein identifying a set of candidate DC residual values within a range of DC residual values that includes the determined DC residual value comprises identifying a set of candidate DC residual values within a range of DC residual values from a first DC residual value that is a first offset value less than the determined DC residual value, to a second DC residual value that is a second offset value greater than the determined DC residual value.

Example 60

The method of example 59, wherein the first and second offset values are the same value.

Example 61

The method of example 60, wherein the first and second offset values are 2.

Example 62

The method of example 59, wherein identifying a set of candidate DC residual values within a range of DC residual values from a first DC residual value that is a first offset value less than the determined DC residual value, to a second DC residual value that is a second offset value greater than the determined DC residual value comprises identifying a set of candidate DC residual values within a range defined by [DCResi[i]−Offset1, DCResi[i]+Offset2], wherein DCResi[i] denotes the determined DC residual value, wherein Offset1 is the first offset value and Offset2 is the second offset value, and wherein each of Offset1 and Offset2 comprises a non-negative integer value.

Example 63

A device comprising a video encoder, the video encoder comprising: a memory configured to store an encoded video bitstream that encodes the video data; and one or more processors configured to: encode a depth block according to a depth intra prediction mode selected from a plurality of depth intra prediction modes, wherein encoding the depth block comprises performing a simplified depth coding (SDC) mode to determine at least one DC residual value for the depth block based on the indicated one of the depth intra prediction modes, wherein the DC residual value represents residual values of a plurality of samples of the depth block; identify a set of candidate DC residual values within a range of DC residual values that includes the determined DC residual value; apply a view synthesis optimization process to each of the set of candidate DC residual values; select one DC residual value from the set of candidate DC residual values based on the view synthesis optimization process; and encode the selected DC residual value into an encoded video bitstream.

Example 64

The device of example 63, wherein the one or more processors are configured to determine a cost for each of the set of candidate DC residual values according to the view synthesis optimization process, and select the one DC residual value from the set of candidate DC residual values that has the lowest cost.

Example 65

The device of example 63, wherein the one or more processors are configured to identify a set of candidate DC residual values within a range of DC residual values from a first DC residual value that is a first offset value less than the determined DC residual value, to a second DC residual value that is a second offset value greater than the determined DC residual value.

Example 66

The device of example 65, wherein the first and second offset values are the same value.

Example 67

The device of example 66, wherein the first and second offset values are 2.

Example 68

The device of example 65, wherein the one or more processors are configured to identify a set of candidate DC residual values within a range defined by [DCResi[i]−

Offset1, DCResi[i]+Offset2], wherein DCResi[i] denotes the determined DC residual value, wherein Offset1 is the first offset value and Offset2 is the second offset value, and wherein each of Offset1 and Offset2 comprises a non-negative integer value.

Example 69

A device comprising a video encoder, wherein the video encoder comprises: means for encoding a depth block according to a depth intra prediction mode, wherein encoding the depth block comprises performing a simplified depth coding (SDC) mode to determine at least one DC residual value for the depth block based on the indicated one of the depth intra prediction modes, wherein the DC residual value represents residual values of a plurality of samples of the depth block; means for identifying a set of candidate DC residual values within a range of DC residual values that includes the determined DC residual value; means for applying a view synthesis optimization process to each of the set of candidate DC residual values; means for selecting one DC residual value from the set of candidate DC residual values based on the view synthesis optimization process; and means for encoding the selected DC residual value into an encoded video bitstream.

Example 70

The device of example 69, wherein the means for applying a view synthesis optimization process to each of the set of candidate DC residual values comprises means for determining a cost for each of the set of candidate DC residual values according to the view synthesis optimization process, and wherein the means for selecting one DC residual value from the set of candidate DC residual values based on the view synthesis optimization process comprises means for selecting the one DC residual value from the set of candidate DC residual values that has the lowest cost.

Example 71

The device of claim 69, wherein the means for identifying a set of candidate DC residual values within a range of DC residual values that includes the determined DC residual value comprises means for identifying a set of candidate DC residual values within a range of DC residual values from a first DC residual value that is a first offset value less than the determined DC residual value, to a second DC residual value that is a second offset value greater than the determined DC residual value.

Example 72

The device of example 71, wherein the first and second offset values are the same value.

Example 73

The device of example 72, wherein the first and second offset values are 2.

Example 74

The device of example 71, wherein the means for identifying a set of candidate DC residual values within a range of DC residual values from a first DC residual value that is a first offset value less than the determined DC residual value, to a second DC residual value that is a second offset value greater than the determined DC residual value comprises means for identifying a set of candidate DC residual values within a range defined by [DCResi[i]−Offset1, DCResi[i]+Offset2], wherein DCResi[i] denotes the determined DC residual value, wherein Offset1 is the first offset value and Offset2 is the second offset value, and wherein each of Offset1 and Offset2 comprises a non-negative integer value.

Example 75

A computer-readable storage medium having instructions stored thereon that, when executed by one or more processors of a video encoder, cause the video encoder to: encode a depth block according to a depth intra prediction mode, wherein encoding the depth block comprises performing a simplified depth coding (SDC) mode to determine at least one DC residual value for the depth block based on the indicated one of the depth intra prediction modes, wherein the DC residual value represents residual values of a plurality of samples of the depth block; identify a set of candidate DC residual values within a range of DC residual values that includes the determined DC residual value; apply a view synthesis optimization process to each of the set of candidate DC residual values; select one DC residual value from the set of candidate DC residual values based on the view synthesis optimization process; and encode the selected DC residual value into an encoded video bitstream.

Example 76

The computer-readable storage medium of example 75, wherein the instructions that cause the video encoder to apply a view synthesis optimization process to each of the set of candidate DC residual values comprise instructions that cause the video encoder to determine a cost for each of the set of candidate DC residual values according to the view synthesis optimization process, and wherein the instructions that cause the video encoder to select one DC residual value from the set of candidate DC residual values based on the view synthesis optimization process comprise instructions that cause the video encoder to select the one DC residual value from the set of candidate DC residual values that has the lowest cost.

Example 77

The computer-readable storage medium of example 75, wherein the instructions that cause the video encoder to identify a set of candidate DC residual values within a range of DC residual values that includes the determined DC residual value comprise instructions that cause the video encoder to identify a set of candidate DC residual values within a range of DC residual values from a first DC residual value that is a first offset value less than the determined DC residual value, to a second DC residual value that is a second offset value greater than the determined DC residual value.

Example 78

The computer-readable storage medium of example 77, wherein the first and second offset values are the same value.

Example 79

The computer-readable storage medium of example 78, wherein the first and second offset values are 2.

Example 80

The computer-readable storage medium of example 77, wherein the instructions that cause the video encoder to identify a set of candidate DC residual values within a range of DC residual values from a first DC residual value that is a first offset value less than the determined DC residual value, to a second DC residual value that is a second offset value greater than the determined DC residual value comprise instructions that cause the video encoder to identifying a set of candidate DC residual values within a range defined by [DCResi[i]−Offset1, DCResi[i]+Offset2], wherein DCResi[i] denotes the determined DC residual value, wherein Offset1 is the first offset value and Offset2 is the second offset value, and wherein each of Offset1 and Offset2 comprises a non-negative integer value.

What is claimed is:

1. A method of decoding encoded video data, the method comprising:
   receiving an encoded video bitstream that includes a depth block of the encoded video data:
   parsing a first syntax element from the encoded video bitstream, wherein the first syntax element is a first one-bit flag that can be set to either a first value or a second value of the first syntax element, wherein the first value of the first syntax element indicates that a depth intra prediction mode selected for the depth block from a plurality of depth intra prediction modes is one of a Planar intra prediction mode, DC intra prediction mode, or directional intra prediction mode, and wherein the second value of the first syntax element indicates that the depth intra prediction mode selected for the depth block is one of a plurality of depth modeling modes;
   parsing a second syntax element from the encoded video bitstream, wherein the second syntax element is a second one-bit flag that can be set to either a first value or a second value of the second syntax element, wherein the first value of the second syntax element indicates that a simplified depth coding (SDC) mode is to be used to reconstruct the depth block, wherein using the SDC mode to reconstruct the depth block comprises decoding at least one DC residual value from the encoded video bitstream, and wherein the DC residual value represents residual values of a plurality of samples of the depth block;
   decoding a portion of the encoded video bitstream to determine that the first syntax element is set to the first value of the first syntax element and that the second syntax element is set to the first value of the second syntax element; and
   reconstructing the depth block according to (i) the SDC mode and (ii) one of the Planar intra prediction mode, the DC intra prediction mode, or the directional intra prediction mode, when the respective values of the first syntax element and the second syntax element are set to the first value of the first syntax element and the first value of the second syntax element.

2. The method of claim 1, wherein the first syntax element comprises an hevc_intra_flag syntax element, and wherein the second syntax element comprises an sdc_flag syntax element.

3. The method of claim 1,
   wherein decoding the first syntax element comprises decoding the first syntax element according to a first context adaptive binary arithmetic coding (CABAC) process, and
   wherein decoding the second syntax element comprises decoding the second syntax element according to a second CABAC process.

4. The method of claim 3, further comprising setting an initial probability state for at least one of the first syntax element or the second syntax element to a non-equal probability state.

5. The method of claim 4, wherein setting the initial probability state for the at least one of the first syntax element or the second syntax element to the non-equal probability state comprises setting the initial probability state for decoding the first syntax element according to the first CABAC process to the non-equal probability state.

6. The method of claim 3, further comprising:
   determining a slice type of a slice that includes the depth block; and
   selecting an initial probability state for at least one of the first syntax element or the second syntax element from a plurality of probability states based on the slice type.

7. The method of claim 3, further comprising setting an initial probability state for at least one of the first syntax element or the second syntax element for the depth block without reference to a value of a corresponding syntax element for any neighboring depth block of one or more neighboring depth blocks of the depth block.

8. A device configured to decode encoded video data, the device comprising:
   an interface configured to receive an encoded video bitstream that includes a depth block of the encoded video data;
   a memory coupled to the interface, the memory being configured to store a portion of the encoded video bitstream; and
   one or more processors coupled to the memory, the one or more processors being configured to:
      parse a first syntax element from the portion of the encoded video bitstream stored to the memory, wherein the first syntax element is a first one-bit flag that can be set to either a first value or a second value of the first syntax element, wherein the first value of the first syntax element indicates that the depth intra prediction mode selected for a depth block from a plurality of depth intra prediction modes is one of a Planar intra prediction mode, DC intra prediction mode, or directional intra prediction mode, and wherein the second value of the first syntax element indicates that the depth intra prediction mode selected for the depth block is one of a plurality of depth modeling modes;
      parse a second syntax element from the portion of the encoded video bitstream stored to the memory, wherein the second syntax element is a one-bit flag that can be set to either a first value or a second value of the second syntax element, wherein the first value of the second syntax element indicates that a simplified depth coding (SDC) mode is to be used to reconstruct the depth block, wherein using the SDC mode to reconstruct the depth block comprises decoding at least one DC residual value from the encoded video bitstream, and wherein the DC residual value represents residual values of a plurality of samples of the depth block;
      decoding a portion of the encoded video bitstream to determine that the first syntax element is set to the first value of the first syntax element and that the second syntax element is set to the first value of the second syntax element; and reconstruct the depth block according to (i) the SDC mode and (ii) one of the Planar intra prediction mode, the DC intra prediction mode, or the directional intra prediction mode, when the respective values of the first and the second syntax element are set to the first value of the first syntax element and the first value of the second syntax element.

9. The device of claim 8, wherein the first syntax element comprises an hevc_intra_flag syntax element, and wherein the second syntax element comprises an sdc_flag syntax element.

10. The device of claim 8,
wherein to decode the first syntax element, the one or more processors are configured to decode the first syntax element according to a first context adaptive binary arithmetic coding (CABAC) process, and
wherein to decode the second syntax element, the one or more processors are configured to decode the second syntax element according to a second CABAC process.

11. The device of claim 10, wherein the one or more processors are further configured to set an initial probability state for at least one of the first syntax element or the second syntax element to a non-equal probability state.

12. The device of claim 11, wherein the one or more processors are configured to set the initial probability state for the first syntax element according to the first CABAC process to the non-equal probability state.

13. The device of claim 10, wherein the one or more processors are further configured to:
determine a slice type of a slice that includes the depth block; and
select an initial probability state for at least one of the first syntax element or the second syntax element from a plurality of probability states based on the slice type.

14. The device of claim 10, wherein the one or more processors are configured to set an initial probability state for at least one of the first syntax element or the second syntax elements for the depth block without reference to a value of a corresponding syntax element for any neighboring depth block of the depth block.

15. A method of encoding video data, the method comprising:
encoding a depth block of the video data according to (i) a simplified depth coding (SDC) mode and (ii) one of a Planar intra prediction mode, a DC intra prediction mode, or a directional intra prediction mode;
encoding a first syntax element, wherein the first syntax element is a first one-bit flag that can be set to either a first value or a second value of the first syntax element, wherein the first value of the first syntax element indicates that a depth intra prediction mode selected for the depth block from a plurality of depth intra prediction modes is the one of the Planar intra prediction mode, the DC intra prediction mode, or the directional intra prediction mode, and wherein the second value of the first syntax element indicates that the depth intra prediction mode selected for the depth block is one of a plurality of depth modeling modes;
encoding a second syntax element, wherein the second syntax element is a second one-bit flag that can be set to either a first value or a second value of the second syntax element, wherein the first value of the second syntax element indicates that the SDC mode is to be used to reconstruct the depth block by decoding a DC residual value representing residual values of a plurality of samples of the depth block;

setting the first syntax element to the first value of the first syntax element based on the depth block being encoded according to the one of the Planar intra prediction mode, the DC intra prediction mode, or the directional intra prediction mode;
setting the second syntax element to the first value of the second syntax element based on the depth block being encoded according to the SDC mode;
forming an encoded video bitstream including the depth block, the first syntax element, and the second syntax element; and
signaling the encoded video bitstream.

16. The method of claim 15, wherein the first syntax element comprises an hevc_intra_flag syntax element, and wherein the second syntax element comprises an sdc_flag syntax element.

17. The method of claim 15,
wherein encoding the first syntax element comprises encoding the first syntax element according to a first context adaptive binary arithmetic coding (CABAC) process, and
wherein encoding the second syntax element comprises encoding the second syntax element according to a second CABAC process.

18. The method of claim 17, further comprising setting an initial probability state for at least one of the first syntax element or the second syntax element to a non-equal probability state.

19. The method of claim 18, wherein setting the initial probability state for the at least one of the first syntax element or the second syntax element to the non-equal probability state comprises setting the initial probability state for encoding the first syntax element according to the first CABAC process to the non-equal probability state.

20. The method of claim 17, further comprising:
determining a slice type of a slice that includes the depth block; and
selecting an initial probability state for at least one of the first syntax element or the second syntax element from a plurality of probability states based on the slice type.

21. The method of claim 17, further comprising setting an initial probability state for at least one of the first syntax element or the second syntax element for the depth block without reference to a value of a corresponding syntax element for any neighboring depth block of one or more neighboring depth blocks of the depth block.

22. A device configured to encode video data, the device comprising:
a memory configured to store a portion of the video data; and
one or more processors coupled to the memory, the one or more processors being configured to:
encode a depth block according to (i) a simplified depth coding (SDC) mode and (ii) one of a Planar intra prediction mode, a DC intra prediction mode, or a directional intra prediction mode, the depth block being included in the portion of the video data stored to the memory;
encode a first syntax element, wherein the first syntax element is a first one-bit flag that can be set to either a first value or a second value of the first syntax element, wherein the first value of the first syntax element indicates that a depth intra prediction mode selected for the depth block from a plurality of depth intra prediction modes is the one of the Planar intra prediction mode, the DC intra prediction mode, or the directional intra prediction mode, and wherein the second value of the first syntax element indicates that the depth intra prediction mode selected for the depth block is one of a plurality of depth modeling modes;

encode a second syntax element, wherein the second syntax element is a second one-bit flag that can be set to either a first value or a second value of the second syntax element, wherein the first value of the second syntax element indicates that the SDC mode is to be used to reconstruct the depth block by decoding a DC residual value representing residual values of a plurality of samples of the depth block;

set the first syntax element to the first value of the first syntax element based on the depth block being encoded according to the one of the Planar intra prediction mode, the DC intra prediction mode, or the directional intra prediction mode;

set the second syntax element to the first value of the second syntax element based on the depth block being encoded according to the SDC mode;

form an encoded video bitstream including the depth block, the first syntax element, and the second syntax element; and, an interface configured to signal the encoded video bitstream.

23. The device of claim 22, wherein the first syntax element comprises an hevc_intra_flag syntax element, and wherein the second syntax element comprises an sdc_flag syntax element.

24. The device of claim 22,
wherein to encode the first syntax element, the one or more processors are configured to encode the first syntax element according to a first context adaptive binary arithmetic coding (CABAC) process, and
wherein to encode the second syntax element, the one or more processors are configured to encode the second syntax element according to a second CABAC process.

25. The device of claim 24, wherein the one or more processors are further configured to set an initial probability state for at least one of the first syntax element or the second syntax element to a non-equal probability state.

26. The device of claim 25, wherein the one or more processors are configured to set the initial probability state for the first syntax element according to the first CABAC process to the non-equal probability state.

27. The device of claim 24, wherein the one or more processors are further configured to:
determine a slice type of a slice that includes the depth block; and
select an initial probability state for at least one of the first syntax element or the second syntax element from a plurality of probability states based on the slice type.

28. The device of claim 24, wherein the one or more processors are configured to set an initial probability state for at least one of the first syntax element or the second syntax elements for the depth block without reference to a value of a corresponding syntax element for any neighboring depth block of the depth block.

* * * * *